US010880304B2

(12) United States Patent
Cheng et al.

(10) Patent No.: US 10,880,304 B2
(45) Date of Patent: Dec. 29, 2020

(54) NETWORK VERIFICATION OF WEARABLE DEVICES

(71) Applicant: QUALCOMM Incorporated, San Diego, CA (US)

(72) Inventors: Hong Cheng, Bridgewater, NJ (US); Kapil Gulati, Dover, DE (US); Sudhir Kumar Baghel, Hillsborough, NJ (US); Zhibin Wu, Bedminster, NJ (US); Shailesh Patil, Raritan, NJ (US); Hua Chen, Berkeley Heights, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 15/448,340

(22) Filed: Mar. 2, 2017

(65) Prior Publication Data

US 2017/0295178 A1    Oct. 12, 2017

Related U.S. Application Data

(60) Provisional application No. 62/318,888, filed on Apr. 6, 2016.

(51) Int. Cl.
*H04L 29/06* (2006.01)
*H04W 12/08* (2009.01)
(Continued)

(52) U.S. Cl.
CPC .......... *H04L 63/0876* (2013.01); *H04W 4/80* (2018.02); *H04W 8/18* (2013.01); *H04W 12/003* (2019.01);
(Continued)

(58) Field of Classification Search
CPC .......... H04L 63/0876; H04L 61/6054; H04W 12/06; H04W 12/08; H04W 76/10
(Continued)

(56) References Cited

U.S. PATENT DOCUMENTS 6,961,347 B1 * 11/2005 Bunton ................... H04L 25/14
370/465
7,646,755 B2 * 1/2010 Kurlander ............... H04L 67/12
370/328
(Continued)

FOREIGN PATENT DOCUMENTS

EP          2999280 A2      3/2016

OTHER PUBLICATIONS

International Search Report and Written Opinion—PCT/US2017/020727—ISA/EPO—dated May 16, 2017.

*Primary Examiner* — Tae K Kim
*Assistant Examiner* — Peiliang Pan
(74) *Attorney, Agent, or Firm* — Procopio, Cory, Hargreaves & Savitch LLP

(57) ABSTRACT

The present disclosure provides a solution to this problem by enabling the communications network to verify the relationship of the first UE and the second UE based on stored pairing information that is used to verify that the first UE is allowed to make a connection to the communications network. The apparatus transmits a pairing request from a first UE to a second UE. In an aspect, the pairing request is intended for a communication network. Further, the apparatus receives a pairing acknowledgement. In an aspect, the pairing acknowledgement verifies the pairing of the first UE and the second UE. In addition, the apparatus connects to the communication network via the second UE once the first UE pairs with the second UE.

30 Claims, 32 Drawing Sheets

(51) Int. Cl.
  *H04W 12/00* (2009.01)
  *H04W 76/14* (2018.01)
  *H04W 4/80* (2018.01)
  *H04W 76/11* (2018.01)
  *H04W 8/18* (2009.01)
  *H04W 12/06* (2009.01)
  *H04W 36/38* (2009.01)
  *H04B 1/3827* (2015.01)
  *H04L 29/12* (2006.01)
  *H04W 84/12* (2009.01)

(52) U.S. Cl.
  CPC ........... *H04W 12/06* (2013.01); *H04W 12/08* (2013.01); *H04W 36/38* (2013.01); *H04W 76/11* (2018.02); *H04W 76/14* (2018.02); *H04B 1/385* (2013.01); *H04L 61/6054* (2013.01); *H04W 84/12* (2013.01)

(58) Field of Classification Search
  USPC .......................................................... 726/7
  See application file for complete search history.

(56) References Cited

U.S. PATENT DOCUMENTS

| | | | |
|---|---|---|---|
| 7,925,212 B2* | 4/2011 | Eisenbach | H04M 1/7253 370/328 |
| 8,111,718 B1* | 2/2012 | Habib | H04W 72/0453 370/329 |
| 9,137,838 B2* | 9/2015 | Liu | H04W 36/0022 |
| 9,529,766 B1* | 12/2016 | Arroyo | G06F 13/4265 |
| 9,712,986 B2* | 7/2017 | Fiatal | H04M 3/4872 |
| 9,848,075 B1* | 12/2017 | Ahmad | H04W 4/50 |
| 2003/0126376 A1* | 7/2003 | Blankenship | G06F 12/0835 711/146 |
| 2005/0099971 A1* | 5/2005 | Droms | H04L 45/00 370/328 |
| 2007/0142058 A1* | 6/2007 | Matsumura | H04W 76/14 455/452.2 |
| 2008/0207214 A1* | 8/2008 | Han | H04W 16/26 455/450 |
| 2008/0220799 A1* | 9/2008 | Tsai | H04W 12/06 455/509 |
| 2009/0197624 A1* | 8/2009 | Kwak | H04W 72/0406 455/517 |
| 2010/0027457 A1* | 2/2010 | Okuda | H04L 47/14 370/315 |
| 2010/0110974 A1* | 5/2010 | Zhang | H04B 7/155 370/315 |
| 2010/0217970 A1* | 8/2010 | Carter | G06F 21/606 713/150 |
| 2011/0066690 A1* | 3/2011 | Ellanti | G06Q 10/107 709/206 |
| 2011/0075633 A1* | 3/2011 | Johansson | H04W 36/02 370/331 |
| 2011/0134887 A1* | 6/2011 | Jeon | H04W 36/0077 370/331 |
| 2011/0145397 A1* | 6/2011 | Burns | H04L 29/1249 709/224 |
| 2011/0201310 A1 | 8/2011 | Lee et al. | |
| 2011/0280166 A1* | 11/2011 | Nien | H04W 76/34 370/310 |
| 2011/0314153 A1* | 12/2011 | Bathiche | H04L 63/08 709/225 |
| 2012/0191975 A1* | 7/2012 | Asnaashari | G06F 21/34 713/168 |
| 2012/0257621 A1* | 10/2012 | Ishii | H04L 41/0853 370/389 |
| 2013/0123965 A1* | 5/2013 | Cooper | G05B 15/02 700/97 |
| 2013/0125224 A1* | 5/2013 | Kaufman | H04L 63/18 726/7 |
| 2013/0142118 A1* | 6/2013 | Cherian | H04W 4/70 370/328 |
| 2013/0237151 A1* | 9/2013 | Yu | H04B 5/00 455/41.1 |
| 2013/0276079 A1* | 10/2013 | Foulds | H04L 63/08 726/7 |
| 2014/0198716 A1* | 7/2014 | Speight | H04W 72/0413 370/315 |
| 2014/0226481 A1* | 8/2014 | Dahod | H04W 72/04 370/235 |
| 2014/0254523 A1* | 9/2014 | Chai | H04W 72/04 370/329 |
| 2014/0325220 A1* | 10/2014 | Tunnell | G06F 21/00 713/168 |
| 2015/0098309 A1 | 4/2015 | Adams et al. | |
| 2015/0117184 A1* | 4/2015 | Youtz | H04W 76/18 370/230 |
| 2015/0223284 A1* | 8/2015 | Jain | H04L 5/0073 370/329 |
| 2015/0229639 A1* | 8/2015 | Abdulrahiman | H04L 63/0853 455/411 |
| 2015/0264139 A1* | 9/2015 | Son | H04L 67/125 709/208 |
| 2015/0327157 A1* | 11/2015 | Al-Shalash | H04W 48/16 370/328 |
| 2015/0351004 A1* | 12/2015 | Ko | H04W 48/10 455/411 |
| 2015/0372811 A1* | 12/2015 | Le Saint | H04L 9/3228 705/76 |
| 2016/0021698 A1* | 1/2016 | Zhao | H04L 12/4633 370/329 |
| 2016/0065318 A1* | 3/2016 | Lee | H04B 15/02 370/276 |
| 2016/0142911 A1* | 5/2016 | Kreiner | H04W 48/18 370/328 |
| 2016/0165599 A1* | 6/2016 | Xu | H04L 5/006 370/315 |
| 2016/0197770 A1* | 7/2016 | Marusca | H04L 12/413 709/223 |
| 2016/0381491 A1* | 12/2016 | Watfa | H04W 76/14 455/41.2 |
| 2017/0078962 A1* | 3/2017 | Hassan | H04W 76/10 |
| 2017/0111123 A1* | 4/2017 | Ouzounov | H04B 13/005 |
| 2017/0111754 A1* | 4/2017 | Baghel | H04W 4/70 |
| 2017/0201850 A1* | 7/2017 | Raleigh | H04W 4/50 |
| 2017/0265227 A1* | 9/2017 | Wang | H04W 76/11 |
| 2017/0295178 A1* | 10/2017 | Cheng | H04W 76/14 |
| 2018/0013521 A1* | 1/2018 | Lee | H04L 1/1851 |
| 2018/0084442 A1* | 3/2018 | Lee | H04W 40/08 |
| 2018/0092017 A1* | 3/2018 | Freda | H04W 76/14 |
| 2018/0152986 A1* | 5/2018 | Jung | H04W 48/20 |
| 2018/0234942 A1* | 8/2018 | Kim | H04W 68/02 |
| 2018/0249524 A1* | 8/2018 | Yi | H04W 88/04 |

\* cited by examiner

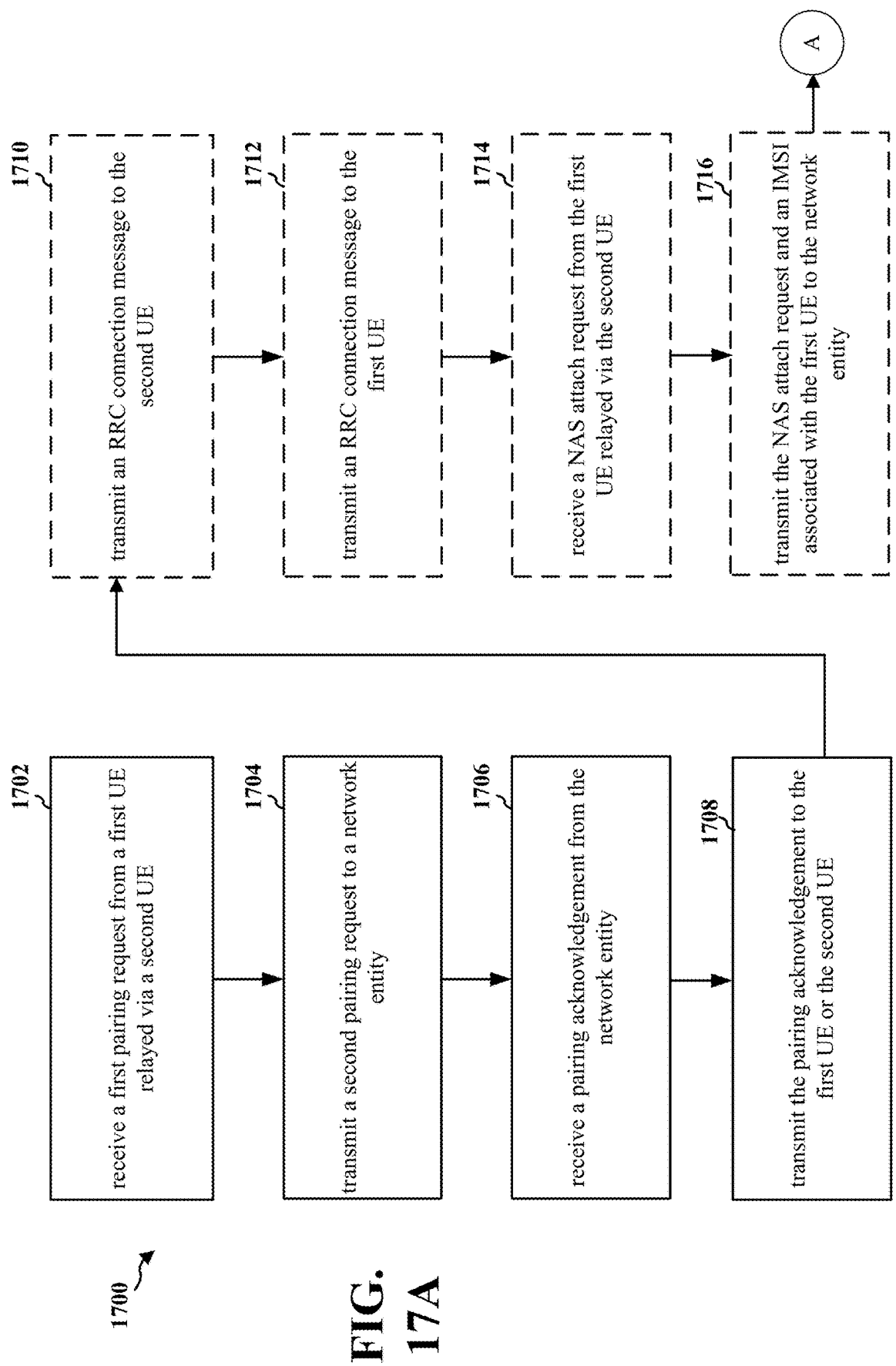

NETWORK VERIFICATION OF WEARABLE DEVICES

CROSS-REFERENCE TO RELATED APPLICATION(S)

This application claims the benefit of U.S. Provisional Application Ser. No. 62/318,888, entitled "NETWORK VERIFICATION OF WEARABLE DEVICES" and filed on Apr. 6, 2016, which is expressly incorporated by reference herein in its entirety.

BACKGROUND

Field

The present disclosure relates generally to communication systems, and more particularly, to a wearable user equipment (UE) that is able to connect to a communications network via a relay UE.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

One problem with present communication networks is that when a first UE (e.g., a wearable UE) connects to a communication network via a second UE (e.g., relay UE), the communication network may not be aware of the presence of first UE since communications are tunneled through the second UE. In other words, when the first UE obtains a connection to the communications network via the second UE, the communications network may not be able to verify that first UE is authorized to make such a connection. Thus, there is a need to enable the communications network to verify that the first UE is authorized to connect to the network via the second UE.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One problem with present communication networks is that when a first UE (e.g., a wearable UE) connects to a communication network via a second UE (e.g., relay UE), the communication network may not be aware of the presence of first UE since communications are tunneled through the second UE. In other words, when the first UE obtains a connection to the communications network via the second UE, the communications network may not verify that first UE is authorized to make such a connection.

The present disclosure provides a solution to the above problem by enabling the communications network to verify the relationship of the first UE and the second UE based on stored pairing information that is used to verify that the first UE is allowed to make a connection to the communications network. For example, the first UE may initiate a pairing request with the second UE. The second UE forwards the pairing request that includes the information associated with the identify of both the first UE and the second UE. The communications network may use the identity information included in the pairing request from the second UE to authorize the first UE's connection to the network.

In an aspect of the disclosure, a method, a computer-readable medium, and an apparatus are provided. The apparatus transmits a pairing request from a first UE to a second UE. In one aspect, the pairing request is intended for a communication network. In another aspect, the apparatus receives a pairing acknowledgement. The pairing acknowledgement verifies the pairing of the first UE and the second UE. In a further aspect, the apparatus connects to the communication network via the second UE once the first UE pairs with the second UE.

In an additional aspect, the apparatus receives a first pairing request from a first UE at a second UE. For example, the first pairing request is intended for a communication network. Further, the apparatus transmits a second pairing request to a base station. Moreover, the apparatus receives a pairing acknowledgement from a base station, the pairing acknowledgement verifying the pairing of the first UE and the second UE.

In a further aspect, the apparatus receives a first pairing request from a first UE relayed via a second UE. In another aspect, the apparatus transmits a second pairing request to a network entity. In yet an additional aspect, the apparatus receives a pairing acknowledgement from the network entity, the pairing acknowledgement verifying the pairing of the first UE and the second UE.

In another aspect, the apparatus receives at a first network entity an initial UE message, the initial UE message including a first identification associated with a first UE and a second identification associated with a second UE. In another aspect, the apparatus transmits a pair check message to a second network entity, the pair check message including a third identification associated with the first UE and the second identification associated with the second UE. Furthermore, the apparatus receives a pair check acknowledgement from the second network entity. For example, the pair check acknowledgement includes a fourth identification associated with the second UE.

In an additional aspect, the apparatus receives from a first network entity a pair check message at a second network entity. For example, the pair check message includes a first identification associated with the first UE and a second identification associated with the second UE. Furthermore, the apparatus transmits a pair check acknowledgement to the first network entity. For example, the pair check acknowledgement includes a third identification associated with the second UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 17A and 17B are a flowchart of a method of wireless communication.

DETAILED DESCRIPTION

Figure 1:
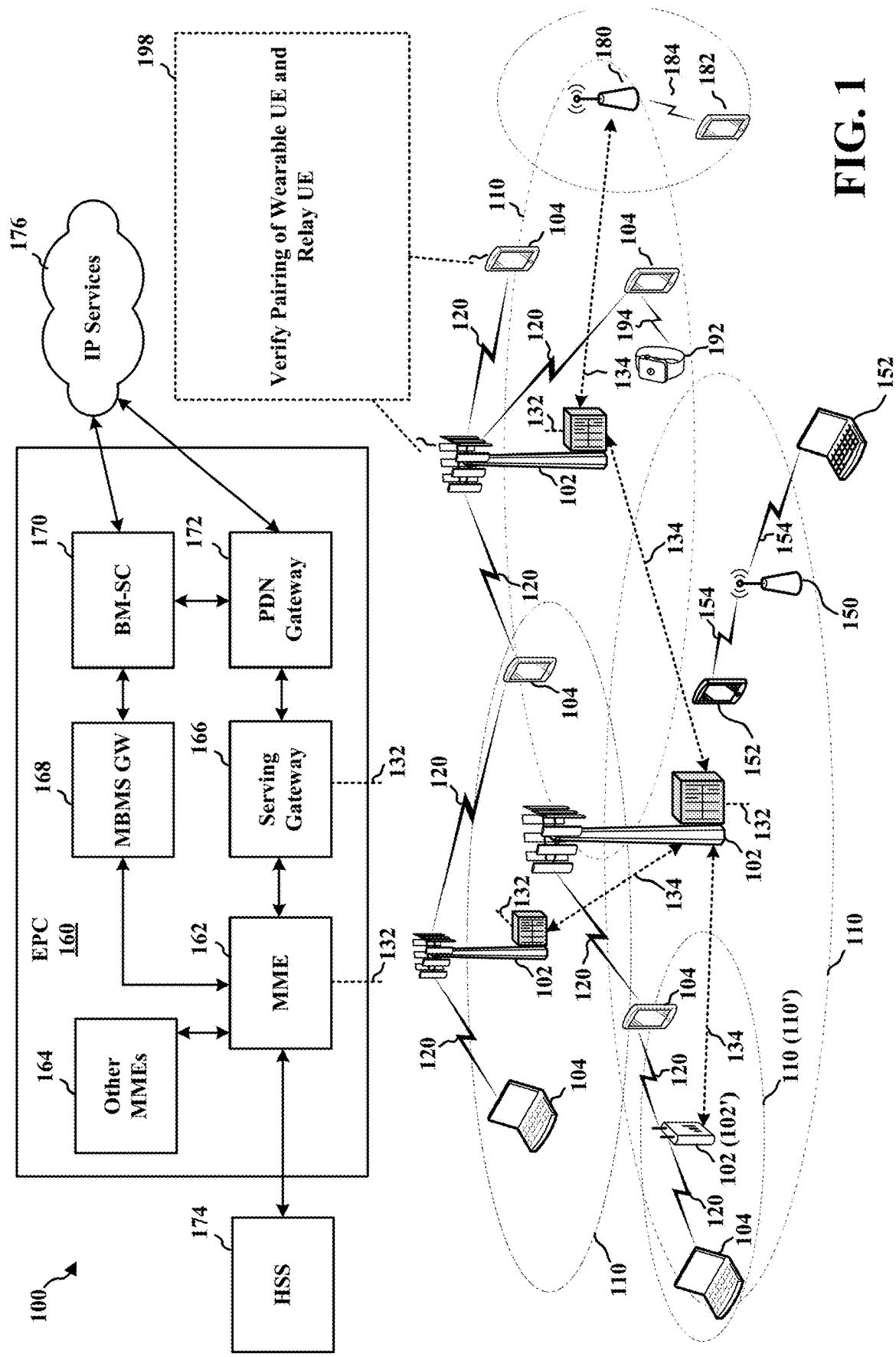
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the network may be able to verify a pairing 194 between a wearable UE 192 (e.g., a smart watch, a heart monitor, a physiological sensor, etc.) and UE 104 (198).

Figure 2A:
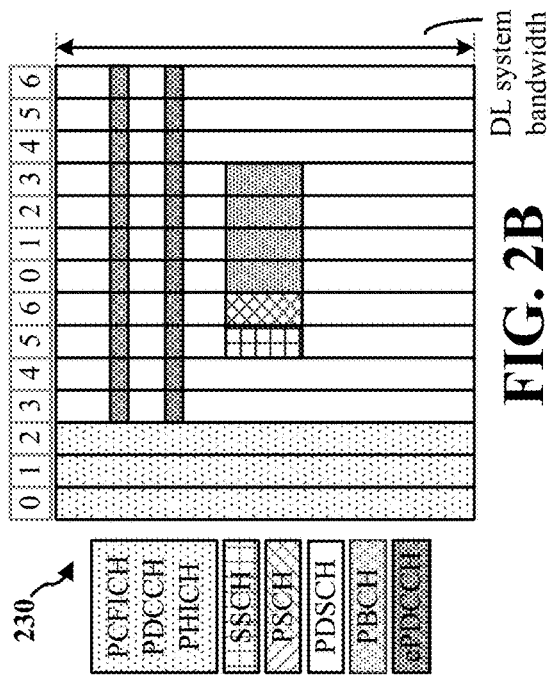
FIGS. 2A, 2B, 2C, and 2D are diagrams illustrating LTE examples of a DL frame structure, DL channels within the DL frame structure, an UL frame structure, and UL channels within the UL frame structure, respectively.
Figure 2B:
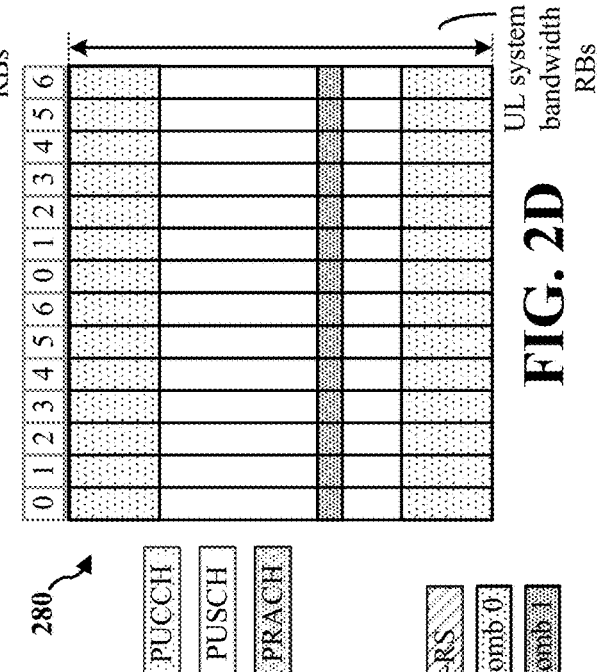
Figure 2C:
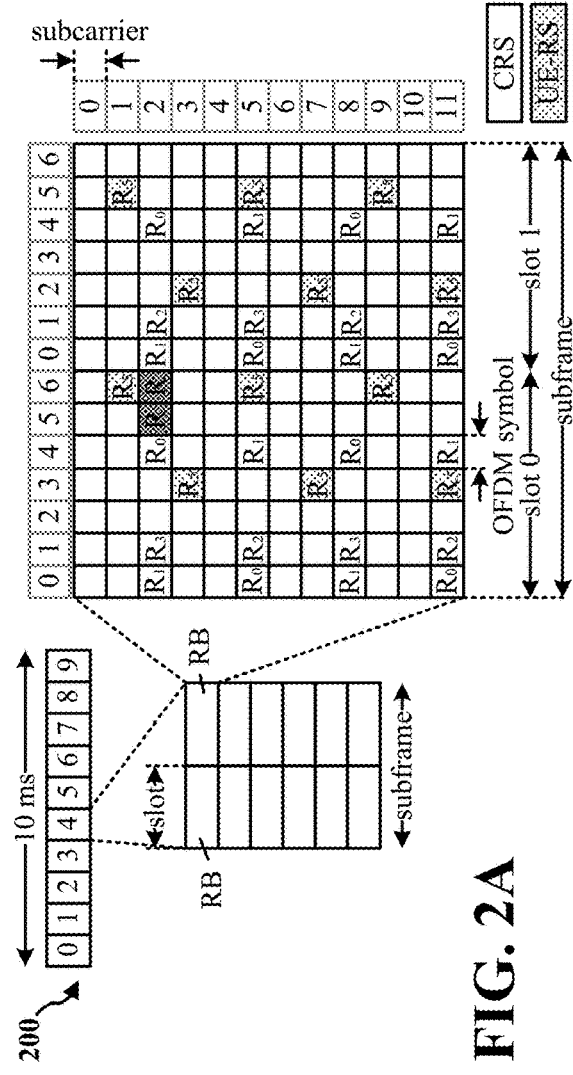
Figure 2D:
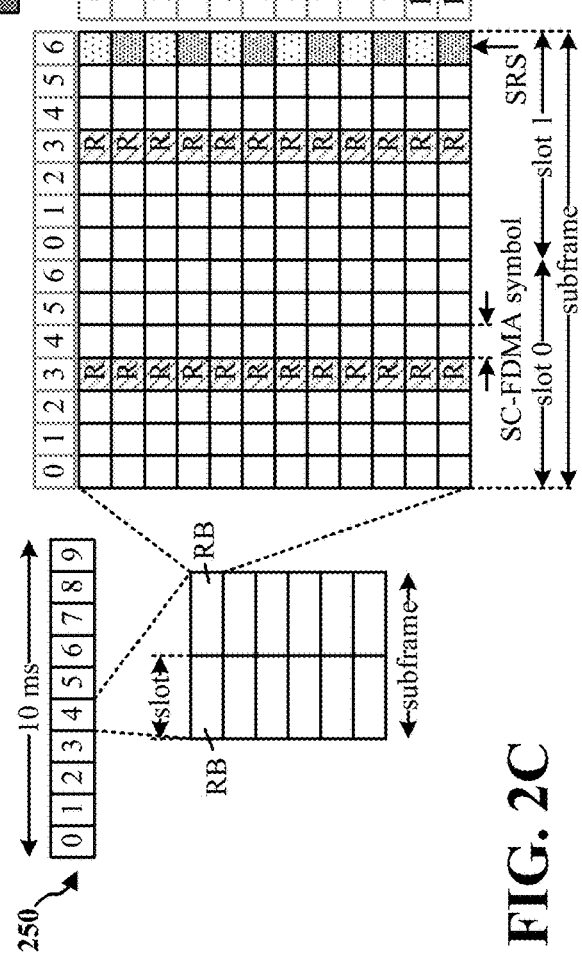

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
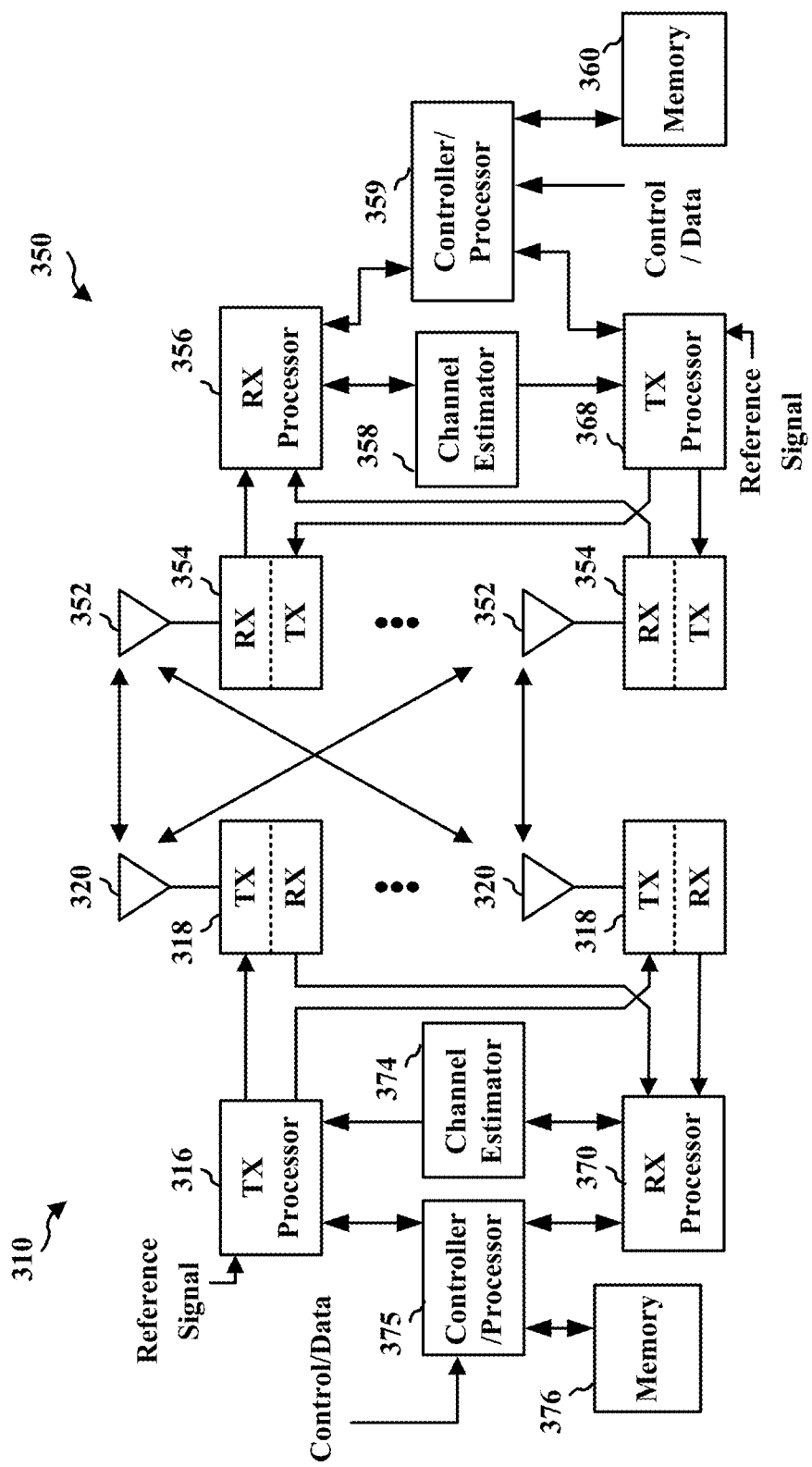
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

One problem with present communication networks is that when a first UE (e.g., a wearable UE) connects to a communication network via a second UE (e.g., relay UE), the communication network may not be aware of the presence of first UE since communications are tunneled through the second UE. In other words, when the first UE obtains a connection to the communications network via the second UE, the communications network may not be able to verify that first UE is authorized to make such a connection.

The present disclosure provides a solution to the problem by enabling the communications network to verify the relationship of the first UE and the second UE based on stored pairing information that is used to verify that the first UE is allowed to make a connection to the communications network. For example, the first UE may initiate a pairing request with the second UE, and the second UE may forward a pairing request that includes the information associated with the identify of both the first UE and the second UE to the communications network. The communications network may use the identity information included in the pairing request received from the second UE to authorize the first UE's connection to the network.

Figure 4:
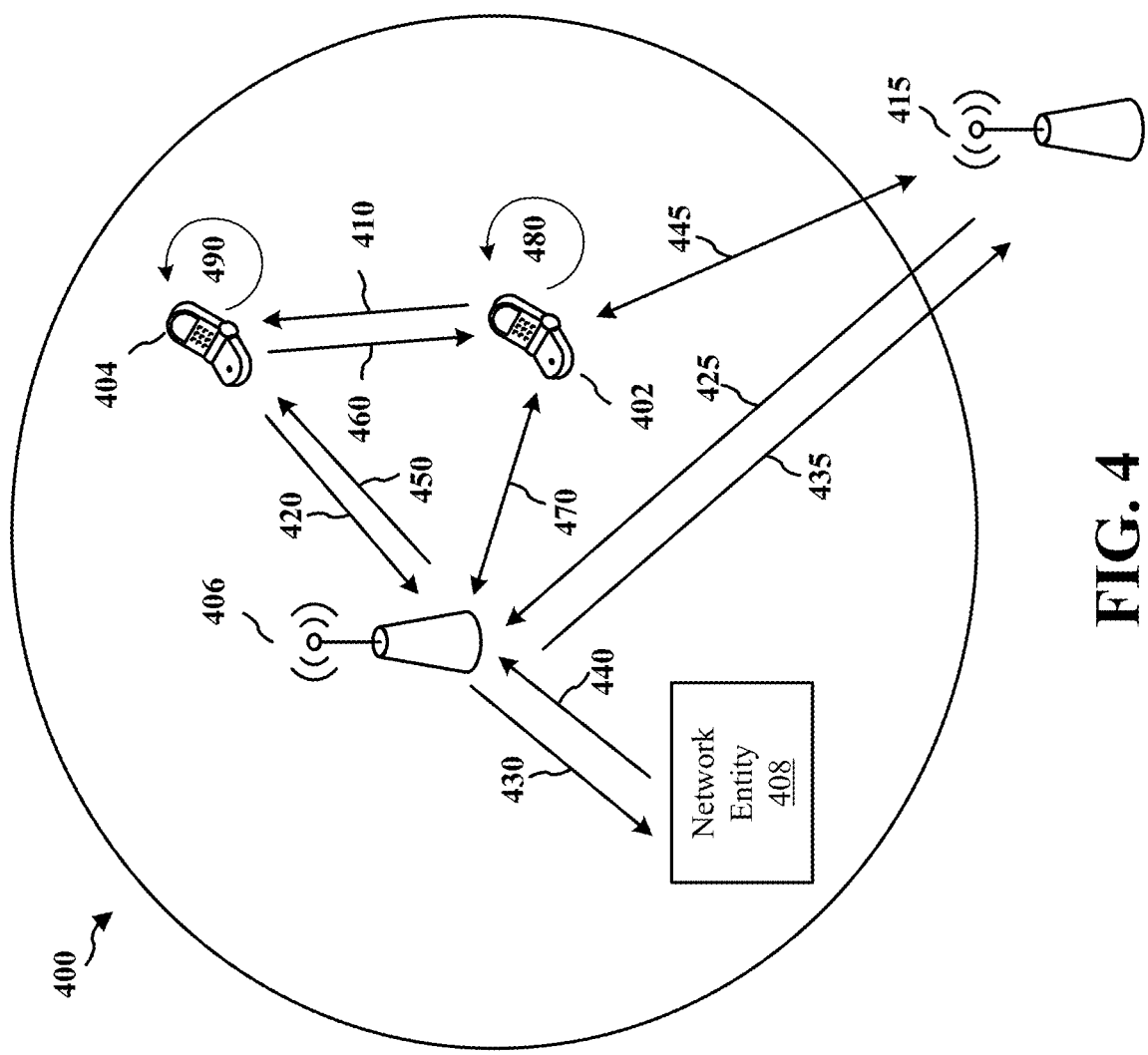
FIG. 4 is a diagram of an exemplary communications system in accordance with an aspect of the present disclosure.

FIG. 4 is an exemplary diagram of a communications system 400 that may be able to verify that a first UE 402 is authorized to connect to the network via the second UE 404. As illustrated in FIG. 4, the communications system 400 may include a first UE 402 (e.g., a wearable UE such a heart monitor, a smart watch, a physiological sensor, etc.), a second UE 404 (e.g., a mobile phone), a base station 406, and at least one network entity 408 (e.g., one or more MMEs). By allowing the first UE 402 to connect to the network via the second UE 404 rather than a direct connection to the base station 406, the first UE 402 may use a lower transmission power. Thus, the battery life of the first UE 402 may be extended, and the first UE 402 may be manufactured using lower cost radio components.

The communications system 400 illustrated in FIG. 4 may be able to support the first UE 402 in both system architecture (SA) nodes and RAN nodes. In one aspect, the first UE 402 may have a network subscription, for example, in the form of a subscriber identity module (SIM), a universal SIM (USIM), or a virtual (eSIM). In another aspect, the second UE 404 may operate at Layer 2 (e.g. forward layer 2 packets from the first UE to the network) to give network visibility of the first UE 402, for charging, or policy control purposes. If the second UE 404 operates at the IP or layer 3 or higher layers the network may not have visibility to the first UE 402. The communications system 400 may store the companion relationship of the first UE 402 and the second UE 404 as part of the subscription information to identify the relationship between the first UE 402 and the second UE 404. For example, the subscription information may be stored in an HSS or another database. In an aspect, the identify verification of the first UE 402 may be implemented using an existing 3GPP NAS mechanism, and thus may not require new security schemes.

In the example embodiment illustrated in FIG. 4, the communication system 400 includes a bi-directional relay architecture in which the first UE 402 may communicate in the uplink and the downlink with the second UE 404 and/or the base station 406. Additional details of the bi-directional relay architecture is discussed infra with respect to FIG. 5A. Although a bi-directional relay architecture is illustrated in FIG. 4, the communication system 400 may alternatively include a unidirectional relay architecture in which the first UE 402 communicates in the uplink with the second UE 404 and receives communications in the downlink from the base station 406. Additional details of the unidirectional relay architecture is discussed infra with respect to FIG. 5B.

Referring to FIG. 4, the first UE 402 may transmit a pairing request 410 to the second UE 404. The pairing request 410 may be intended for the communication network. In one aspect, the pairing request 410 may include an identification associated with the first UE 402. For example, the identification associated with the first UE 402 may include at least one of an international mobile subscriber identity (IMSI) associated with the first UE 402, a system architecture evolution (SAE) temporary mobile subscriber identity (S-TMSI) associated with the first UE 402, a layer 2 identification (L2-ID) associated with the first UE 402, security information that allows the communication network to verify an identity of the first UE 402, or a token that indicates to the second UE 404 that the pairing request 410 is transmitted by the first UE 402. In an example embodiment, the pairing request 410 may include a NAS pairing request. In another example embodiment, the pairing request 410 may include a PC5 signaling protocol message that indicates a pairing request. In an alternative aspect, when the pairing request 410 is transmitted using the unlicensed spectrum, the first UE 402 may perform a CCA to determine if the channel and/or resources are available for a transmission.

In some instances multiple wearable UEs may be broadcasting pairing requests 410 to the second UE 404. By including a token in the pairing request 410, the second UE 404 may be able to determine that pairing request 410 is transmitted by a UE (e.g., first UE 402) authorized to pair with the second UE 404. The first UE 402 may generate the token 480 based on at least one of the IMSI associated with the first UE 402, an IMSI associated with the second UE 404, stored information based on a network subscription, manually entered information, or a value associated with a combination of at least one of the foregoing, e.g., hashing of the IMSI pair.

In another aspect, the second UE 404 may receive a pairing request 410 from the first UE 402 that includes a token 490. In one aspect, the information in the token may be used by the second UE 404 to filter the request from multiple wearable UEs (not illustrated in FIG. 4) by identifying the first UE 402. For example, the token may include previous relationship information (e.g., IMSI of first UE 402 or MAC address associated with first UE 402, or another identifier associated with the first UE 402). In an example embodiment, the second UE 404 may verify that the token 490 included with the pairing request 410 is transmitted by a UE (e.g., first UE 402) authorized to pair with the second UE. The second UE 404 may then transmit/forward a modified pairing request 420 to the base station 406.

In one configuration, the pairing request 410 received from the first UE 402 may be modified by the second UE 404 to additionally include an identification associated with the second UE 404. The identification associated with the second UE 404 may include at least one of at least one of a S-TMSI and/or an L2-ID associated with the second UE 404. In an example embodiment, when the pairing request 410 is a PC5 interface protocol stack pairing request, the second UE 404 may generate a modified pairing request 420 as a NAS pairing request based on the PC5 interface protocol stack pairing request received from the first UE 402. In one aspect, the modified pairing request 420 may be transmitted to the base station 406 as a sidelink communication control message (e.g. contained in the RRC SidelinkUEInformation message). In an alternative aspect, when the pairing request 410 is transmitted using the unlicensed spectrum, the second UE 404 may perform a CCA to determine if the channel and/or resources are available for relaying transmissions from the first UE 402 to the base station 406 via the second UE 404. In addition, the second UE 404 may communicate information associated with the CCA to the base station 406, so that the base station 406 may determine if the channel and/or resources should be used by the second UE 404.

In certain configurations, the base station 406 may transmit a pairing request 430 (e.g., associated with the modified pairing request 420 received from second UE 404) to a network entity 408 (e.g., one or more MMEs as illustrated in FIGS. 8A, 8B, 9A, 9B, 10A, and/or 10B). In one aspect, the base station 406 may transmit the pairing request 430 with at least one of the IMSI associated with the first UE 402, an S-TMSI associated with the first UE 402, and/or the S-TMSI associated with the second UE 404. Item 430 may be used to indicate a pairing request and a NAS attach request, as discussed infra.

Based on the identification information included in the pairing request 430, the network entity 408 may verify the pairing of the first UE 402 and the second UE 404. Additionally and/or alternatively, the network entity 408 may use the identification information to verify that the first UE 402 is authorized to connect to the network.

When the network entity 408 determines that the first UE 402 is authorized to connect to the network, the base station 406 may receive a pairing acknowledgement 440 from the network entity 408. The pairing acknowledgement 440 may include, for example, the IMSI associated with the first UE 402. Item 440 may be used to indicate the pairing acknowledgement, a NAS attach response, and/or a UE context setup message, as discussed infra. The base station 406 may transmit the pairing acknowledgement 470 in a connection setup message directly to the first UE 402 (e.g. using the RRCConnectionSetup message or RRCConnectionReconfiguration message). Alternatively, the base station 406 may transmit the pairing acknowledgement 450 in the connection setup message to the second UE 404. The second UE 404 may transmit the pairing acknowledgement 460 including the connection setup message to the first UE 402. In either case, the pairing acknowledgement including connection setup message 460, 470 received at the first UE 402 may include at least one of the L2-ID associated with the first UE 402, the L2-ID associated with the second UE 404, and/or a cell radio network temporary identifier (C-RNTI). In addition, the base station 406 may transmit a separate RRC connection message to the second UE 404 or to the first UE 402.

The first UE 402 may transmit a NAS attach request 410 to the second UE 404. In one aspect, the NAS attach request 410 may be intended for the communications network 400. For example, the NAS attach request 410 may be transmitted as a PC5 signaling protocol stack attach request. In one aspect, PC5 signaling protocol stack attach request may be a signaling layer defined on top of the PDCP of the PC5 link, and may be the connection set up request for a PC5 link. The second UE 404 may transmit the NAS attach request 420 to the base station 406. In an example embodiment, the second UE 404 may include the IMSI associated with the first UE 402 in the NAS attach request 420.

The base station 406 may transmit the NAS attach request 430 to the network entity 408. In an example embodiment, the NAS attach request 430 may include the IMSI associated with the first UE 402. The network entity 408 may verify that the IMSI included in the NAS attach request 430 is the same as the IMSI included in the pairing request 430 from the base station 406 discussed supra.

When the network entity 408 determines that the IMSIs in the NAS attach request 430 and the pairing request 430 are the same, a pairing acknowledgement 440 (e.g., a NAS attach response and/or UE context setup message) may be transmitted to the base station 406. The base station 406 may transmit the NAS attach response 470 to the first UE 402. Alternatively, the base station 406 may transmit the pairing acknowledgement 450 (e.g., NAS attach response) to the second UE 404. The second UE 404 may then transmit the NAS attach response 460 to the first UE 402. Once the NAS attach response 460, 470 is received by the first UE 402, the first UE 402 may connect to the communications system 400. In an example embodiment, the second UE 404 may establish a radio bearer between the second UE 404 and the base station 406 for forwarding messages received from the first UE 402 after receiving the pairing acknowledgement. In another aspect, the network entity 408 may initiate an authentication procedure before sending the pairing acknowledgement 440 (e.g., a NAS attach response and/or UE context setup message). In such operation alternatives, the network entity 408 may send NAS authentication request messages to the first UE 402 via the base station 406 directly or via the second UE 404. The first UE 402 may send NAS authentication response messages to the network entity 408 via the second UE 404 and the base station 406. When the authentication is successful, the network entity 408 may send a pairing acknowledgement 440 (e.g., a NAS attach response and/or UE context setup message).

In an exemplary embodiment, the base station 406 may receive a handover request 425 from base station 415. In an aspect, the handover request 425 may be associated with a handover procedure for the first UE 402 that has an active communication session with base station 415. When a handover acknowledgement 435 is received by base station 415 from base station 406, the base station 415 and/or base station 406 may transmit a handover command 470 to the first UE 402. The base station 415 may then begin communication 445 with the first UE 402.

In this way, the communications system 400 of the present disclosure may be able to use the identity information included in the pairing request from the second UE 404 to authorize the first UE's 402 connection to the network. In another aspect, the network entity 408 may interact with other network entities (e.g. other MMEs or HSSs) in order to carry out the pairing verification, the attach and authentication procedure for the first UE 402, and/or the handover operation for the first UE 402.

Figure 5A:
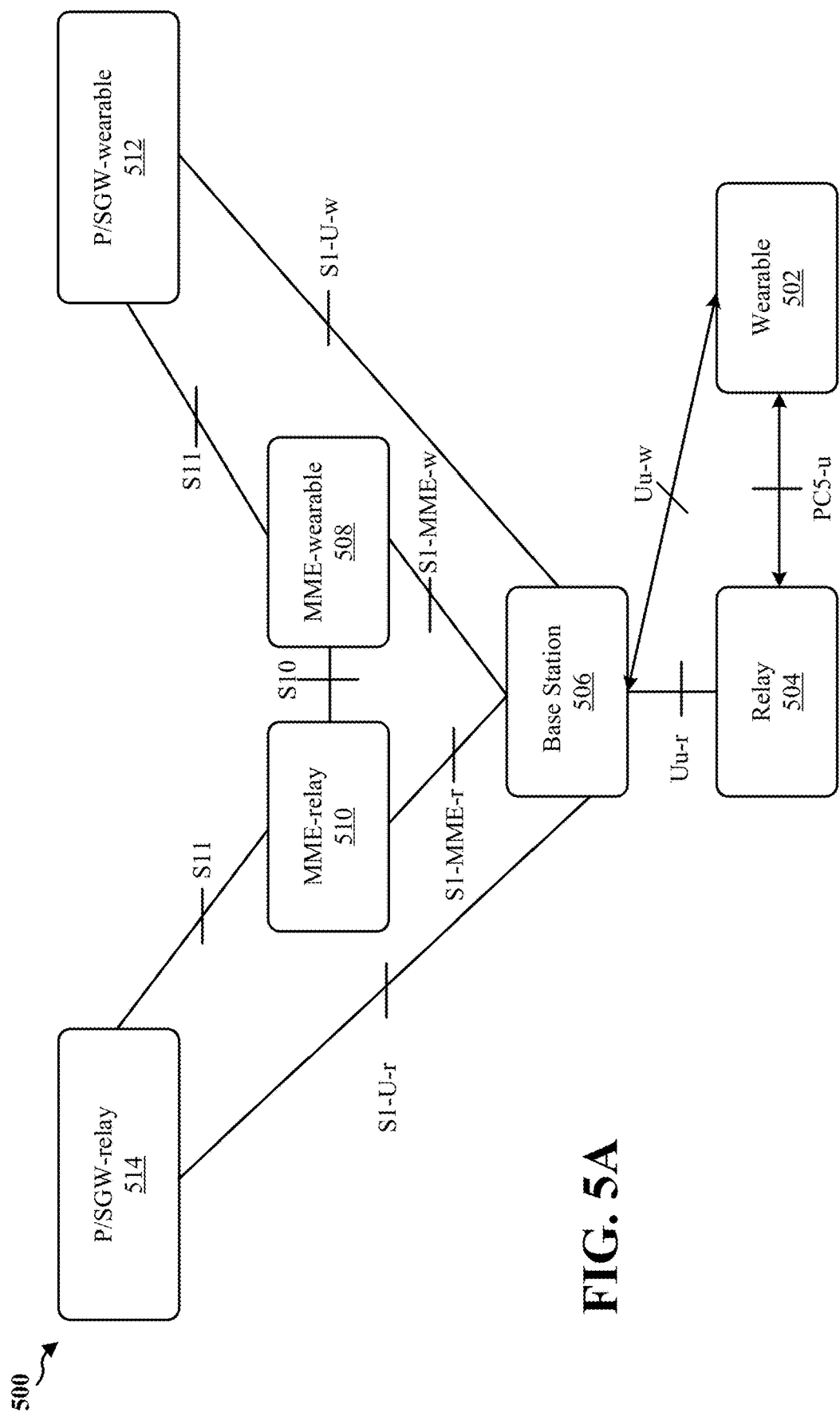
FIG. 5A is a diagram of an exemplary bi-directional system architecture in accordance with an aspect of the present disclosure.

FIG. 5A is a diagram of an exemplary bi-directional relay architecture 500 that may be used, for example, by the communication system 400 illustrated in FIG. 4. For example, the bi-directional relay architecture 500 may include a wearable UE 502, a relay UE 504, a base station 506, an MME 508 associated with the wearable UE (e.g., MME-wearable 508) an MME 510 associated with the relay UE 504 (e.g., MME-relay 510), a packet data network gateway and/or serving gateway 512 (P/SGW) associated with the wearable UE 502 (e.g., P/SGW-wearable 512), and/or a P/SGW 514 associated with the relay UE 504 (e.g., P/SGW-relay 514). In the example embodiment illustrated in FIG. 5A, the wearable UE 502 and the relay UE 504 may belong to the same PLMN.

In the bi-directional relay architecture 500 illustrated in FIG. 5A, the wearable UE 502 may communicate in the UL and DL (e.g., bi-directionally) with the relay UE 504 using the PC5-u protocol stack. In addition, the wearable UE 502 may communicate in the UL and the DL (e.g., bi-directionally) with the base station 506 using the Uu-w protocol stack. Alternatively, the wearable UE 502 may tunnel the Uu connection through the relay UE 504 to the network. The relay UE 504 may communicate with the base station 506 in the UL and DL using the Uu-r protocol stack. In another aspect, the PC5-u could be realized with the unlicensed spectrum WLAN or WPAN access technologies, e.g. WiFi or Bluetooth.

The base station 506 may communicate with the MME-wearable 508 using the S1-MME-w protocol stack and with the MME-relay 510 using the S1-MME-r protocol stack. In addition, the base station 506 may communicate with the P/SGW-wearable 512 using the S1-U-w protocol stack and with the P/SGW-relay 514 using the S1-U-r protocol stack. In an aspect, the base station 506 may bind the tunneled Uu-w of the wearable UE 502 with the S1-U-w and S1-MME-w.

The MME-wearable 508 and the MME-relay 510 may communicate using the S10 protocol stack. Additionally, the MME-wearable 508 may communicate with the P/SGW-wearable 512 using the S11 protocol stack and the MME-relay 510 may communicate with the P/SGW-relay 514 using the S11 protocol stack.

Figure 5B:
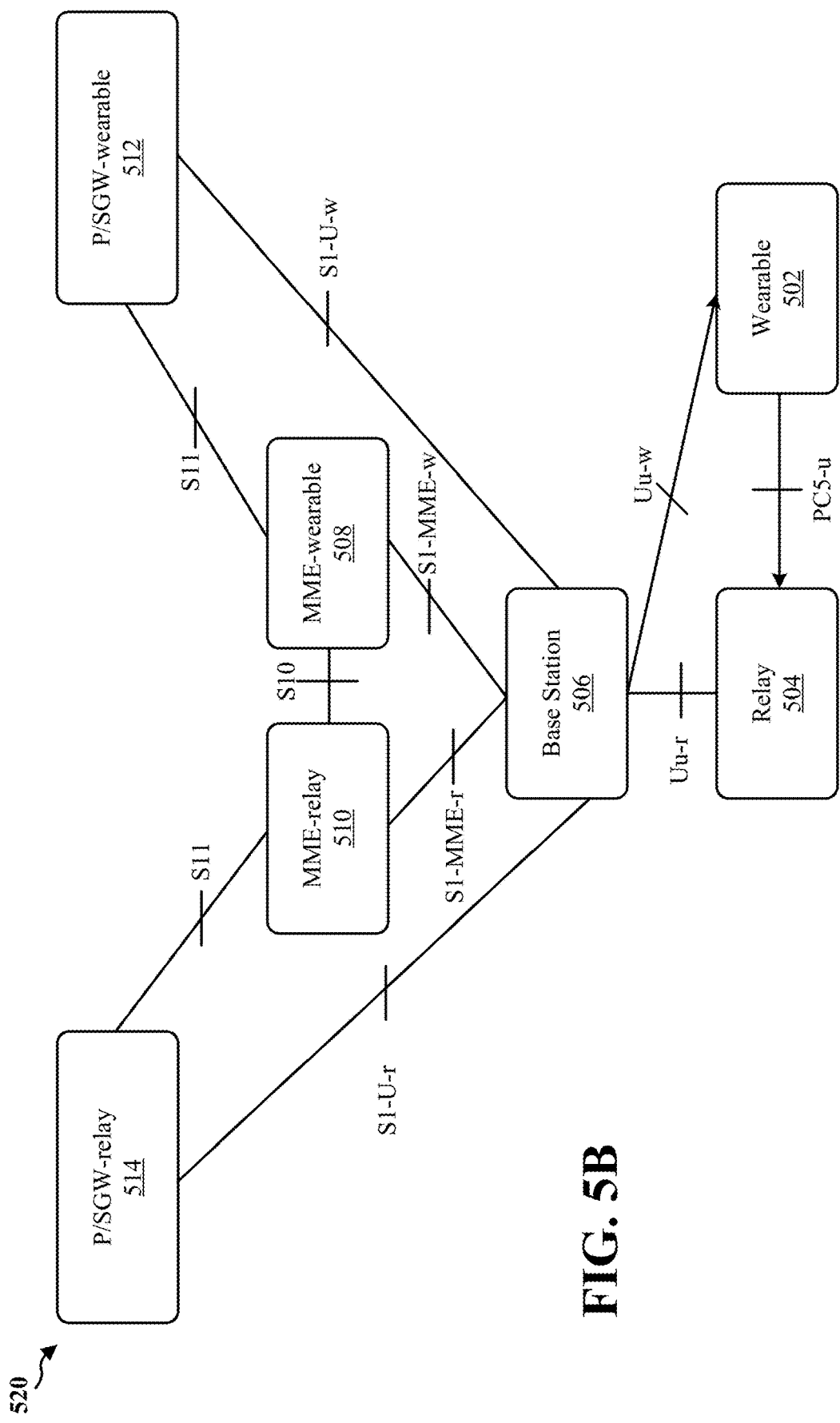
FIG. 5B is a diagram of an exemplary unidirectional system architecture in accordance with an aspect of the present disclosure.

FIG. 5B is a diagram of an exemplary unidirectional relay architecture 520 that may be used, for example, by the communications system 400 illustrated in FIG. 4. For example, the unidirectional relay architecture 520 may include a wearable UE 502, a relay UE 504, a base station 506, an MME 508 associated with the wearable UE (e.g., MME-wearable), an MME 510 associated with the relay UE 504 (e.g., MME-relay), a packet data network gateway and/or serving gateway 512 (P/SGW) associated with the wearable UE 502 (e.g., P/SGW-wearable), and/or a P/SGW 514 associated with the relay UE 504 (e.g., P/SGW-relay). The unidirectional relay architecture 520 may provide a power advantage for UE 402 transmissions.

In the unidirectional relay architecture 520 illustrated in FIG. 5A, the wearable UE 502 may communicate in the UL but not the DL (e.g., unidirectionally) with the relay UE 504 using the PC5-u protocol stack. In addition, the wearable UE 502 may communicate in the DL but not the UL (e.g., unidirectionally) with the base station 506 using the Uu-w protocol stack. In another aspect, the PC5-u could be realized with the unlicensed spectrum WLAN or WPAN access technologies, e.g. WiFi or Bluetooth.

The base station 506 may communicate with the MME-wearable 508 using the S1-MME-w protocol stack and with the MME-relay 510 using the S1-MME-r protocol stack. In addition, the base station 506 may communicate with the P/SGW-wearable 512 using the S1-U-w protocol stack and with the P/SGW-relay 514 using the S1-U-r protocol stack. In an aspect, the base station may bind the tunneled UL Uu with the S1-U-w and S1-MME-w.

The MME-wearable 508 and the MME-relay 510 may communicate using the S10 protocol stack. Additionally, the MME-wearable 508 may communicate with the P/SGW-wearable 512 using the S11 protocol stack and the MME-relay 510 may communicate with the P/SGW-relay 514 using the S11 protocol stack.

Figure 6:
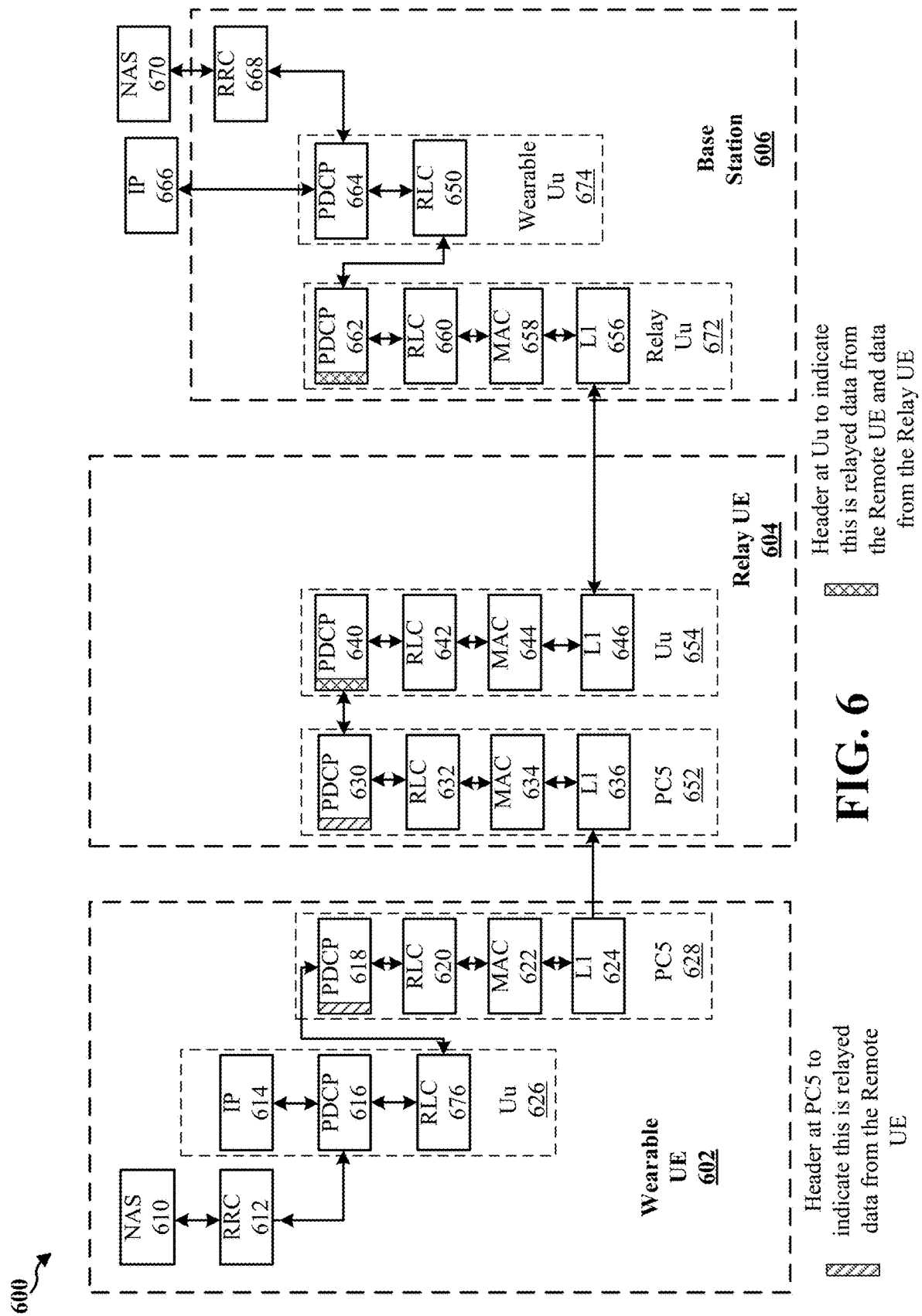
FIG. 6 is a diagram of exemplary protocol stacks in accordance with an aspect of the present disclosure.

FIG. 6 is a diagram of a communication system 600. For example, the communication system 600 may include an UL protocol stack for relaying UL transmissions from the PC5 interface protocol stack of wearable UE 602 to the base station 606 via the relay UE 604.

Referring to FIG. 6, the wearable UE 602 may include a NAS sublayer 610 that provides an interface between the core network and the wearable UE 602. The NAS sublayer 610 may be used to manage the establishment of communication sessions and for maintaining continuous communications with the EPC and the wearable UE 602 while the wearable UE 602 is mobile. Additionally, the wearable UE 602 may include an RRC sublayer 612 that is responsible for obtaining radio resources (e.g., radio bearers) and for configuring the lower layers using RRC signaling between the base station 606 and the wearable UE 602.

Moreover, the wearable UE 602 and the relay UE 604 may each include a user plane protocol stack (Uu) 626, 654, respectively, that provides an air interface to the base station 606. For example, the Uu 626 in the wearable UE 602 may include an IP sublayer 614, a PDCP sublayer 616, and an RLC sublayer 676. The Uu 654 in the relay UE 604 may include a PDCP sublayer 640, an RLC sublayer 642, a MAC sublayer 644, and an L1 layer 646. The IP sublayer 614 may provide access to one or more of the Internet, an intranet, an IMS, a PSS, and/or other IP services. The PDCP sublayer 514 provides multiplexing between different radio bearers and logical channels. The PDCP sublayers 616, 640 may provide header compression for upper layer data packets to reduce radio transmission overhead, provide security by ciphering the data packets, and provide handover support for UEs between base stations. The RLC sublayer 676, 642 may provide segmentation and reassembly of upper layer data packets, retransmission of lost data packets, and reordering of data packets to compensate for out-of-order reception due to HARQ. The MAC sublayer 644 may provide multiplexing between logical and transport channels. The MAC sublayer 644 may also be responsible for allocating the various radio resources (e.g., resource blocks) in one cell among the UEs served by the cell. The MAC sublayer 644 may also be responsible for HARQ operations. L1 646 is the lowest layer and implements various physical layer signal processing functions. The L1 layer 646 may also be the physical layer.

Still referring to FIG. 6, the wearable UE 602 and the relay UE 604 may each include a PC5 interface protocol stack 628, 652, respectively, for communications between the wearable UE 602 and the relay UE 604. Each PC5 stack 628, 652 includes a PDCP sublayer 618, 630, an RLC sublayer 620, 632, a MAC sublayer 622, 634, and an L1 layer 624, 636. Descriptions for the PDCP sublayers, the RLC sublayers, the MAC sublayers, and the L1 layers are discussed supra. In one aspect, the one or more of the PDCP sublayers 616, 618, 630, 640, 662, and/or 664 may be a substack of the PDCP (e.g. not the full PDCP) and/or an adaptation layer.

Referring again to FIG. 6, the base station 606 may include a NAS sublayer 670 that provides an interface between the core network and the base station 606. Additionally, the base station 606 may include an RRC sublayer 668 that is responsible for obtaining radio resources (e.g., radio bearers) and for configuring the lower layers using RRC signaling between the base station 606 and each of the wearable UE 602 and the relay UE 604.

Furthermore, the base station 606 may include a relay Uu 672 that provides an air interface between the relay UE 604. In addition, the base station 606 may include a wearable Uu 674 that provides an air interface between the wearable UE 602. For example, the wearable Uu 674 may include a PDCP sublayer 664 in communication with an IP sublayer 666. The relay Uu 656 may include a PDCP sublayer 662, an RLC sublayer 660, a MAC sublayer 658, and an L1 layer 656. The IP layer 666 may provide access to one or more of the Internet, an intranet, an IMS, a PSS, and/or other IP services. Descriptions for the PDCP sublayers, the RLC sublayers, the MAC sublayers, and the L1 layers are discussed supra. In one aspect, the one or more of the PDCP sublayers 662, 664 may be a substack of the PDCP (e.g. not the full PDCP) and/or an adaptation layer.

Referring still to FIG. 6, a first data packet may be received at the Uu 626 by the wearable UE 602. The first data packet may be intended for the base station 606. However, since the wearable UE 602 may not be configured for UL transmissions (e.g., unidirectional communication) with the base station 606, the wearable UE 602 may relay the first data packet to base station 606 via relay UE 604. The relay UE 604 may transmit the first data packet relayed from the wearable UE 602 to the base station 606. The RLC sublayer 676 in Uu 626 may transfer the first data packet to the PDCP sublayer 618 in PC5 stack 628. The PDCP sublayer 618 may modify a header of the first data packet to identify the first data packet as relayed uplink traffic intended for the base station 606 from the wearable UE 602. For example, the header may be modified to include an S-TMSI or an IMSI associated with the wearable UE 602 that the base station 606 may use in identifying the first data packet as originating from wearable UE 602. In addition, the modified header may include PC5 PDCP header (e.g., 1 byte), information indicating that first data packet is relayed UL link traffic (e.g., 1 bit), and information that indicates the "heartbeat" for DL traffic (e.g., indicating that wearable UE 602 can receive DL transmissions from the base station 606). The first data packet including the modified header may be transferred down to L1 624 in PC5 stack 628. The first data packet may then be transmitted via L1 624 to the relay UE 604. In an aspect, the first data packet may be received at L1 636 of PC5 stack 652 in the relay UE 604.

Still referring to FIG. 6, the first data packet may then be passed up through the sublayers of PC5 stack 652. The PDCP sublayer 630 may transfer the first data packet to the PDCP sublayer 640 in Uu 654. Moreover, a second data packet may be received at PDCP sublayer 640. For example, the second data packet may be local data originating from the relay UE 604 and intended for base station 606. The PDCP sublayer 640 may combine the first data packet and the second data packet since both are intended for base station 606. The PDCP sublayer 640 may modify the header of the combined data packet to identify the first data packet as relayed uplink traffic from the wearable UE 602 and the second data packet as local data from the relay UE 604. For example, the modified header of the combined data packet may include an index of a layer 2 identification (L2-ID) table associated with the relay UE 604 and an index of a S-TMSI/IMSI table associated with the wearable UE 602 (e.g., a D2D L2-ID table to indicate the D2D L2-ID of the wearable UE 602). The combined data packet may be passed down through the sublayers in the Uu 654. In addition, the modified header of the combined data packet may include information (e.g., 1 bit) that indicates the first data packet is being relayed from wearable UE 802. The combined data packet including the modified header may be transmitted via L1 layer 646 to the base station 606.

Referring again to FIG. 6, the combined data packet may be received at the relay Uu 672 of the base station 606. In an aspect, the combined data packet may be received at the L1 layer 656 of the relay Uu 672 and then passed up to the PDCP sublayer 662 where the modified header of the combined data packet may be removed and/or decoded. The base station 606 may decode the first data packet using the index of the S-TMSI/IMSI table in the modified header for C-RNTI mapping. For example, C-RNTI mapping may be used to identify a specific UE served by base station 606. Additionally, the base station 606 may decode the second data packet using the index of the L2-ID table in the modified header for C-RNTI mapping. For example, the base station 606 may use the index of the S-TMSI/IMSI to determine the S-TMSI/IMSI for C-RNTI mapping and route the first data packet to the wearable Uu 674. Alternatively, the base station 606 may use the index of the L2-ID for C-RNTI mapping for the relay UE 604. In an aspect, the L2-ID/associated index and the S-TMSI/IMSI/associated index may be provided to the base station 606 by the relay UE 604 in a sidelink UE information message.

Figure 7A:
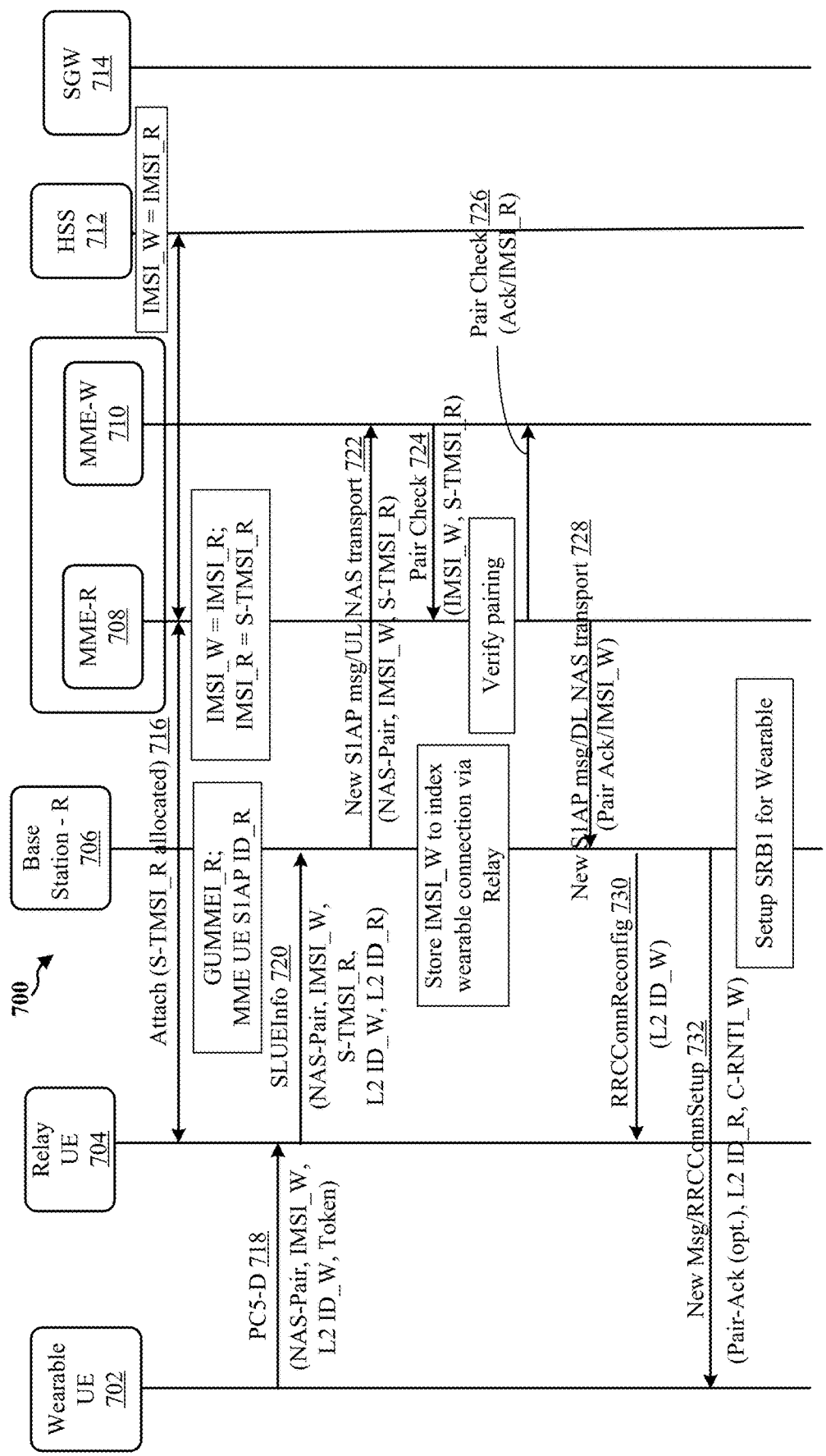
FIGS. 7A and 7B are a diagram of an exemplary data flow in accordance with an aspect of the present disclosure.
Figure 7B:
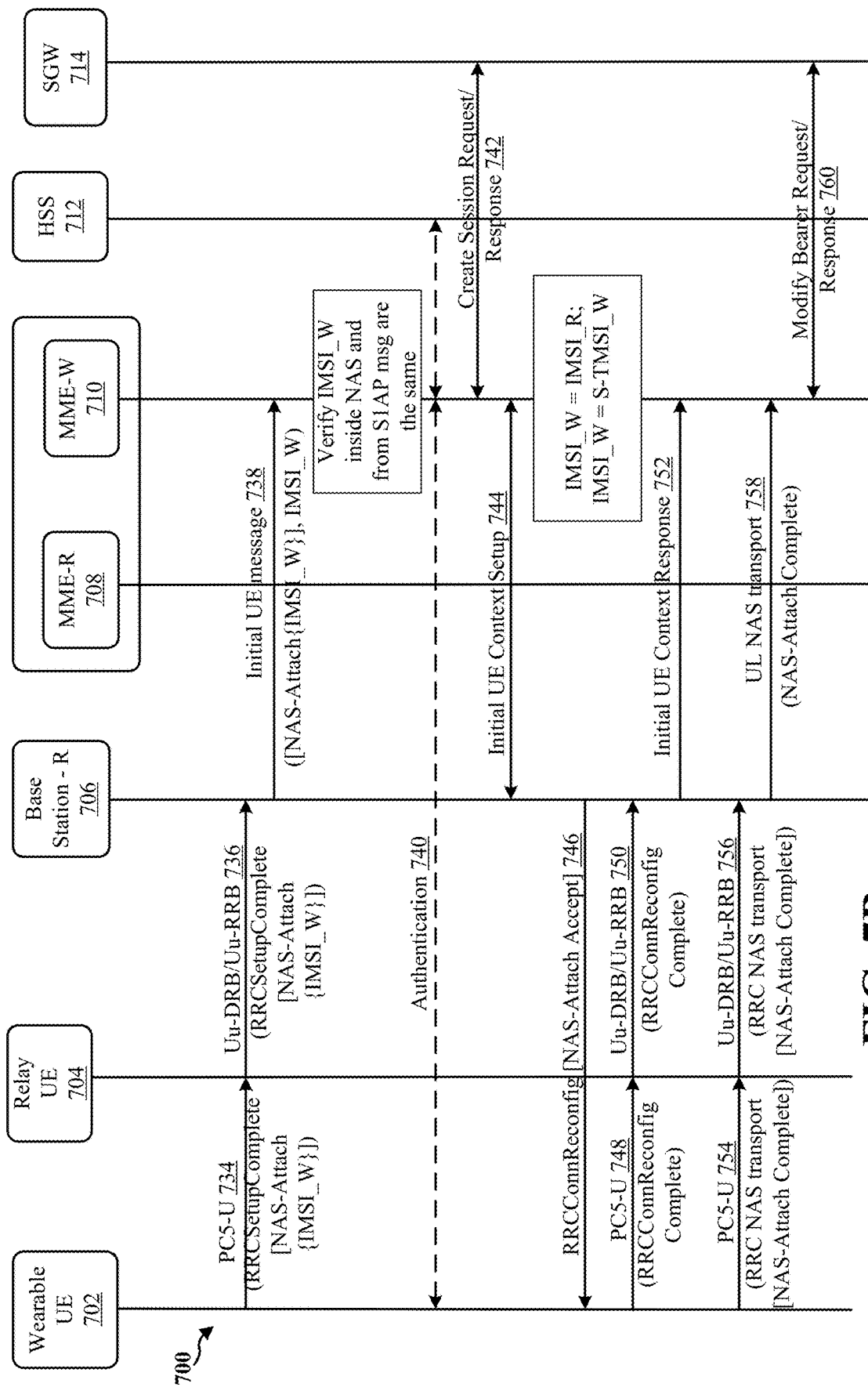

FIGS. 7A and 7B illustrate a flow diagram 700 for an initial attach procedure of the wearable UE 702 to a base station 706 via a relay UE 704.

As illustrated in FIG. 7A, relay UE 704 may attach 716 to the network. For example, relay UE 704 may attach 716 to the network by performing an attach procedure. In an aspect, an S-TMSI may be allocated for the relay UE 704 (e.g., S-TMSI R) and stored in MME-R 708 (e.g., an MME associated with the relay UE 704). The MME-R 708 may communicate with HSS 712 that pairs an IMSI associated with the wearable UE 702 (e.g., IMSI_W) with and IMSI associated with the relay UE 704 (e.g., IMSI_R). For example, the MME-R 708 may send information associated with the S-TMSI to the HSS 712 that associates the S-TMIS allocated for the relay UE 704 with the IMSI associated with the wearable deice 702. In addition, the base station 706 (e.g., a base station communicating with one or more of the relay UE 704 and/or the wearable UE 702) may store a globally unique mobility management entity identifier (GUMMEI) associated with the relay UE 704 (e.g., GUMMEI_R) and an MME UE S1AP identification associated with the relay UE 704 (e.g., MME UE S1AP ID_R). In one aspect, MME-R 708 may store pairing information associated with IMSI_W and IMSI_R, and information that stores the IMSI_R as being associated with the S-TMSI_R.

Still referring to FIG. 7A, wearable UE 702 may send a pairing request 718 (e.g., PC5-D using LTE-D discovery message) to the relay UE 704. In an aspect, the pairing request 718 may contain a NAS message that includes the IMSI_W associated with the wearable UE 702, and L2 ID_W associated with the wearable UE 702, and/or a token that distinguishes the wearable UE 702 from other UEs broadcasting a pairing request. The relay UE 704 may transmit the pairing request 720 to base station 706. The pairing request 720 may be a RRC SidelinkUEInformation (SLUEInfo) message. In an aspect, the pairing request 720 may include the NAS message, IMSI_W, S-TMSI_R, L2 ID_W, and L2 ID_R.

In an alternative embodiment, when the pairing request 718 is transmitted using the unlicensed spectrum, the relay UE 704 may perform a CCA to determine if the channel and/or resources are available for relay operation. In addition, the relay UE 704 may communicate information associated with the CCA to the base station 706, so that the base station 706 may determine if the channel and/or resources should be used.

The base station 706 may transmit a new S1AP message/ UL NAS transport message 722 to MME-W 710. In an aspect, the new S1 AP message/UL NAS transport message 722 may include IMSI_W and S-TMSI_R. The MME-W 710 may transmit a pair check 724 to MME_R 708. In an aspect, the pair check 724 may include IMSI_W and S-TMSI_R.

The MME-R 708 may verify the wearable UE 702 and the relay UE 704 are paired using the IMSI_W and the S-TMSI_R in the pair check 724 and the IMSI_R and S-TMSI_R stored at the MME-R 708. The MME-R 708 may transmit a pairing acknowledgement 726 to the MME-W 710 when the pairing is verified. The pairing acknowledgement 726 may include the IMSI_R. The MME-R 708 may also transmit a pairing acknowledgement 728 (e.g., new S1 AP message/DL NAS transport) to the base station 706. In an aspect, the pairing acknowledgement 728 may include the IMSI_W.

The base station 706 may transmit an RRC connection reconfiguration (RRCConnReconfig) message 730 to the relay UE 704. In an aspect, the RRCConnReconfig message 730 may include the L2 ID_W. In addition, the base station 706 may transmit pairing acknowledgement 732 (e.g., a new message/RRC connection setup message) to the wearable UE 702. In an aspect, the pairing acknowledgement 732 may include the L2 ID_R and a C-RNTI for the wearable UE 702 (e.g., C-RNTI_W). In an additional aspect, the base station 706 may set up a signaling radio bearer (SRB1) for the wearable UE 702. If the base station 706 received information related to a CCA from the relay UE 704, the base station 706 may transmit information associated with which channel and/or resources should be used by the relay UE 704 and/or the wearable UE 702. The information may be transmitted with the RRC connection reconfiguration message 730 and/or the pairing acknowledgement.

Referring now to FIG. 7B, the wearable UE 702 may transmit a NAS attach request 734 (e.g., a RRC setup complete message) to the relay UE 704. In an aspect, the NAS attach request 734 may be a PC5-U message.

The relay UE 704 may transmit the NAS attach request 736 (e.g., RRC connection setup complete message) to the base station 706. In aspect, the NAS attach request 736 may be a Uu-data radio bearer (Uu-DRB)/Uu-relay resource bearer (Uu-RRB) message. The Uu-RRB may be setup by the base station 706 after receiving the pairing acknowledgement, e.g. using the RRC connection reconfiguration message 730. The Uu-RRB may be used by the relay UE 704 for the forwarding of messages received from the wearable UE 702 to the base station 706.

The base station may transmit a NAS attach request 736 (e.g., initial UE message) to MME-W 710. In an aspect, the NAS attach request 736 may include the IMSI_W. The MME-W 710 may verify that the IMSI_W in the NAS attach request 736 is the same as the IMSI-W received in the NAS pairing request 722. Authentication 740 may occur between the MME-W 710 and the wearable UE 702 and/or HSS 712.

The SGW 714 and the MME-W 710 may create a session request/response 742. The MME-W 710 may transmit an initial UE context setup message 744 to the base station 706. In an aspect, the base station 706 may transmit a NAS attach accept message 746 to the wearable UE 702. Alternatively, the base station 706 may transmit the NAS attach accept message 746 to the relay UE 704 which may forward the NAS attach accept message to the wearable UE 702.

The wearable UE 702 may transmit a RRC connection reconfiguration (RRCConnReconfig) complete message 748 to the relay UE 704. In an aspect, the RRCConnReconfig complete message 748 may be a PC5-U message. The Relay UE 704 may transmit the RRCConnReconfig complete message 750 to the base station 706. In an aspect, the RRCConnReconfig complete message 750 may include a Uu-DRB/Uu-RRB message. The base station 706 may transmit an initial UE context response 752 to MME-W 710.

In an aspect, the wearable UE 702 may transmit a NAS attach complete message 754 to the relay UE 704. In an aspect, the NAS attach complete message 754 may be an RRC NAS transport message. In an additional aspect, the NAS attach complete message 754 may be a PC5-U message. The relay UE 704 may transmit NAS attach complete message 756 to the base station 706. In an aspect, the NAS attach complete message 756 may be an RRC NAS transport message. In an additional aspect, the NAS attach complete message 756 may be a Uu-DRB/Uu-RRB message. The base station 706 may transmit the NAS attach complete message 758 to the MME-W 710. In an aspect, the NAS attach complete message 758 may be an UL NAS transport message. The MME-W 710 and the SGW 714 may then communicate a modify bearer request/response 760.

Figure 8A:
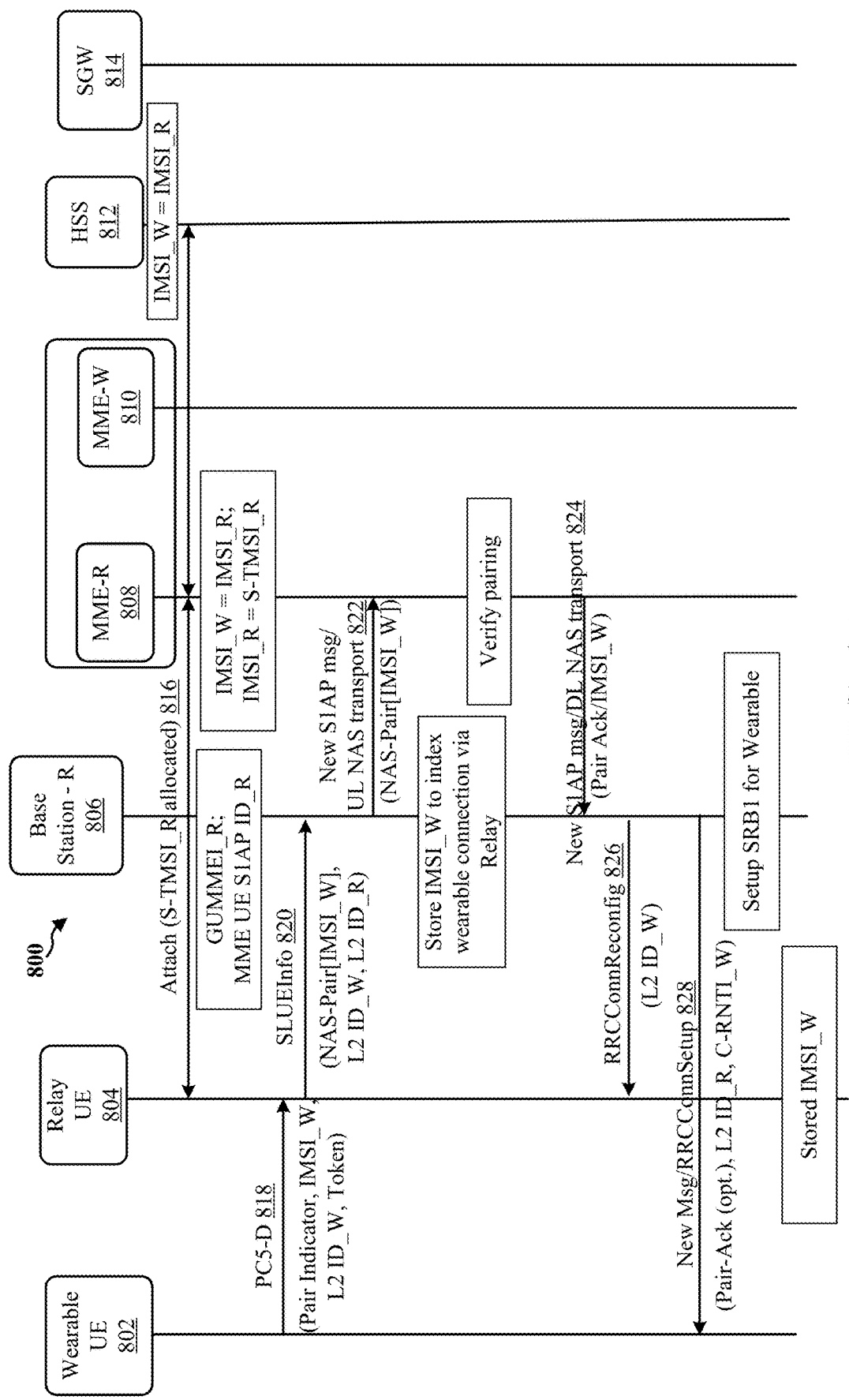
FIGS. 8A and 8B are a diagram of an exemplary data flow in accordance with an aspect of the present disclosure.
Figure 8B:
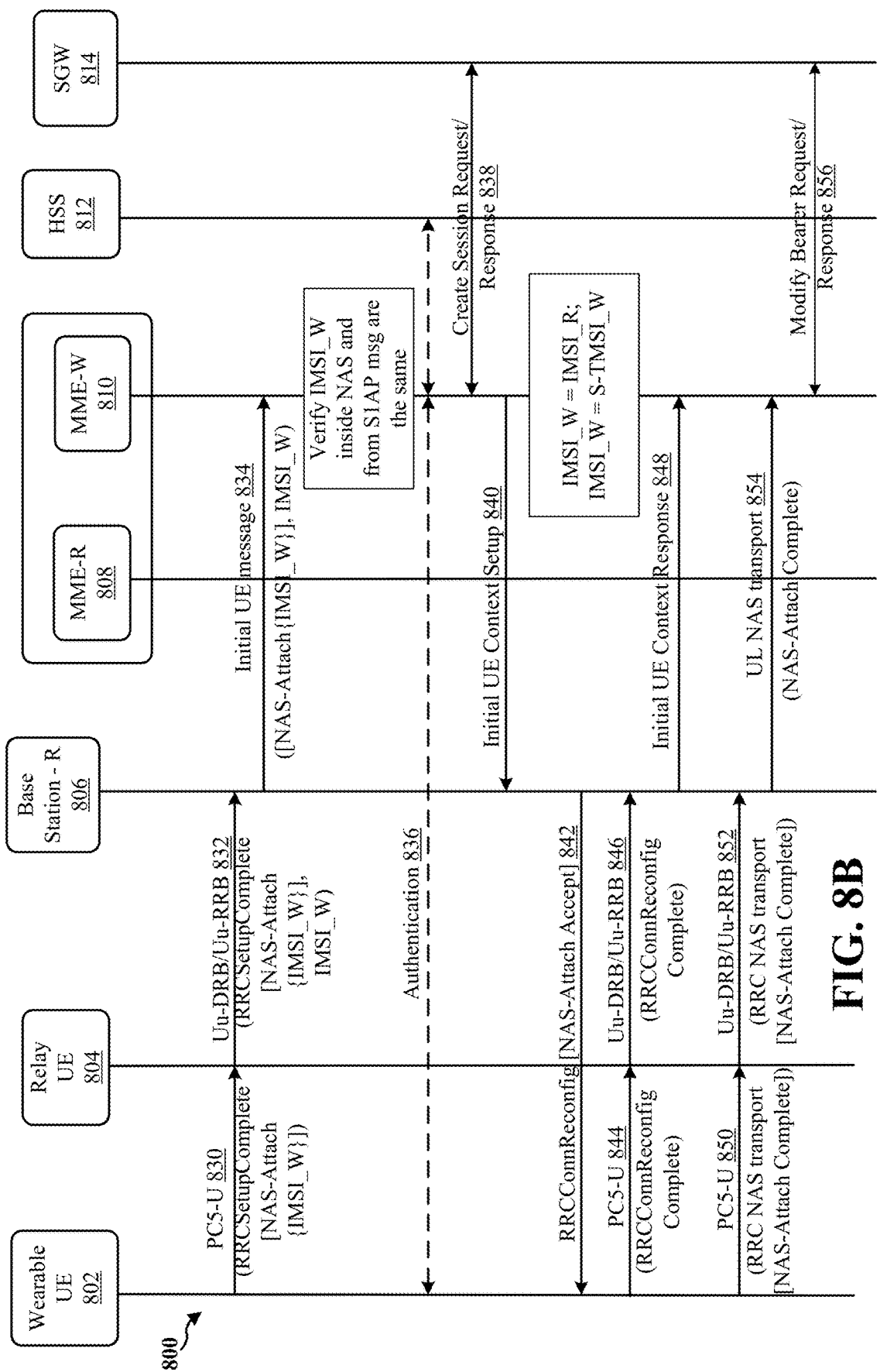

FIGS. 8A and 8B illustrate a flow diagram 800 for an initial attach procedure of the wearable UE 802 to base station 806 via a relay UE 804.

As illustrated in FIG. 8A, relay UE 804 may attach 816 to the network. In an aspect, an S-TMSI allocated for the relay UE 804 (e.g., S-TMSI_R) may be communicated to MME-R 808 (e.g., an MME associated with the relay UE 804). The MME-R 808 may communicate with HSS 812 that pairs an IMSI associated with the wearable UE 802 (e.g., IMSI_W) with and IMSI associated with the relay UE 804 (e.g., IMSI_R). In addition, the base station 806 (e.g., a base station communicating with one or more of the relay UE 804 and/or the wearable UE 802) may store a globally unique mobility management entity identifier (GUMMEI) associated with the relay UE 804 (e.g., GUMMEI_R) and an MME UE S1AP identification associated with the relay UE 804 (e.g., MME UE S1AP ID_R). In one aspect MME-R 808 may store pairing information associated with IMSI_W and IMSI_R, and information that stores the IMSI_R as being associated with the S-TMSI_R.

Still referring to FIG. 8A, wearable UE 802 may send a pairing indicator 818 (PC5-D) to the relay UE 804. In an aspect, the pairing indicator 818 may include the IMSI_W associated with the wearable UE 802, and L2 ID_W associated with the wearable UE 802, and/or a token that distinguishes the wearable UE 802 from other UEs broadcasting a pairing indicator. The relay UE 804 may generate a NAS pairing request that includes IMSI_W. The relay UE 804 may transmit the pairing request 820 to base station 806. The pairing request 820 may be a SLUEInfo message. In an aspect, the pairing request 820 may include IMSI_W, L2 ID_W, and L2 ID_R.

The base station 806 may transmit a new S1AP message/ UL NAS transport message 822 to MME-R 808. In an aspect, the new S1AP message/UL NAS transport message 822 may include IMSI_W. The MME-R 808 may verify the pairing of the wearable UE 802 and the relay UE 804 using the IMSI_W and the IMSI_R stored at the MME-R 808. The MME-R 808 may transmit a pairing acknowledgement 824 (e.g., new S1AP message/DL NAS transport) to the base station 806. In an aspect, the pairing acknowledgement 824 may include the IMSI_W.

The base station 806 may transmit an RRC connection reconfiguration (RRCConnReconfig) message 826 to the relay UE 804. In an aspect, the RRCConnReconfig message 826 may include the L2 ID_W. In addition, the base station 806 may transmit pairing acknowledgement 828 (e.g., a new message/RRC connection setup message) to the wearable UE 802. In an aspect, the pairing acknowledgement 828 may include the L2 ID_R and a C-RNTI for the wearable UE 802 (e.g., C-RNTI_W). In an additional aspect, the base station 806 may set up a signaling radio bearer (SRB1) for the wearable UE 802.

Referring now to FIG. 8B, the wearable UE 802 may transmit a NAS attach request 830 (e.g., RRC setup complete message) to the relay UE 804. In an aspect, the NAS attach request 830 may be a PC5-U message.

The relay UE 804 may transmit the NAS attach request 832 (e.g., RRC connection setup complete message) to the base station 806. In aspect, the NAS attach request 832 may be a Uu-DRB/Uu-RRB message.

The base station 806 may transmit a NAS attach request 834 (e.g., initial UE message) to MME-W 810. In an aspect, the NAS attach request 834 may include the IMSI_W. The MME-W 810 may verify that the IMSI_W in the NAS attach request 834 is the same as the IMSI_W received in the NAS pairing request 822 received at the MME-R 808.

Authentication 836 may occur between the MME-W 810 and the wearable UE 802 and/or HSS 812. The SGW 814 and the MME-W 810 may create a session request/response 838. The MME-W 810 may transmit an initial UE context setup message 840 to the base station 806. In an aspect, the base station 806 may transmit a NAS attach accept message 842 to the wearable UE 802. Alternatively, the base station 806 may transmit the NAS attach accept message 842 to the relay UE 804 which may forward the message to the wearable UE 802.

The wearable UE 802 may transmit a RRC connection reconfiguration (RRCConnReconfig) complete message 844 to the relay UE 804. In an aspect, the RRCConnReconfig complete message 844 may be a PC5-U message. The relay UE 804 may transmit the RRCConnReconfig complete message 846 to the base station 806. In an aspect, the RRCConnReconfig complete message 846 may include a Uu-DRB/Uu-RRB message. The base station 806 may transmit an initial UE context response 848 to MME-W 810.

In an aspect, the wearable UE 802 may transmit a NAS attach complete message 850 to the relay UE 804. In an aspect, the NAS attach complete message 850 may be an RRC NAS transport message. In an additional aspect, the NAS attach complete message 850 may be a PC5-U message. The relay UE 804 may transmit NAS attach complete message 852 to the base station 806. In an aspect, the NAS attach complete message 852 may be an RRC NAS transport message. In an additional aspect, the NAS attach complete message 852 may be a Uu-DRB/Uu-RRB message. The base station 806 may transmit the NAS attach complete message 854 to the MME-W 810. In an aspect, the NAS attach complete message 854 may be an UL NAS transport message. The MME-W 810 and the SGW 814 may then communicate a modify bearer request/response 856.

Figure 9A:
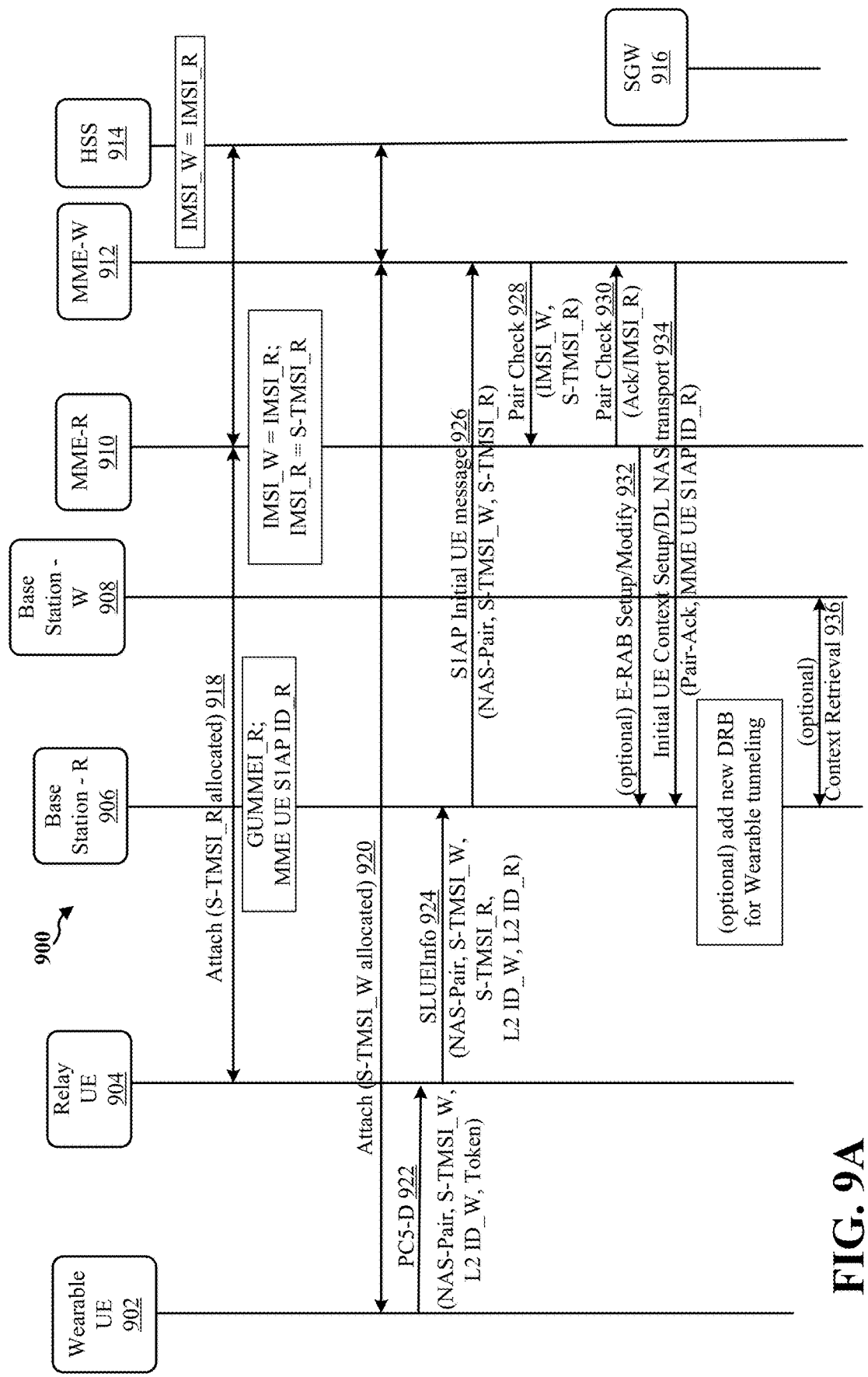
FIGS. 9A and 9B are a diagram of an exemplary data flow in accordance with an aspect of the present disclosure.
Figure 9B:
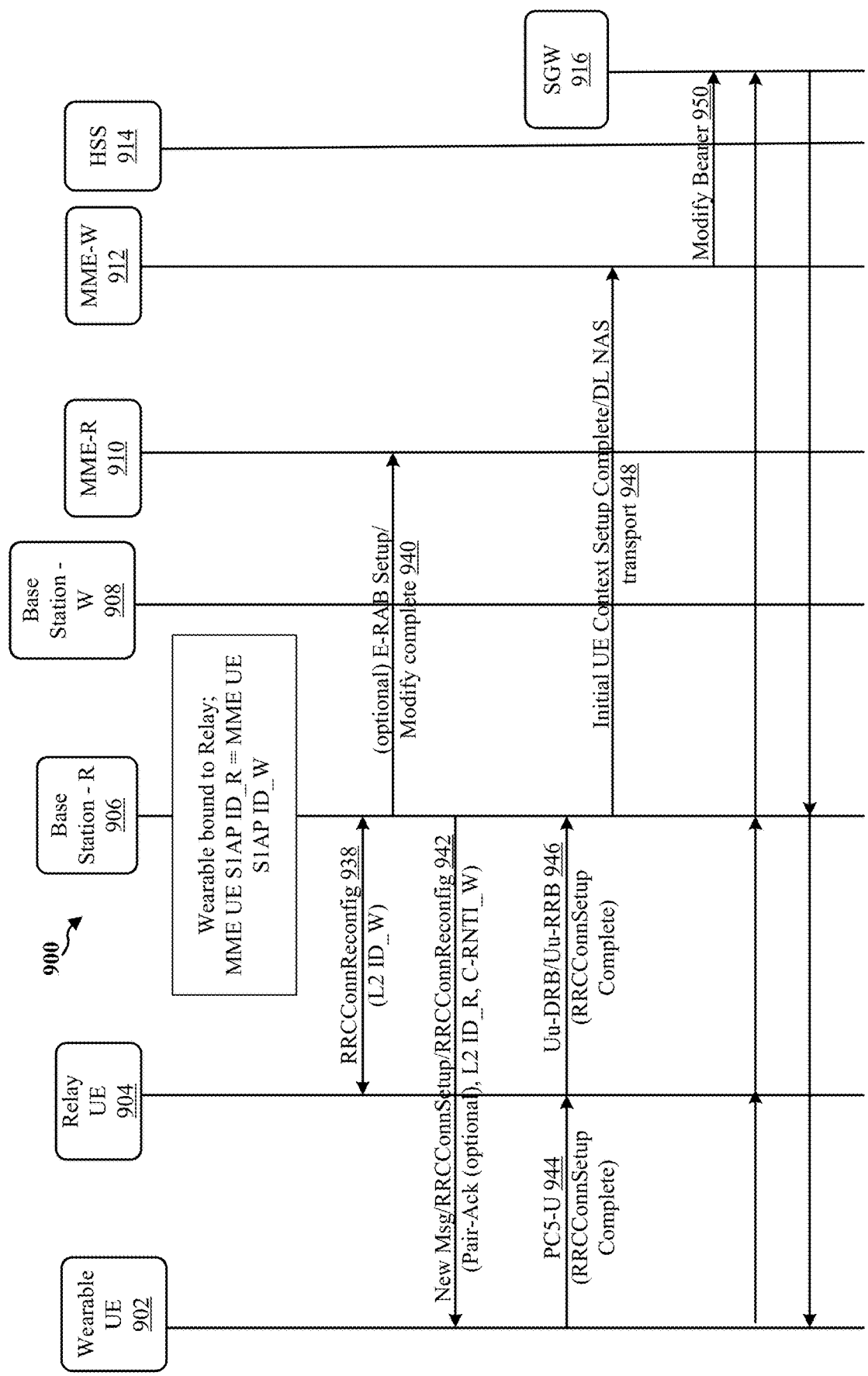

FIGS. 9A and 9B illustrate a flow diagram 900 of an attach procedure for a wearable UE 1002 that has already performed an initial attach procedure attached to the network. In the example embodiment illustrated in FIGS. 9A and 9B, the base station 906 may not store the S-TMSI of wearable UE 902 and/or relay UE 904 (e.g., the S-TMISs are not part of S1-AP msg contents). The attach procedure may be the attach procedure used when the wearable UE 902 is in IDLE mode or when session continuity is not supported by the network.

As illustrated in FIG. 9A, relay UE 904 may attach 918 to the network. In an aspect, an S-TMSI allocated for the relay UE 904 (e.g., S-TMSI_R) may be communicated to MME-R 910 (e.g., an MME associated with the relay UE 904). The MME-R 910 may communicate with HSS 914 that pairs an IMSI associated with the wearable UE 902 (e.g., IMSI_W) with and IMSI associated with the relay UE 904 (e.g., IMSI_R). In addition, the base station 906 (e.g., a base station communicating with one or more of the relay UE 904 and/or the wearable UE 902) may store a globally unique mobility management entity identifier (GUMMEI) associated with the relay UE 904 (e.g., GUMMEI_R) and an MME UE S1AP identification associated with the relay UE 904 (e.g., MME UE S1AP ID_R). In one aspect, MME-R 910 may store pairing information associated with IMSI_W and IMSI_R, and information that stores the IMSI_R as being associated with the S-TMSI_R.

Still referring to FIG. 9A, wearable UE 902 may have previously performed an attach procedure 920 to the network (e.g., using a procedure described supra with respect to FIGS. 7A, 7B, 8A, and/or 8B). In an aspect, an S-TMSI allocated for the wearable UE 902 (e.g., S-TMSI_R) may be communicated to MME-W 912 (e.g., an MME associated with the wearable UE 902) and/or HSS 914.

In an aspect, wearable UE 902 may wish to attach to the network again. Here, the wearable UE 902 may transmit a pairing request 922 (PC5-D) to the relay UE 904. In an aspect, the pairing request 922 may be a NAS message (or reuse service message) that includes the S-TMSI_W associated with the wearable UE 902, and L2 ID_W associated with the wearable UE 902, and/or a token that distinguishes the wearable UE 902 from other UEs broadcasting a pairing request. The pairing request 922 may include a scheduling request (SR) (e.g., four bytes), S-TMSI (e.g., five bytes), L2 ID_W (e.g., three bytes). Thus, the pairing request 922 may be twelve bytes transmitted using PC5-D protocol stack.

The relay UE 904 may transmit the pairing request 924 to base station 906. The pairing request 924 may be a SLUEInfo message. In an aspect, the pairing request 924 may include S-TMSI_W, S-TMSI_R, L2 ID_W, and L2 ID_R. In an example embodiment, the pairing request 924 may be transmitted as two messages, i.e. a normal SRB2 RRC msg to carry NAS, and a SLUEInfo to carry additional info.

The base station 906 may transmit a new S1AP message/ UL NAS transport message 926 to MME-W 912. In an aspect, the new S1 AP message/UL NAS transport message 926 may include S-TMSI_W and S-TMSI_R. The MME-W 912 may transmit a pair check 928 to MME_R 910. In an aspect, the pair check 928 may include IMSI_W and S-TMSI_R.

The MME-R 910 may verify the pairing of the wearable UE 902 and the relay UE 904 using the IMSI_W and the S-TMSI_R in the pair check 928 and the IMSI_R and S-TMSI_R stored at the MME-R 910. The MME-R 910 may transmit a pairing acknowledgement 930 to the MME-W 912 when the pairing is verified. The pairing acknowledgement 930 may include the IMSI_R.

In an aspect, the MME-R may also transmit an E-UTRAN radio access bearer (E-RAB) setup/modify message 932 to base station 906. The MME-W 912 may transmit a pairing acknowledgement 934 (e.g., initial UE context setup/DL NAS transport message) to the base station 906. In an aspect, the RRCConnReconfig message 934 may include the MME UE S1AP ID_R. In addition, the base station 706 may add a new DRB for the wearable UE 902 to tunnel messages to the base station 906 via the relay UE 904. In another aspect, the base station 906 and the base station 908 may perform a context retrieval 936.

Referring now to FIG. 9B, the base station 906 may store information that pairs the wearable UE 902 to the relay UE 904. For example, the base station 906 may pair the MME UE S1AP ID_R and the MME UE S1AP ID_W. In addition, the relay UE 904 and the base station 906 may perform RRC connection reconfiguration 938. The RRC connection reconfiguration 938 may include transmitting messages that include L2 ID_W.

In an aspect, the base station 906 may transmit an E-RAB setup/modify complete message 940 to MME-R 910. The base station 906 may also transmit a pairing acknowledgement 942 to the wearable UE 902. For example, the pairing acknowledgement 942 may be a new RRC connection setup/reconfiguration message. In an aspect, the pairing acknowledgement 942 may include the L2 ID_R and the C-RNTI_W.

The wearable UE 902 may transmit an RRC connection setup complete message 944 to the relay UE 904. In an aspect, the RRC connection setup complete message 944 may be a PC5-U message. The relay UE 904 may transmit an RRC connection setup complete message 946 to the base station 906. In an aspect, the base station 906 may transmit an initial UE context setup complete/DL NAS transport message 948 to MME-W 912. The MME-W 912 may transmit a modify bearer message 950 to SGW 916.

Figure 10A:
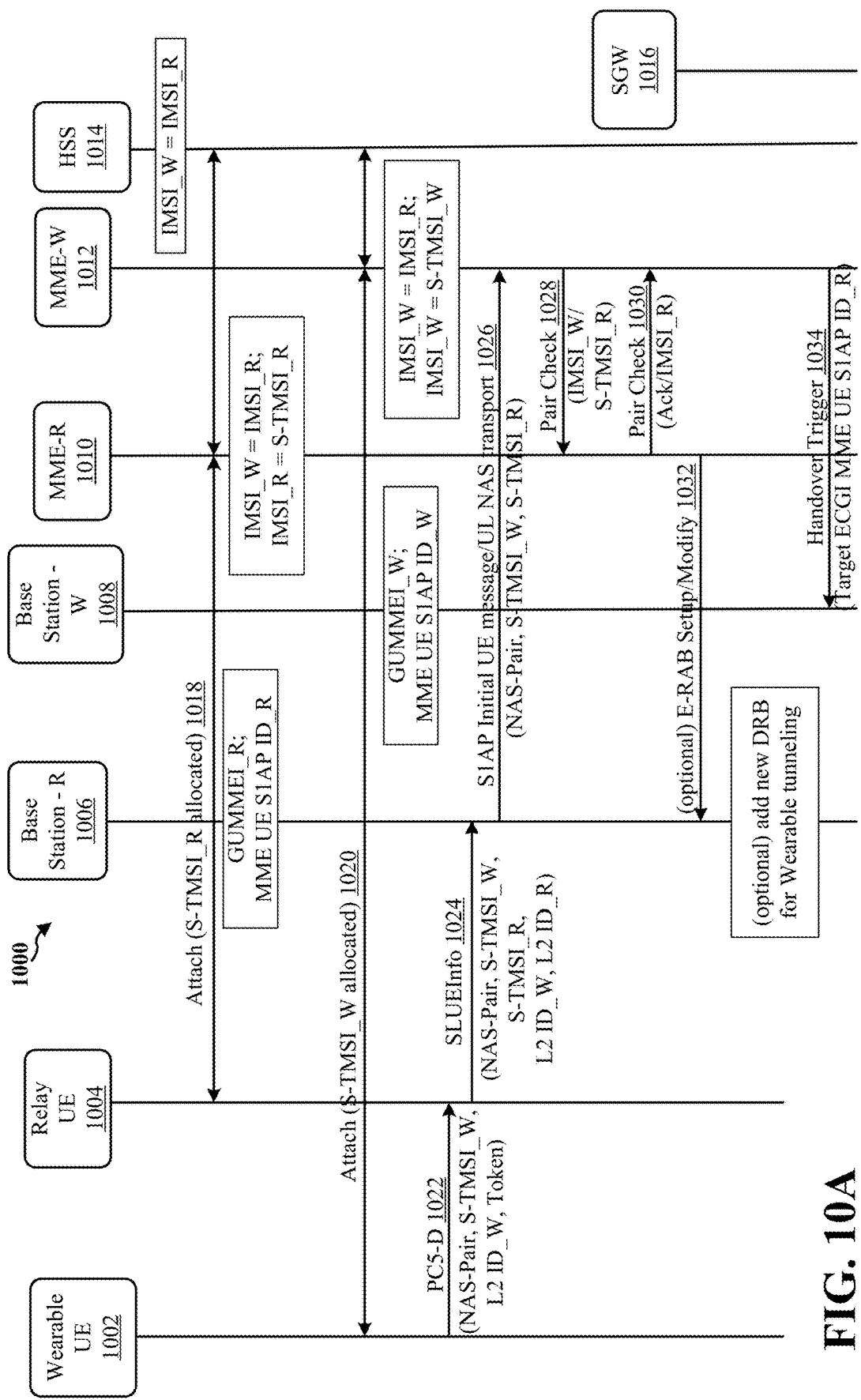
FIGS. 10A and 10B are a diagram of an exemplary data flow in accordance with an aspect of the present disclosure.
Figure 10B:
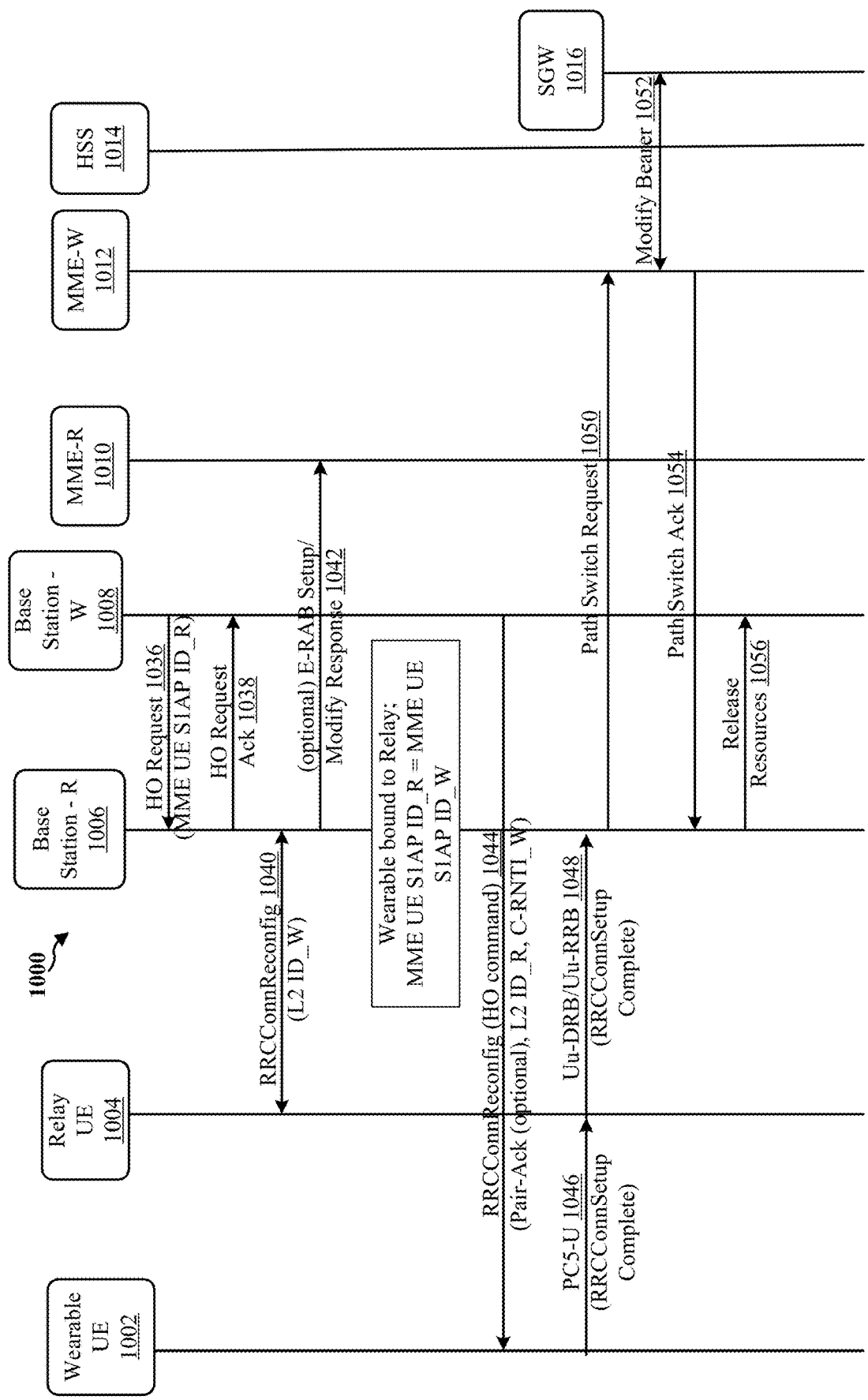

FIGS. 10A and 10B illustrate a flow diagram 1000 an attach procedure/handover procedure for a wearable UE 1002 that has already performed an initial attach procedure attached to the network. In the example embodiment illustrate in FIGS. 10A and 10B, the wearable UE 1002 is in connected mode but may have a different base station than the relay UE 1004.

As illustrated in FIG. 10A, relay UE 1004 may attach 1018 to the network. In an aspect, an S-TMSI allocated for the relay UE 1004 (e.g., S-TMSI_R) may be communicated to MME-R 1010 (e.g., an MME associated with the relay UE 1004). The MME-R 1010 may communicate with HSS 1014 that pairs an IMSI associated with the wearable UE 1002 (e.g., IMSI_W) with and IMSI associated with the relay UE 1004 (e.g., IMSI_R). In addition, the base station 1006 (e.g., a base station communicating with one or more of the relay UE 1004 and/or the wearable UE 1002) may store a GUMMEI associated with the relay UE 1004 (e.g., GUMMEI_R) and an MME UE S1AP identification associated with the relay UE 1004 (e.g., MME UE S1AP ID_R). In one aspect, MME-R 1010 may store pairing information associated with IMSI_W and IMSI_R, and information that stores the IMSI_R as being associated with the S-TMSI_R.

Still referring to FIG. 10A, wearable UE 1002 may have previously performed an attach procedure 1020 to the network (e.g., using a procedure describe supra with respect to FIGS. 7A, 7B, 8A, and/or 8B). In an aspect, an S-TMSI allocated for the wearable UE 1002 (e.g., S-TMSI_R) may be communicated to MME-W 1012 (e.g., an MME associated with the wearable UE 1002) and/or HSS 1014.

In an aspect, wearable UE 1002 may wish to attach to the network again. Here, the wearable UE 1002 may transmit a pairing request 1022 (PC5-D) to the relay UE 1004. In an aspect, the pairing request 1022 may be a NAS message that includes the S-TMSI_W associated with the wearable UE 1002, and L2 ID_W associated with the wearable UE 1002, and/or a token that distinguishes the wearable UE 1002 from other UEs broadcasting a pairing request. The relay UE 1004 may transmit the pairing request 1024 to base station 1006. The pairing request 1024 may be a SLUEInfo message. In an aspect, the pairing request 1024 may include S-TMSI_W, S-TMSI_R, L2 ID_W, and L2 ID_R.

The base station 1006 may transmit a new S1AP message/UL NAS transport message 1026 to MME-W 1012. In an aspect, the new S1AP message/UL NAS transport message 926 may include S-TMSI_W and S-TMSI_R. The MME-W 1012 may transmit a pair check 1028 to MME_R 1010 in response to receiving the new S1AP message/UL NAS transport message 1026. In an aspect, the pair check 1028 may include IMSI_W and S-TMSI_R.

The MME-R 1010 may verify the pairing of the wearable UE 1002 and the relay UE 1004 using the IMSI_W and the S-TMSI_R in the pair check 1028 and the IMSI_R and S-TMSI_R stored at the MME-R 1010. The MME-R 1010 may transmit a pairing acknowledgement 1030 to the MME-W 1012 when the pairing is verified. The pairing acknowledgement 1030 may include the IMSI_R.

In an aspect, the MME-R 1010 may also transmit an E-RAB setup/modify message 1032 to base station 1006. The base station 1006 may add a new DRB for tunneling of messages from the wearable UE 1002 to the base station 1006 via the relay UE 1004. In addition, the MME-W 1012 may transmit a handover trigger 1034 to the base station 1008 (e.g., a base station 1008 that will communicate with the wearable UE 1002).

Referring to FIG. 10B, the base station 1008 may transmit a handover request 1036 to base station 1006. In an aspect, the handover request 1036 may include MME UE S1AP ID_R. The base station 1006 may transmit a handover acknowledgment 1038 to base station 1008.

In addition, the relay UE 1004 and the base station 1006 may perform a RRC connection reconfiguration 1040. The RRC connection reconfiguration 1040 may include transmitting messages that include L2 ID_W. In an aspect, the base station 1006 may store information that pairs that wearable UE 1002 to the relay UE 1004. For example, the base station 1006 may pair MME UE S1AP ID_R with MME UE S1AP ID_W.

In an aspect, the base station 1008 may transmit a handover command 1044 to the wearable UE 1002. For example, the handover command 1044 may be an RRC connection reconfiguration message that includes L2 ID_R and C-RNTI_W. In addition, the handover command 1044 may include a pairing acknowledgement.

The wearable UE 1002 may transmit an RRC connection setup complete message 1046 to the relay UE 1004. In an aspect, the RRC connection setup complete message 1046 may be a PC5-U message. The relay UE 1004 may transmit an RRC connection setup complete message 1048 to the base station 1006. In an aspect, the base station 1006 may transmit a path switch request 1050 to MME-W 1012. The MME-W 1012 may transmit a path switch acknowledgement to the base station 1006. The MME-W 1012 and the SGW 1016 may perform a modify bearer procedure 1052. In addition, the base station 1006 may transmit a release resources message 1056 to the base station 1008. The base station 1008 may now communicate with wearable UE 1002.

The flow diagrams 700, 800, 900, and 1000 discussed supra with respect to FIGS. 7A, 7B, 8A, 8B, 9A, 9B, 10A, and 10B are illustrated with the unidirectional system architecture 520 of FIG. 5B for simplicity. However, the flow diagrams 700, 800, 900, 1000 may be implemented using the bi-directional system architecture 500 illustrated in FIG. 5A. For example, if bi-directional system architecture is used the relay UE and/or the wearable UE may also receive data over a device-to-device (D2D) communication. In an aspect, the wearable UE may perform direct discovery before transmitting a pairing request. After direct discovery, the wearable may send the pairing request over PC5-U/S (i.e., using D2D communication). The response from the base station, e.g. the RRCConnSetup, RRCConnReconfig, are tunneled to the relay UE, and sent over PC5-U/S back to the wearable UE.

Figure 11:
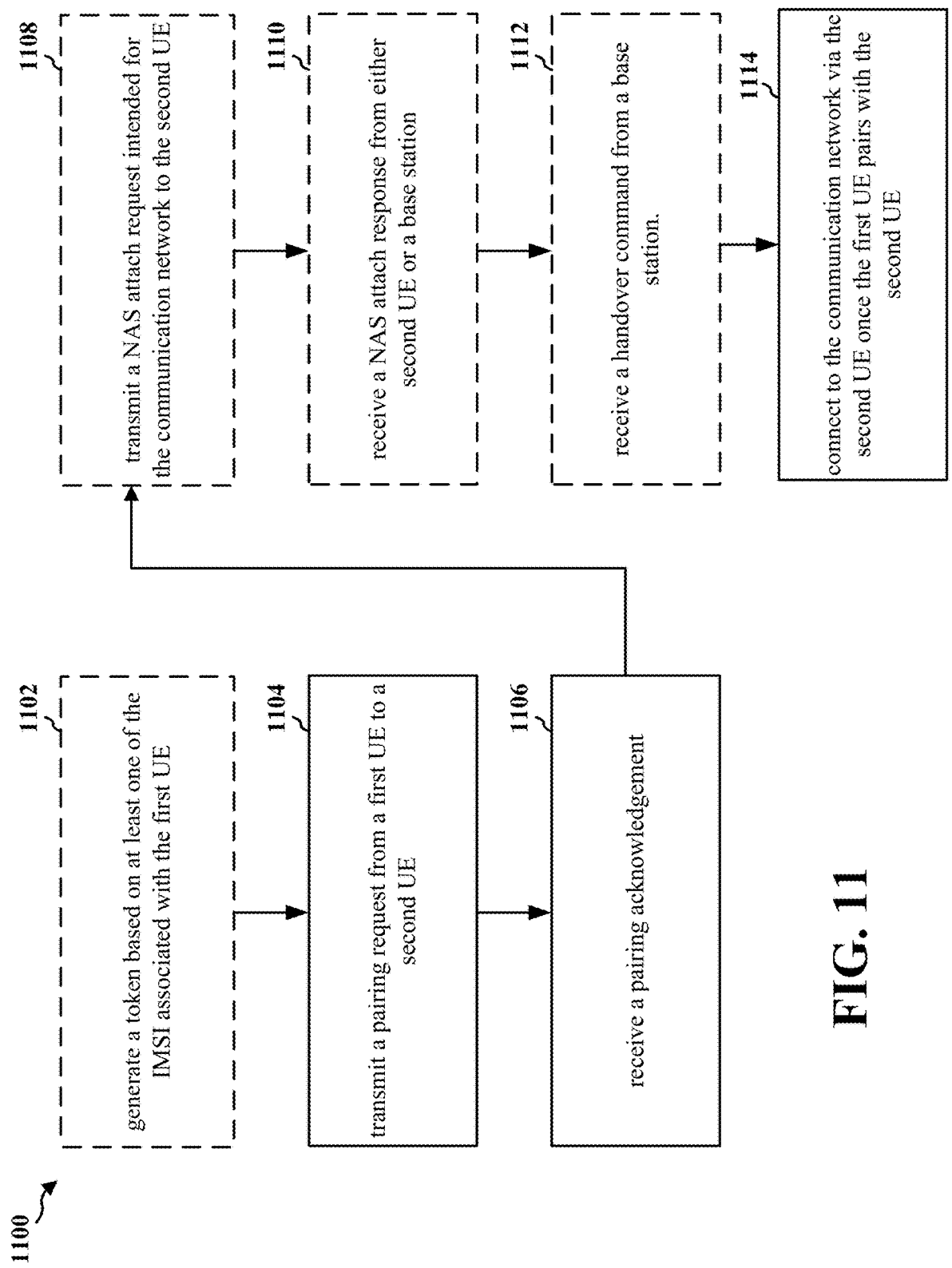
FIG. 11 is a flowchart of a method of wireless communication.

FIG. 11 is a flowchart 1100 of a method of wireless communication. The method may be performed by a first UE (e.g., UE 192, 350 402, 702, 802, 902, 1002, the apparatus 1202/1202') in communication with a second UE (e.g., the second UE 404, relay UE 704, relay UE 804, relay UE 904, relay UE 1004). In FIG. 11, optional operations are indicated with dashed lines.

At 1102, the first UE may generate a token based on at least the IMSI associated with the first UE. For example, referring to FIG. 4, in some instances multiple wearable UEs may be broadcasting pairing requests. By including a token in the pairing request 410, the second UE 404 may be able to determine that pairing request 410 is transmitted by a UE (e.g., first UE 402) authorized to pair with the second UE 404. The first UE 402 may generate the token 480 based on at least one of the IMSI associated with the first UE 402, an IMSI associated with the second UE 404, stored information based on a network subscription, manually entered information, or a value of a combination of at least one of the foregoing.

At 1104, the first UE may transmit a pairing request from a first UE to a second UE. In one aspect, the pairing request may include the token. For example, referring to FIG. 4, the first UE 402 may transmit a pairing request 410 to second UE 404. The pairing request 410 may be intended for the communication network (e.g., for an MME and/or HSS). In one aspect, the pairing request 410 may include an identification associated with the first UE 402. For example, the identification associated with the first UE 402 may include at least one of an IMSI associated with the first UE 402, a S-TMSI associated with the first UE 402, a L2-ID associated with the first UE 402, security information that allows the communication network to verify an identity of the first UE 402, or a token that indicates to the second UE 404 that the pairing request 410 is transmitted by the first UE 402. In an example embodiment, the pairing request 410 may include a NAS pairing request. In another example embodiment, the pairing request 410 may include a PC5 interface protocol stack pairing request.

At 1106, the first UE may receive a pairing acknowledgement. In one aspect, the pairing acknowledgement may be received from the base station. In another configuration, the pairing acknowledgement may be received from the second UE. For example, referring to FIG. 4, when the network entity 408 determines that the first UE 402 is authorized to connect to the network, the base station 406 may receive a pairing acknowledgement 440 from the network entity 408. The pairing acknowledgement 440 may include, for example, the IMSI associated with the first UE 402. The base station 406 may then transmit the pairing acknowledgement 470 including a connection setup message directly to the first UE 402. Alternatively, the base station 406 may transmit the pairing acknowledgement 450 including the connection setup message to the second UE 404. The second UE 404 may then transmit the pairing acknowledgement 460 including the connection setup message to the first UE 402. In either case, the pairing acknowledgement including connection setup message 460, 470 received at the first UE 402 may include at least one of the L2-ID associated with the first UE 402, the L2-ID associated with the second UE 404, and/or a C-RNTI.

At 1108, the first UE may transmit a NAS attach request intended for the communication network to the second UE. For example, referring to FIG. 4, the first UE 402 may then transmit a NAS attach request 410 to the second UE 404. In one aspect, the NAS attach request 410 may be intended for the communications network. For example, the NAS attach request 410 may be transmitted as a PC5 interface protocol stack attach request.

At 1110, the first UE may receive a NAS attach response from either second UE or a base station. For example, referring to FIG. 4, when the network entity 408 determines that the IMSI in the NAS attach request 430 and the pairing request 430 are the same, a pairing acknowledgement 440 (e.g., a NAS attach response and/or UE context setup message) may be transmitted to the base station 406. The base station 406 may transmit the NAS attach response 470 to the first UE 402. Alternatively, the base station 406 may transmit the pairing acknowledgement 450 (e.g., NAS attach response) to the second UE 404. The second UE 404 may then transmit the NAS attach response 460 to the first UE 402. Once the NAS attach response 460, 470 is received by the first UE 402, the first UE 402 may connect to the communication network. In an example embodiment, the second UE 404 may establish a radio bearer between the second UE 404 and the base station 406 for forwarding messages received from the first UE 402 after receiving the pairing acknowledgement.

At 1112, the first UE may receive a handover command from a base station. For example, referring to FIG. 4, the base station 406 may receive a handover request 425 from base station 415. In an aspect, the handover request 425 may be associated with a handover procedure for the first UE 402 to begin communication with base station 415. When a handover acknowledgement 435 is received from base station 406, the base station 415 and/or base station 406 may transmit a handover command 470 to the first UE 402. The base station 415 may then begin communication 445 with the first UE 402.

At 1114, the first UE may connect to the communication network via the second UE once the first UE pairs with the second UE. For example, referring to FIG. 4, once the NAS attach response 460, 470 is received by the first UE 402, the first UE 402 may connect to the communications network. In an example embodiment, the second UE 404 may establish a radio bearer between the second UE 404 and the base station 406 for forwarding messages received from the first UE 402 after receiving the pairing acknowledgement.

Figure 12:
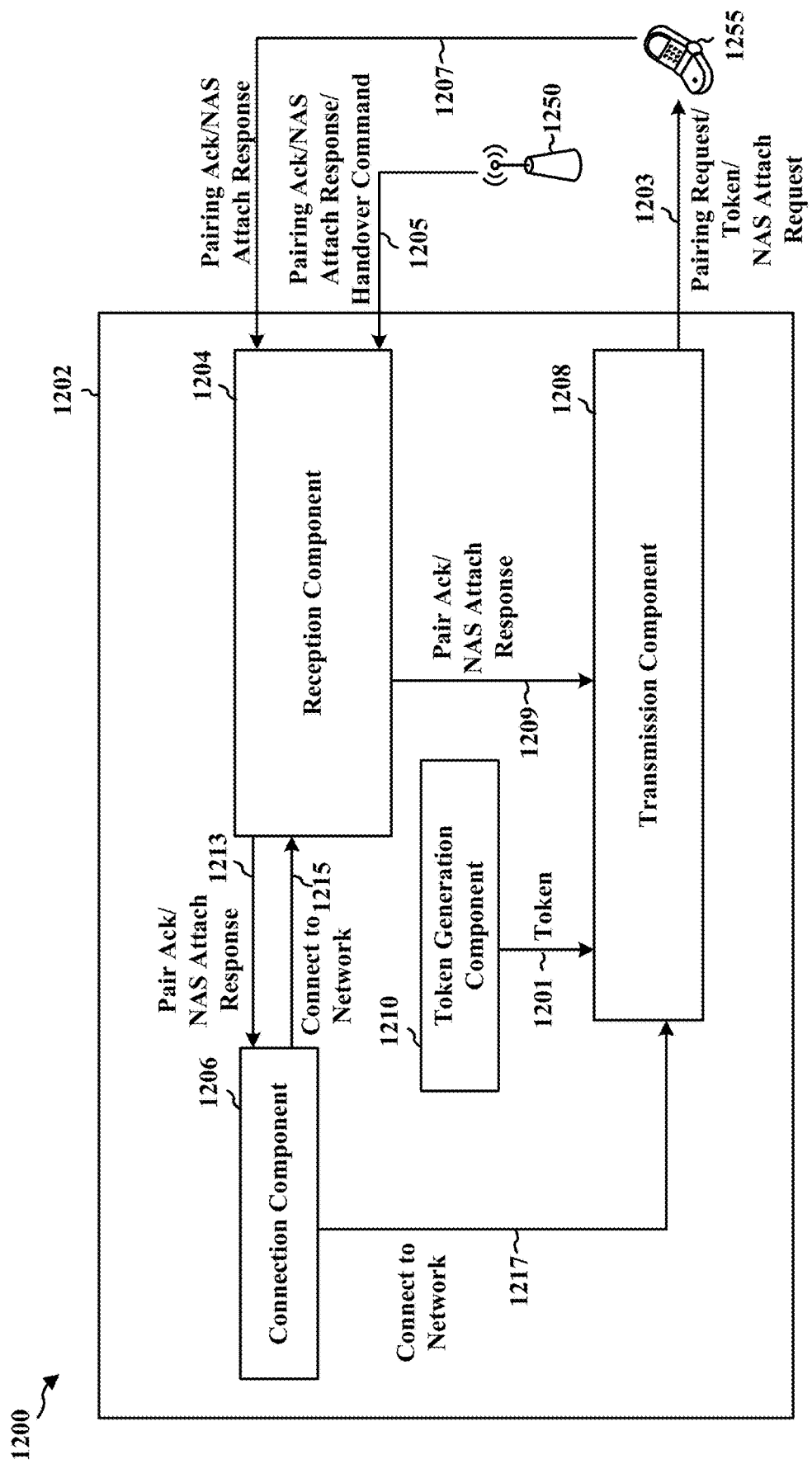
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202 (e.g., UE 192, 350 402, 702, 802, 902, 1002, the apparatus 1202'). The apparatus may be a first UE in communication with a second UE 1255 (e.g., UE 104, 182, 404, 704, 804, 904, 1004, the apparatus 1502/1502') and a base station 1250 (e.g., base station 102, 180, 406, 415, 706, 806, 906, 1006, eNB 310, the apparatus 1802/1802'). The apparatus may include a token generation component 1210 that may generate a token based on the IMSI associated with the apparatus and/or the IMSI associated with the second UE 1255. Token generation component 1210 may send a signal 1201 associated with the token to transmission component 1208. Transmission component 1208 may transmit a pairing request 1203 to the second UE. In one aspect, the pairing request may include the token. Reception component 1204 may receive a pairing acknowledgement 1205, 1207 from either the base station 1250 or the second UE 1255. Reception component 1204 may send a signal 1213 associated with the pairing acknowledgement to connection component 1206. Additionally and/or alternatively, reception component 1204 may send a signal 1209 associated with the pairing acknowledgement to transmission component 1208. Transmission component 1208 may transmit a NAS attach request 1203 intended for the communication network to the second UE 1255. Reception component 1204 may receive a NAS attach response 1207, 1205 from either the second UE 1255 or the base station 1250. Reception component 1204 may send a signal 1213 associated with the NAS attach response to connection component 1206. Additionally and/or alternatively, reception component 1204 may send a signal 1209 associated with the NAS attach response to transmission component 1208. Connection component 1206 may pair with the second UE 1255 when the signal 1213 associated with the NAS attach response is received.

Apparatus 1202 may connect to the communication network via the second UE 1255 when the connection component 1206 pairs with the second UE 1255. Connection component 1206 may send a signal 1215, 1217 to one or more of the reception component 1204 and/or the transmission component 1208 indicating that a connection is made with the network. Reception component 1204 may receive a handover command 1205 from the base station 1250 when apparatus 1202 is instructed to handover to a different base station (e.g., not illustrated in FIG. 12).

The apparatus may include additional components that perform each of the blocks of the algorithm in the aforementioned flowchart of FIG. 11. As such, each block in the aforementioned flowchart of FIG. 11 may be performed by a component and the apparatus may include one or more of the components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
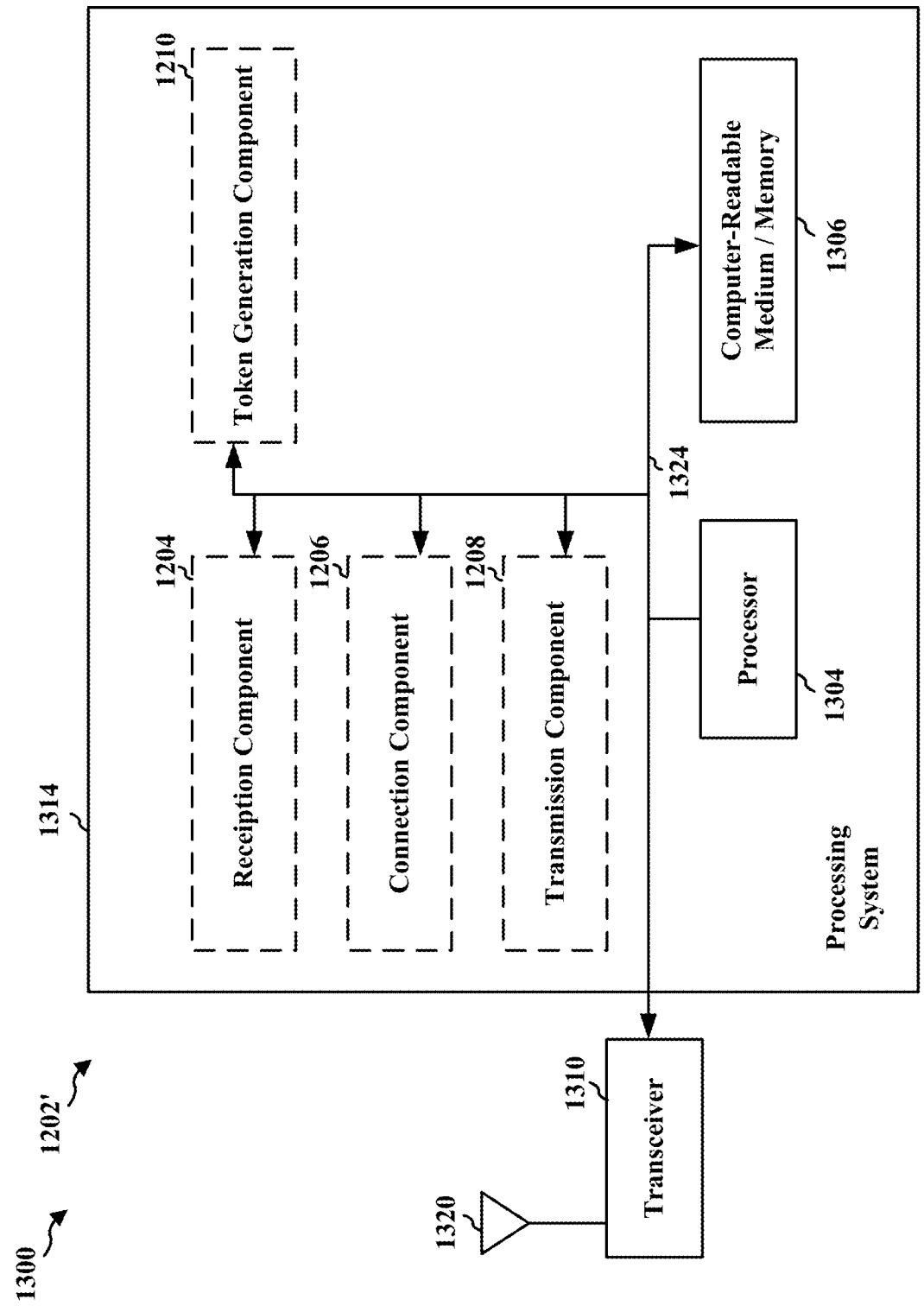
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1208, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication includes means for transmitting a pairing request from a first UE to a second UE, the pairing request intended for a communication network. In one aspect, the pairing request includes an identification associated with the first UE. For example, the identification associated with the first UE may include at least one of IMSI associated with the first UE, a S-TMSI associated with the first UE, a L2-ID associated with the first UE, or a token that indicates to the second UE that the pairing request is transmitted by the first UE. In another aspect, the pairing request may include a NAS pairing request. In an additional aspect, pairing request may include a PC5 interface protocol stack pairing request. In a further aspect, the pairing request includes security information allowing the communication network to verify an identity of the first UE. In addition, the apparatus 1202/1202' for wireless communication includes means for receiving a pairing acknowledgement, the pairing acknowledgement verifying the pairing of the first UE and the second UE. In an aspect, the pairing acknowledgement may include a connection setup message received from either the second UE or a base station, the connection setup message including at least one of a L2-ID associated with the second UE and a C-RNTI. Further, the apparatus 1202/1202' for wireless communication includes means for connecting to the communication network via the second UE once the first UE pairs with the second UE. Additionally, the apparatus 1202/1202' for wireless communication includes means for generating the token based on at least one of the IMSI associated with the first UE, an IMSI associated with the second UE, stored information based on subscription, manually entered information, or an obfuscated value of a combination of at least one of the foregoing. Moreover, the apparatus 1202/1202' for wireless communication includes means for transmitting a NAS attach request intended for the communication network to the second UE. In another aspect, the apparatus 1202/1202' for wireless communication includes means for receiving a NAS attach response from either second UE or a base station. In a further aspect, the first UE and the second UE communicate using one of a licensed spectrum, a unlicensed spectrum, device-to-device communications, wireless local area network communications, wireless personal area network communications or, short-range wireless communications. Furthermore, the apparatus 1202/1202' for wireless communication includes means for receiving a handover command from a base station. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14A:
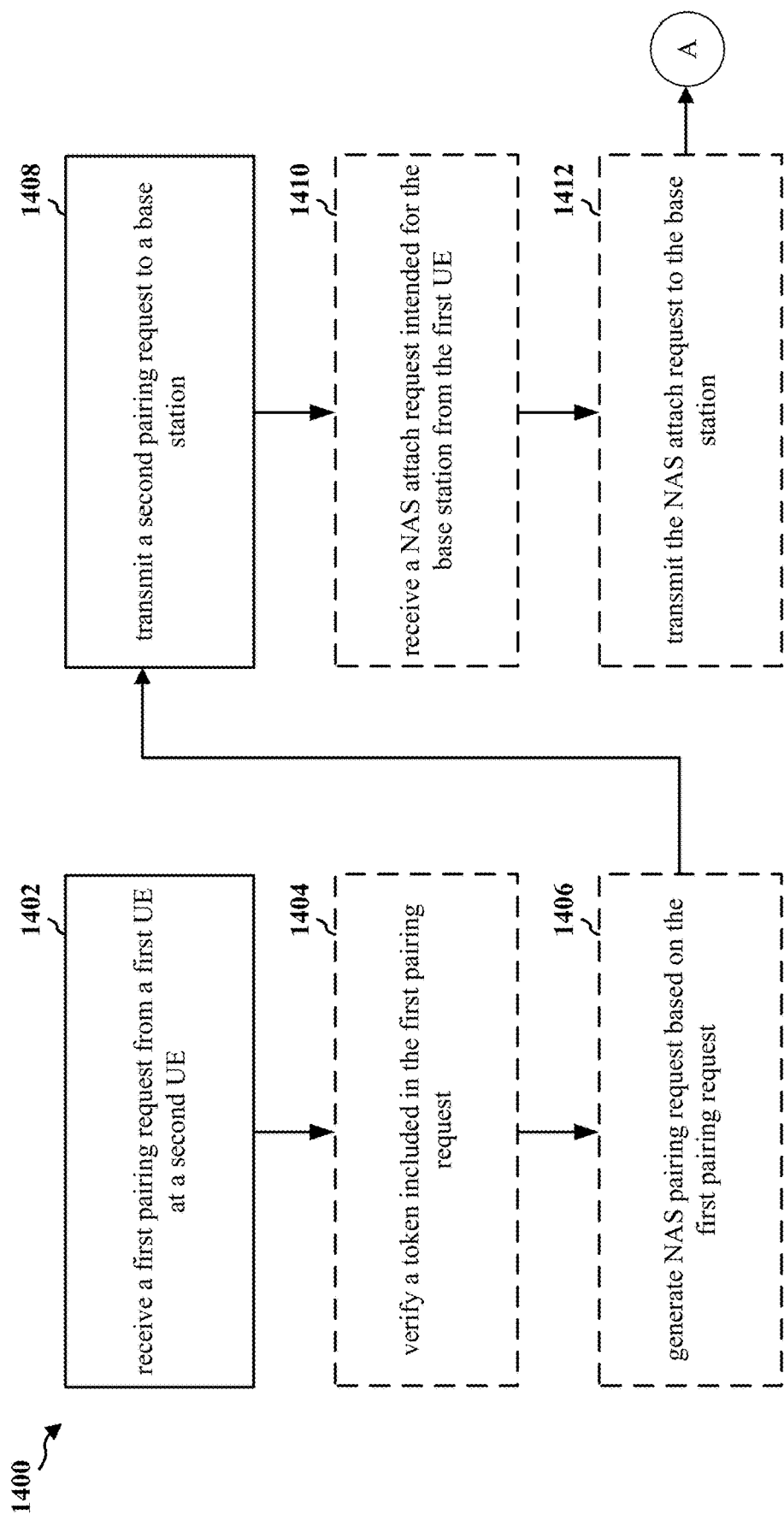
FIGS. 14A and 14B are a flowchart of a method of wireless communication.
Figure 14B:
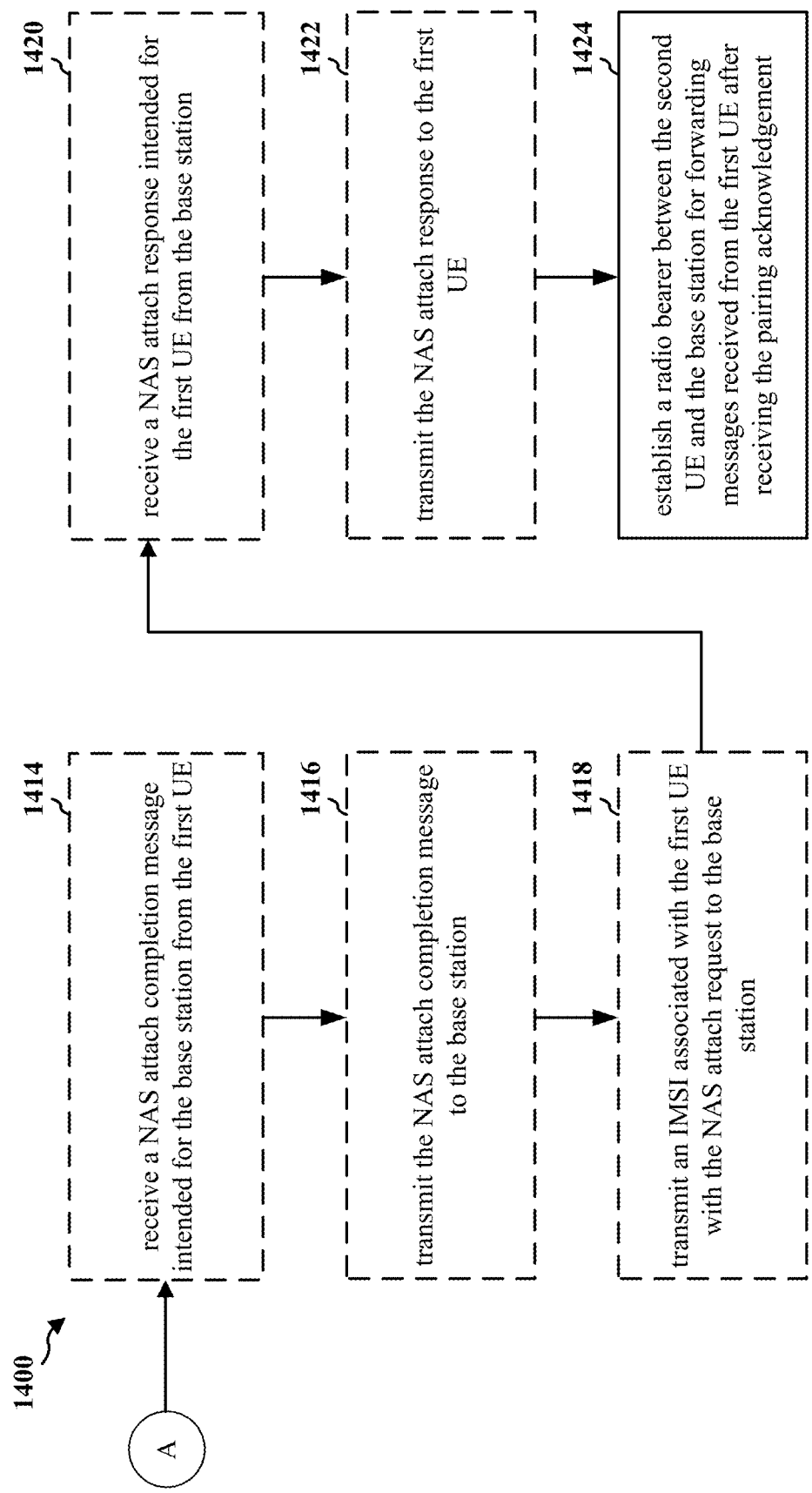

FIGS. 14A and 14B are a flowchart 1400 of a method of wireless communication. The method may be performed by a second UE (e.g., UE 104, 350, 404, 704, 804, 904, 1004, the apparatus 1502/1502') in communication with a first UE (e.g., UE 192, 350, 402, 702, 802, 902, 1002, the apparatus 1202/1202') and a base station (e.g., 102, 180, 406, 415, 706, 806, 906, 1006, eNB 310, the apparatus the apparatus 1802/1802'). In FIGS. 14A and 14B, optional operations are indicated with dashed lines.

As seen in FIG. 14A, at 1402, the second UE may receive a first pairing request from a first UE at a second UE. For example, referring to FIG. 4, the second UE 404 may receive the pairing request 410 from the first UE 402. In an example embodiment, the second UE 404 may verify that the token 490 included with the pairing request 410 is transmitted by a UE (e.g., first UE 402) authorized to pair with the second UE. The second UE 404 may then transmit/forward a modified pairing request 420 to the base station 406.

At 1404, the second UE may verify a token included in the first pairing request. For example, referring to FIG. 4, in some instances multiple wearable UEs may be broadcasting pairing requests. By including a token in the pairing request 410, the second UE 404 may be able to determine that pairing request 410 is transmitted by a UE (e.g., first UE 402) authorized to pair with the second UE 404. In an example embodiment, the second UE 404 may verify that the token 490 included with the pairing request 410 is transmitted by a UE (e.g., first UE 402) authorized to pair with the second UE.

At 1406, the second UE may generate NAS pairing request based on the first pairing request. For example, referring to FIG. 4, when the pairing request 410 includes the PC5 interface protocol stack pairing request, the second UE 404 may generate the modified pairing request 420 as a NAS pairing request based on the pairing request 410.

At 1408, the second UE may transmit a second pairing request to a base station. For example, referring to FIG. 4, the second UE 404 may then transmit/forward a modified pairing request 420 to the base station 406. For example, the pairing request 410 received from the first UE 402 may be modified by the second UE 404 to additionally include an identification associated with the second UE 404. The identification associated with the second UE 404 may include at least one of at least one of a S-TMSI and an L2-ID associated with the second UE 404. In an example embodiment, when the pairing request 410 includes the PC5 interface protocol stack pairing request, the second UE 404 may generate the modified pairing request 420 as a NAS pairing request based on the pairing request 410. In one aspect, the modified pairing request 420 may be transmitted to the base station 406 as a sidelink communication control message. In an alternative aspect, if the pairing request 410 is transmitted using the unlicensed spectrum, the second UE 404 may perform a CCA to determine if the channel and/or resources are available for transmission. In addition, the second UE 404 may communicate information associated with the CCA to the base station 406, so that the base station 406 may determine if the channel and/or resources should be used.

At 1410, the second UE may receive a NAS attach request intended for the base station from the first UE. For example, referring to FIG. 4, the first UE 402 may transmit a NAS attach request 410 to the second UE 404. In one aspect, the NAS attach request 410 may be intended for the communications network. For example, the NAS attach request 410 may be transmitted as a PC5 interface protocol stack attach request. The second UE 404 may transmit the NAS attach request 420 to the base station 406. In an example embodiment, the second UE 404 may include the IMSI associated with the first UE 402.

At 1412, the second UE may transmit the NAS attach request to the base station. For example, referring to FIG. 4, the second UE 404 may include the IMSI associated with the first UE 402.

As seen in FIG. 14B, at 1414, the second UE receives a NAS attach completion message intended for the base station from the first UE. For example, referring to FIG. 7, the wearable UE 702 may transmit a NAS attach complete message 754 to the relay UE 704. In an aspect, the NAS attach complete message 754 may be an RRC NAS transport message. In an additional aspect, the NAS attach complete message 754 may be a PC5-U message. The relay UE 704 may transmit NAS attach complete message 756 to the base station 706. In an aspect, the NAS attach complete message 756 may be an RRC NAS transport message. In an additional aspect, the NAS attach complete message 756 may be using a DRB or Relay Bearer over the Uu interface.

At 1416, the second UE may transmit the NAS attach completion message to the base station. For example, referring to FIG. 7, the wearable UE 702 may transmit a NAS attach complete message 754 to the relay UE 704. In an aspect, the NAS attach complete message 754 may be an RRC NAS transport message. In an additional aspect, the NAS attach complete message 754 may be a PC5-U message. The relay UE 704 may transmit NAS attach complete message 756 to the base station 706. In an aspect, the NAS attach complete message 756 may be an RRC NAS transport message. In an additional aspect, the NAS attach complete message 756 may be using a DRB or Relay Bearer over the Uu interface.

At 1418, the second UE may transmit an IMSI associated with the first UE with the NAS attach request to the base station. For example, referring to FIG. 4, the second UE 404 may transmit the NAS attach request 420 to the base station 406. In an example embodiment, the second UE 404 may include the IMSI associated with the first UE 402.

At 1420, the second UE may receive a NAS attach response intended for the first UE from the base station. For example, referring to FIG. 4, the base station 406 may transmit the NAS attach response 470 to the first UE 402. Alternatively, the base station 406 may transmit the pairing acknowledgement 450 (e.g., the NAS attach response) to the second UE 404. The second UE 404 may then transmit the NAS attach response 460 to the first UE 402.

At 1422, the second UE may transmit the NAS attach response to the first UE. For example, referring to FIG. 4, the base station 406 may transmit the NAS attach response 470 to the first UE 402. Alternatively, the base station 406 may transmit the pairing acknowledgement 450 (e.g., NAS attach response) to the second UE 404. The second UE 404 may then transmit the NAS attach response 460 to the first UE 402. At 1424, the second UE may establish a radio bearer between the second UE and the base station for forwarding messages received from the first UE after receiving the pairing acknowledgement. For example, once the NAS attach response 460, 470 is received by the first UE 402, the first UE 402 may connect to the communications network. In an example embodiment, the second UE 404 may establish a radio bearer between the second UE 404 and the base station 406 for forwarding messages received from the first UE 402 after receiving the pairing acknowledgement.

Figure 15:
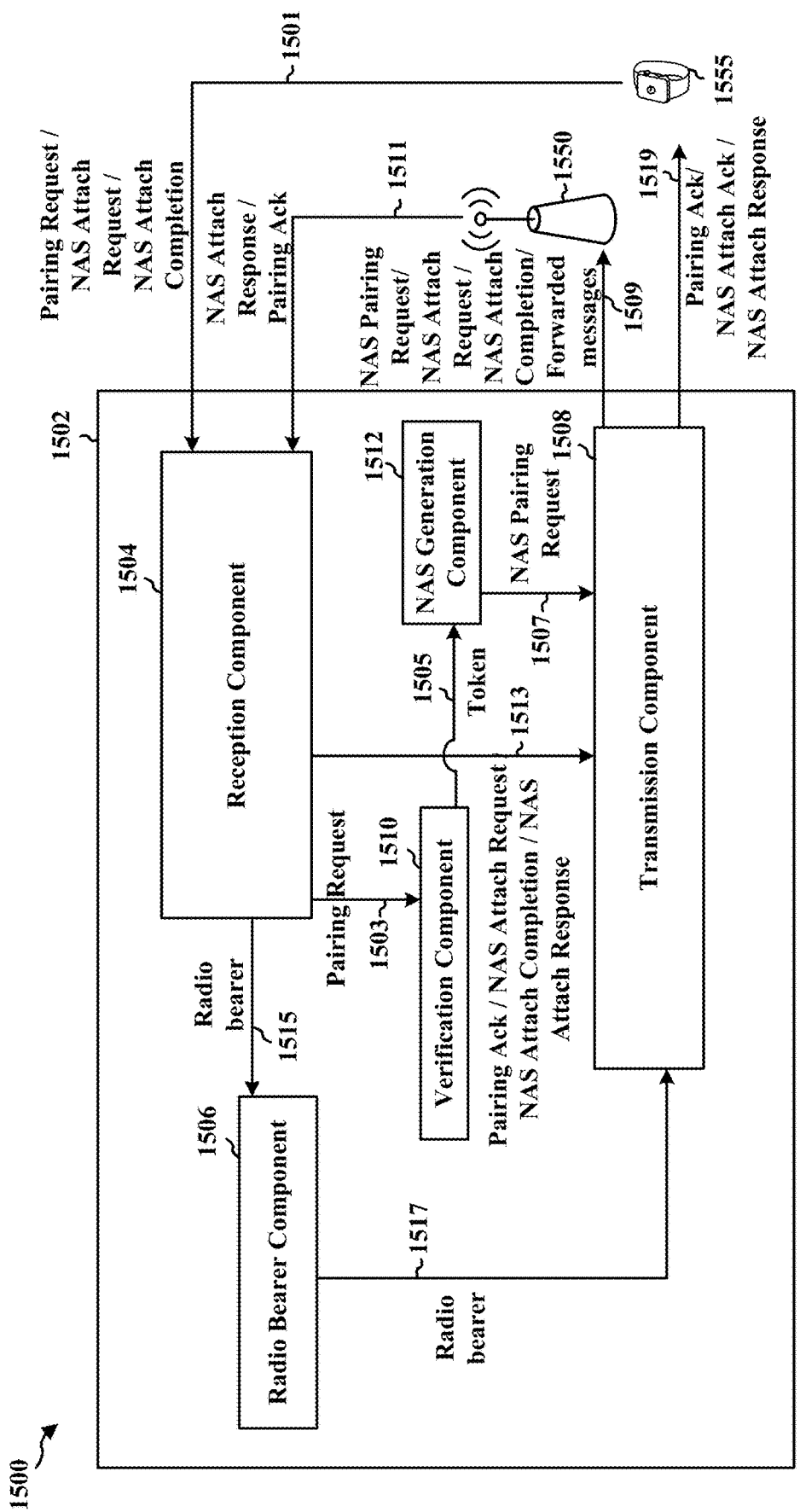
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502 (e.g., UE 104, 350, 404, 704, 804, 904, 1004, the apparatus 1502') in communication with a first UE 1555 (e.g., UE 192, 350, 402, 702, 802, 902, 1002, the apparatus 1202/1202') and a base station 1550 (e.g., 102, 180, 406, 415, 706, 806, 906, 1006, eNB 310, the apparatus the apparatus 1802/1802').

The apparatus may be a second UE. The apparatus includes a reception component 1504 that may receive a first pairing request 1501 from a first UE 1850. In one aspect, the first pairing request 1501 may include a token. Reception component 1504 may send a signal 1503 associated with the first pairing request to verification component 1510. Verification component 1510 may verify the token included in the first pairing request. Verification component 1510 may send a signal 1505 associated with the verified token to NAS generation component 1512. NAS generation component 1512 may generate a NAS pairing request based on the first pairing request. NAS generation component 1512 may send a signal 1507 associated with the generated NAS pairing request to transmission component 1508. Transmission component 1508 may transmit a second pairing request 1509 to base station 1550. Reception component 1504 may receive a NAS attach request 1501 intended for the base station 1550 from the first UE 1555. Reception component 1504 may send a signal 1513 associated with the NAS attach request to transmission component 1508. Transmission component 1508 may transmit the NAS attach request 1509 to the base station 1550. In one aspect, the NAS attach request 1509 may include an IMSI associated with first UE 1555. Reception component 1504 may a NAS attach completion message 1501 intended for the base station 1550 from the first UE 1555. Reception component 1504 may send a signal 1513 associated with the NAS attach completion message to transmission component 1508. Transmission component 1508 may transmit the NAS attach completion message 1509 to the base station 1550. Reception component 1504 may receive a NAS attach response 1511 intended for first UE 1555 from base station 1550. Reception component 1504 may send a signal 1513 associated with the NAS attach response to transmission component 1508. Transmission component 1508 may transmit the NAS attach response 1509 to the first UE 1555. Radio bearer component 1506 may establish a radio bearer 1515, 1517 between the apparatus 1502 and the base station 1550 for forwarding messages 1501 received from the first UE 1555 after receiving the pairing acknowledgement 1511.

The apparatus may include additional components that perform each of the blocks of the algorithm in the aforementioned flowcharts of FIGS. 14A and 14B. As such, each block in the aforementioned flowcharts of FIGS. 14A and 14B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
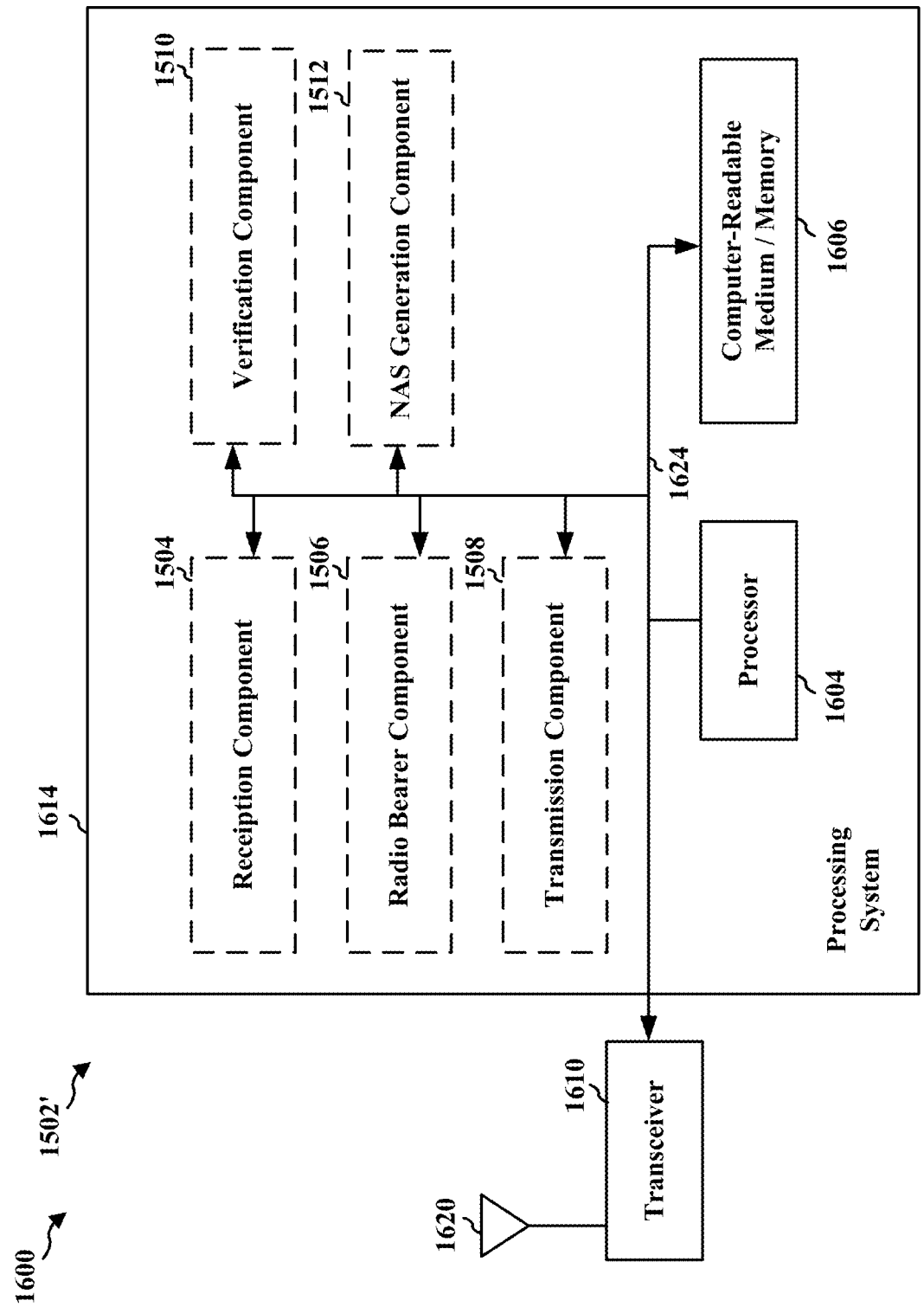
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1508, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512. The components may be software components running in the processor 1604, resident/stored in the computer readable medium/memory 1606, one or more hardware components coupled to the processor 1604, or some combination thereof. The processing system 1614 may be a component of the UE 350 and may include the memory 360 and/or at least one of the TX processor 368, the RX processor 356, and the controller/processor 359.

In one configuration, the apparatus 1502/1502' for wireless communication includes means for receiving a first pairing request from a first UE at a second UE, the first pairing request intended for a communication network. In an aspect, the first pairing request includes an identification associated with the first UE, the identification associated with the first UE including at least one of an IMSI associated with the first UE, a S-TMSI, a L2-ID associated with the first UE, and a token that indicates to the second UE that the pairing request is transmitted by the first UE. In another aspect, the first pairing request includes a NAS pairing request. In a further aspect, the first pairing request includes a PC5 interface protocol stack pairing request and the second pairing request includes a NAS pairing request. In another aspect, the apparatus 1502/1502' for wireless communication includes means for verifying the token. In a further configuration, the apparatus 1502/1502' for wireless communication includes means for transmitting a second pairing request to a base station. For example, transmitting the second pairing request includes forwarding the second pairing request to the base station based on the verification of the token. In one aspect, the second pairing request includes the identification associated with the first UE and an identification associated with the second UE, the identification associated with the second UE including at least one of at least one of a S-TMSI and an L2-ID associated with the second UE. In another aspect, the second pairing request is transmitted to the base station as a sidelink communication control message. In a further configuration, the apparatus 1502/1502' for wireless communication includes means for receiving a pairing acknowledgement from a base station, the pairing acknowledgement verifying the pairing of the first UE and the second UE. For example, the pairing acknowledgement received from the base station includes a L2-ID of the first UE. In another configuration, the apparatus 1502/1502' for wireless communication includes means for generating the NAS pairing request based on the first pairing request when the first pairing request includes a PC5 interface protocol stack pairing request. Additionally, the apparatus 1502/1502' for wireless communication includes means for receiving a NAS attach request intended for the base station from the first UE. Furthermore, the apparatus 1502/1502' for wireless communication includes means for transmitting the NAS attach request to the base station. Moreover, the apparatus 1502/1502' for wireless communication includes means for receiving a NAS attach completion message intended for the base station from the first UE. In another configuration, the apparatus 1502/1502' for wireless communication includes means for transmitting the NAS attach completion message to the base station. In a further configuration, the apparatus 1502/1502' for wireless communication includes means for transmitting an IMSI associated with the first UE with the NAS attach request to the base station. In yet a further configuration, the apparatus 1502/1502' for wireless communication includes means for receiving a NAS attach response intended for the first UE from the base station. In still another configuration, the apparatus 1502/1502' for wireless communication includes means for transmitting the NAS attach response to the first UE. In one aspect, the first UE and the second UE communicate using one of a licensed spectrum, a unlicensed spectrum, device-to-device communications, or short-range wireless communications. In another configuration, the apparatus 1502/1502' for wireless communication includes means for establishing a radio bearer between the second UE and the base station for forwarding messages received from the first UE after receiving the pairing acknowledgement.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 17B:
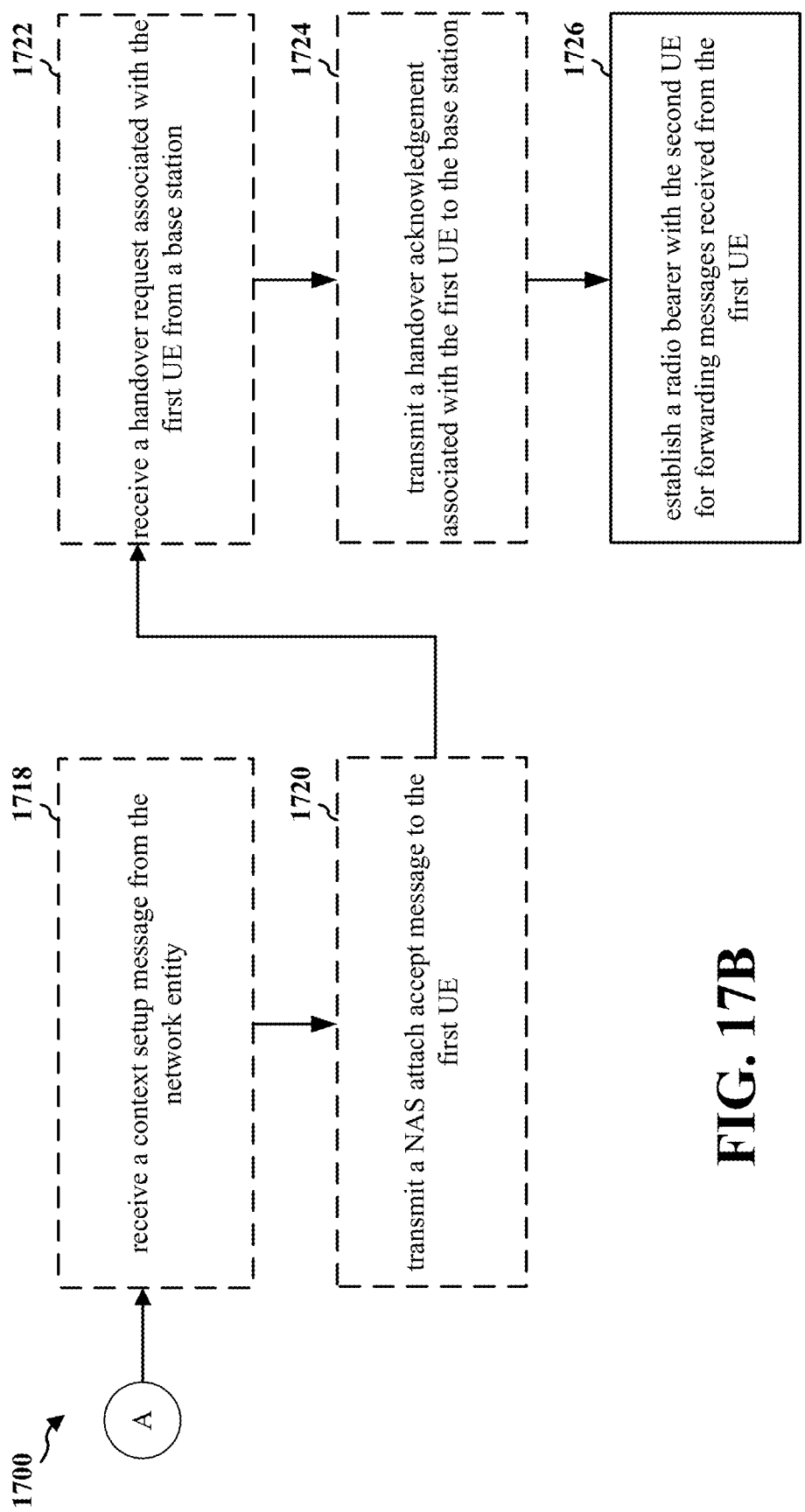

FIGS. 17A and 17B are a flowchart 1700 of a method of wireless communication. The method may be performed by a base station (e.g., the base station 102, 310 406, 706, 806, 906, 1006, 1802, 1802') in communication with a first UE (e.g., the first UE 402, wearable UE 702, wearable UE 802, wearable UE 902, wearable UE 1002, the apparatus 1202/1202') and/or a second UE (e.g., the second UE 404, relay UE 704, relay UE 804, relay UE 904, relay UE 1004, the apparatus 1500/1500'). The operations indicated with dashed lines represent optional operations that may be implemented by various aspects of the disclosure.

As seen in FIG. 17A, at 1702, the base station may receive a first pairing request from a first UE relayed via a second UE. For example, referring to FIG. 4, the pairing request 410 received from the first UE 402 may be modified by the second UE 404 to additionally include an identification associated with the second UE 404. The identification associated with the second UE 404 may include at least one of at least one of a S-TMSI and an L2-ID associated with the second UE 404. In an example embodiment, when the pairing request 410 includes the PC5 interface protocol stack pairing request, the second UE 404 may generate the modified pairing request 420 as a NAS pairing request based on the pairing request 410. In one aspect, the modified pairing request 420 may be transmitted to the base station 406 as a sidelink communication control message. In an alternative aspect, when the pairing request 410 is transmitted using the unlicensed spectrum, the second UE 404 may perform a CCA to determine if the channel and/or resources are available for transmission. In addition, the second UE 404 may communicate information associated with the CCA to the base station 406, so that the base station 406 may determine if the channel and/or resources should be used.

At 1704, the base station may transmit a second pairing request to a network entity. For example, referring to FIG. 4, the base station 406 may transmit a pairing request 430 to a network entity 408 (e.g., one or more MMEs as illustrated in FIGS. 8A, 8B, 9A, 9B, 10A, and/or 10B). In one aspect, the base station 406 may transmit the pairing request 430 with at least one of the IMSI associated with the first UE 402, a S-TMSI associated with the first UE 402, and/or the S-TMSI associated with the second UE 404.

At 1706, the base station may receive a pairing acknowledgement from the network entity. For example, referring to FIG. 4, when the network entity 408 determines that the first UE 402 is authorized to connect to the network, the base station 406 may receive a pairing acknowledgement 440 from the network entity 408. The pairing acknowledgement 440 may include, for example, the IMSI associated with the first UE 402.

At 1708, the base station may transmit the pairing acknowledgement to the first UE or the second UE. For example, referring to FIG. 4, the base station 406 may then transmit the pairing acknowledgement 470 including a connection setup message directly to the first UE 402. Alternatively, the base station 406 may transmit the pairing acknowledgement 450 including the connection setup message to the second UE 404. In either case, the pairing acknowledgement including connection setup message 460, 470 received at the first UE 402 may include at least one of the L2-ID associated with the first UE 402, the L2-ID associated with the second UE 404, and/or a cell radio network temporary identifier (C-RNTI).

At 1710, the base station may transmit an RRC connection message to the second UE. For example, referring to FIG. 4, the base station 406 may transmit an RRC connection message 450, 470 to the second UE 404 or to the first UE 402.

At 1712, the base station may transmit an RRC connection message to the first UE. For example, referring to FIG. 4, the base station 406 may transmit an RRC connection message 450, 470 to the second UE 404 or to the first UE 402.

At 1714, the base station may receive a NAS attach request from the first UE relayed via the second UE. For example, referring to FIG. 4, the first UE 402 may then transmit a NAS attach request 410 to the second UE 404. In one aspect, the NAS attach request 410 may be intended for the communications network. For example, the NAS attach request 410 may be transmitted as a PC5 interface protocol stack attach request. The second UE 404 may transmit the NAS attach request 420 to the base station 406. In an example embodiment, the second UE 404 may include the IMSI associated with the first UE 402

At 1716, the base station may transmit the NAS attach request and an IMSI associated with the first UE to the network entity. For example, referring to FIG. 4, the base station 406 may transmit the NAS attach request 430 to the network entity 408. In an example embodiment, the NAS attach request 430 may include the IMSI associated with the first UE 402. The network entity 408 may verify that IMSI included in the NAS attach request 430 is the same as the IMSI included in the pairing request 430 received from the base station 406 discussed supra.

As seen in FIG. 17B, at 1718, the base station may receive a context setup message from the network entity. For example, referring to FIG. 4, when the network entity 408 determines that the IMSI in the NAS attach request 430 and the pairing request 430 are the same, a pairing acknowledgement 440 (e.g., a NAS attach response and/or UE context setup message) may be transmitted to the base station 406.

At 1720, the base station may transmit a NAS attach accept message to the first UE. For example, referring to FIG. 4, the base station 406 may transmit the NAS attach response 470 to the first UE 402. Alternatively, the base station 406 may transmit the NAS attach response 450 to the second UE 404.

At 1722, the base station may receive a handover request associated with the first UE from a base station. For example, referring to FIG. 4, the base station 406 may receive a handover request 425 from base station 415. In an aspect, the handover request 425 may be associated with a handover procedure for the first UE 402 to begin communication with base station 415. When a handover acknowledgement 435 is received from base station 406, the base station 415 and/or base station 406 may transmit a handover command 470 to the first UE 402. The base station 415 may then begin communication 445 with the first UE 402.

At 1724, the base station may transmit a handover acknowledgement associated with the first UE to the neighbor base station. For example, referring to FIG. 4, the base station 406 may receive a handover request 425 from base station 415. In an aspect, the handover request 425 may be associated with a handover procedure for the first UE 402 to begin communication with base station 415. When a handover acknowledgement 435 is received from base station 406, the base station 415 and/or base station 406 may transmit a handover command 470 to the first UE 402. The base station 415 may then begin communication 445 with the first UE 402.

At 1726, the base station may establish a radio bearer with the second UE for forwarding messages received from the first UE. For example, referring to FIG. 4, the second UE 404 may establish a radio bearer between the second UE 404 and the base station 406 for forwarding messages from the first UE 402.

Figure 18:
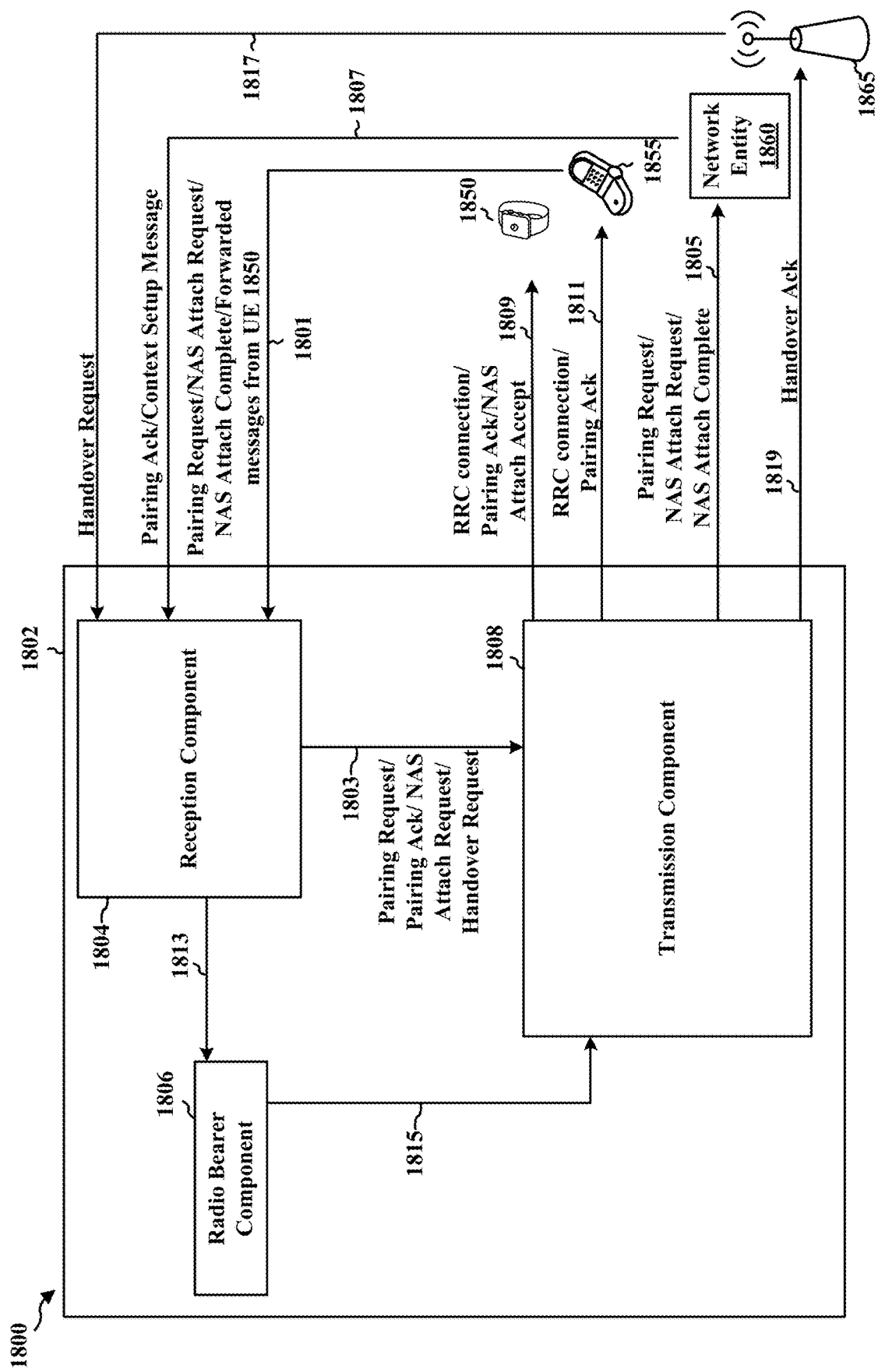
FIG. 18 is a conceptual data flow diagram illustrating the data flow between different means/components in an exemplary apparatus.

FIG. 18 is a conceptual data flow diagram 1800 illustrating the data flow between different means/components in an exemplary apparatus 1802. The apparatus may be a serving base station (e.g., 102, 180, 406, 415, 706, 806, 906, 1006, eNB 310, the apparatus the apparatus 1802') in communication with a first UE 1850 (e.g., UE 192, 350, 402, 702, 802, 902, 1002, the apparatus 1202/1202'), a second UE 1855 (e.g., UE 104, 350, 404, 704, 804, 904, 1004, the apparatus 1502/1502'), a network entity 1860 (e.g., 408, 708, 710, 808, 810, 910, 1010, 1012, the apparatus 2102/2102'), and a neighbor base station 1865 (e.g., 102, 180, 415, 908, 1008, eNB 310).

The apparatus may include a reception component 1804. Reception component 1804 may receive a first pairing request 1801 from the first UE 1850 relayed via a second UE 1855. Reception component 1804 may send a signal 1803 associated with the first pairing request 1801 to transmission component 1808. Transmission component 1808 may transmit a second pairing request 1805 to the network entity 1860. Reception component 1804 may receive a pairing acknowledgement 1807 from the network entity 1860. In addition, reception component 1804 may send a signal 1803 associated with the pairing acknowledgement to transmission component 1808. Transmission component 1808 may transmit the pairing acknowledgement 1809, 1811 to the first UE 1850 or the second UE 1855. Transmission component 1808 may transmit an RRC connection message 1809 to the second UE 1855. In addition, transmission component 1808 may transmit an RRC connection message 1809 to the first UE 1850. Reception component 1804 may receive a NAS attach request 1801 from the first UE 1850 relayed via the second UE 1855. Reception component 1804 may send a signal 1803 associated with the NAS attach request to transmission component 1808. Transmission component 1808 may transmit the NAS attach request 1805 and an IMSI associated with the first UE 1850 to the network entity 1860. Reception component 1804 may receive a context setup message 1807 from the network entity 1860. Radio bearer component 1806 may establish a radio bearer 1813, 1815 with the second UE 1855 for forwarding messages received from the first UE 1850. Reception component 1804 receive a handover request 1817 associated with the first UE 1850 from a neighbor base station 1865. In addition, reception component 1804 may send a signal 1803 associated with the handover request to transmission component 1808. Transmission component 1808 may transmit a handover acknowledgement 1819 associated with the first UE 1850 to the neighbor base station 1865.

The apparatus may include additional components that perform each of the blocks of the algorithm in the aforementioned flowcharts of FIGS. 17A and 17B. As such, each block in the aforementioned flowcharts of FIGS. 17A and 17B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
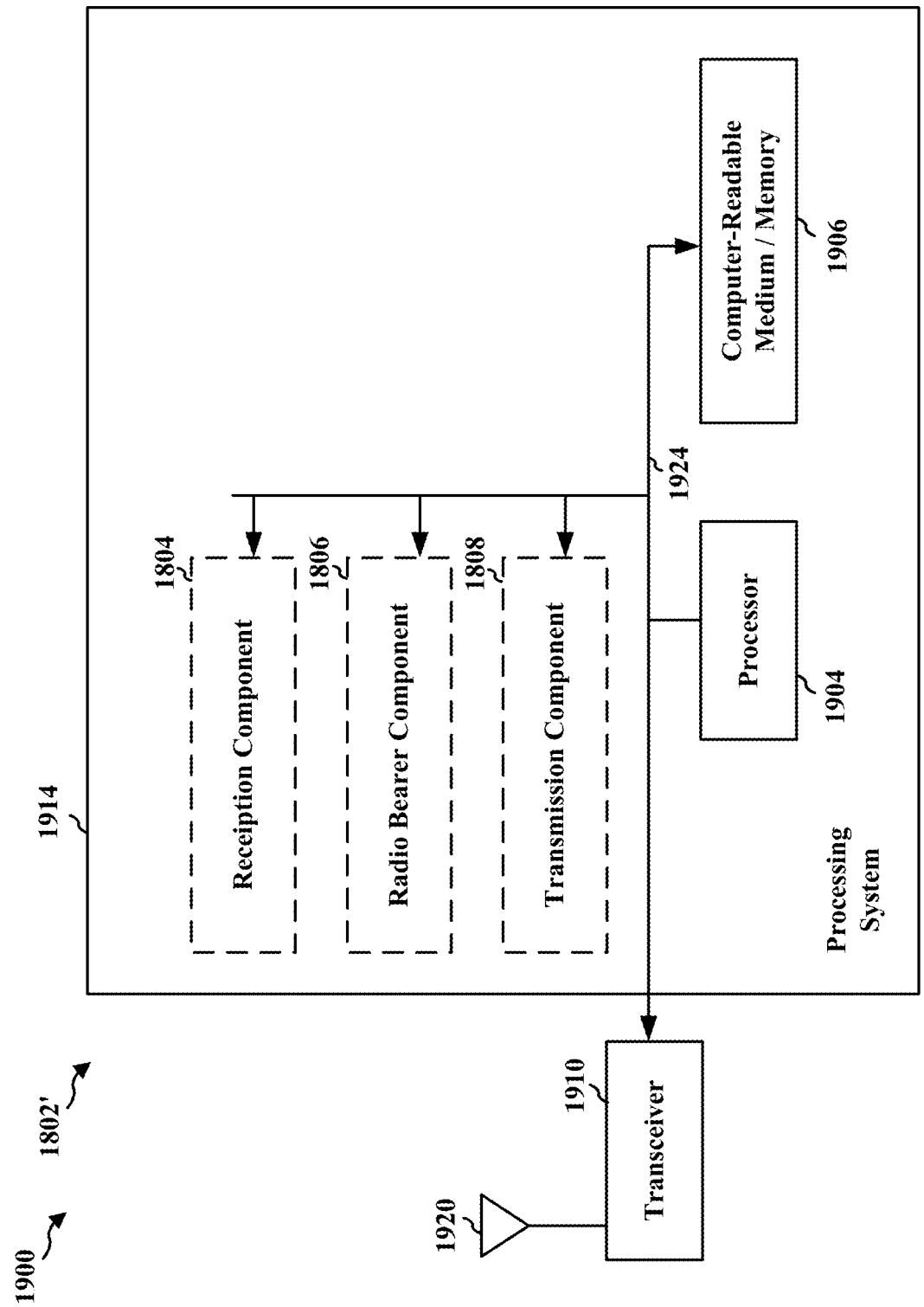
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1808, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1808, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1804, 1806, 1808. The components may be software components running in the processor 1904, resident/stored in the computer readable medium/memory 1906, one or more hardware components coupled to the processor 1904, or some combination thereof. The processing system 1914 may be a component of the eNB 310 and may include the memory 376 and/or at least one of the TX processor 316, the RX processor 370, and the controller/processor 375.

In one configuration, the apparatus 1802/1802' for wireless communication includes means for receiving a first pairing request from a first UE relayed via a second UE. In an aspect, the first pairing request includes at least one of an IMSI associated with the first UE, a L2-ID associated with the first UE, a S-TMSI, and an L2-ID associated with the second UE. In another configuration, the apparatus 1802/1802' for wireless communication includes means for transmitting a second pairing request to a network entity. In an aspect, the second pairing request includes at least one of the IMSI associated with the first UE and the S-TMSI associated with the second UE. In another aspect, the second pairing request includes at least one of the S-TMSI associated with the first UE and the S-TMSI associated with the second UE. In a further configuration, the apparatus 1802/1802' for wireless communication includes means for receiving a pairing acknowledgement from the network entity, the pairing acknowledgement verifying the pairing of the first UE and the second UE. In an aspect, the pairing acknowledgement includes the IMSI associated with the first UE. In yet another configuration, the apparatus 1802/1802' for wireless communication includes means for transmitting a RRC connection message to the second UE. In an aspect, the RRC connection message includes a L2-ID associated with the first UE. In another configuration, the apparatus 1802/1802' for wireless communication includes means for transmitting a RRC connection message to the first UE. In an aspect, the RRC connection message includes at least one of a L2-ID associated with the second UE, and a C-RNTI allocated for the first UE. Furthermore, the apparatus 1802/1802' for wireless communication includes means for transmitting the pairing acknowledgement to the first UE or the second UE. Still further, the apparatus 1802/1802' for wireless communication includes means for receiving a NAS attach request from the first UE relayed via the second UE. Moreover, the apparatus 1802/1802' for wireless communication includes means for transmitting the NAS attach request and an IMSI associated with the first UE to the network entity. Further still, the apparatus 1802/1802' for wireless communication includes means for receiving a context setup message from the network entity. Additionally, the apparatus 1802/1802' for wireless communication includes means for transmitting a NAS attach accept message to the first UE. Furthermore, the apparatus 1802/1802' for wireless communication includes means for receiving a handover request associated with the first UE from a base station. Still further, the apparatus 1802/1802' for wireless communication includes means for transmitting a handover acknowledgement associated with the first UE to the base station. In addition, the apparatus 1802/1802' for wireless communication includes means for establishing a radio bearer with the second UE for forwarding messages received from the first UE.

The aforementioned means may be one or more of the aforementioned components of the apparatus 1802 and/or the processing system 1914 of the apparatus 1802' configured to perform the functions recited by the aforementioned means. As described supra, the processing system 1914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 20:
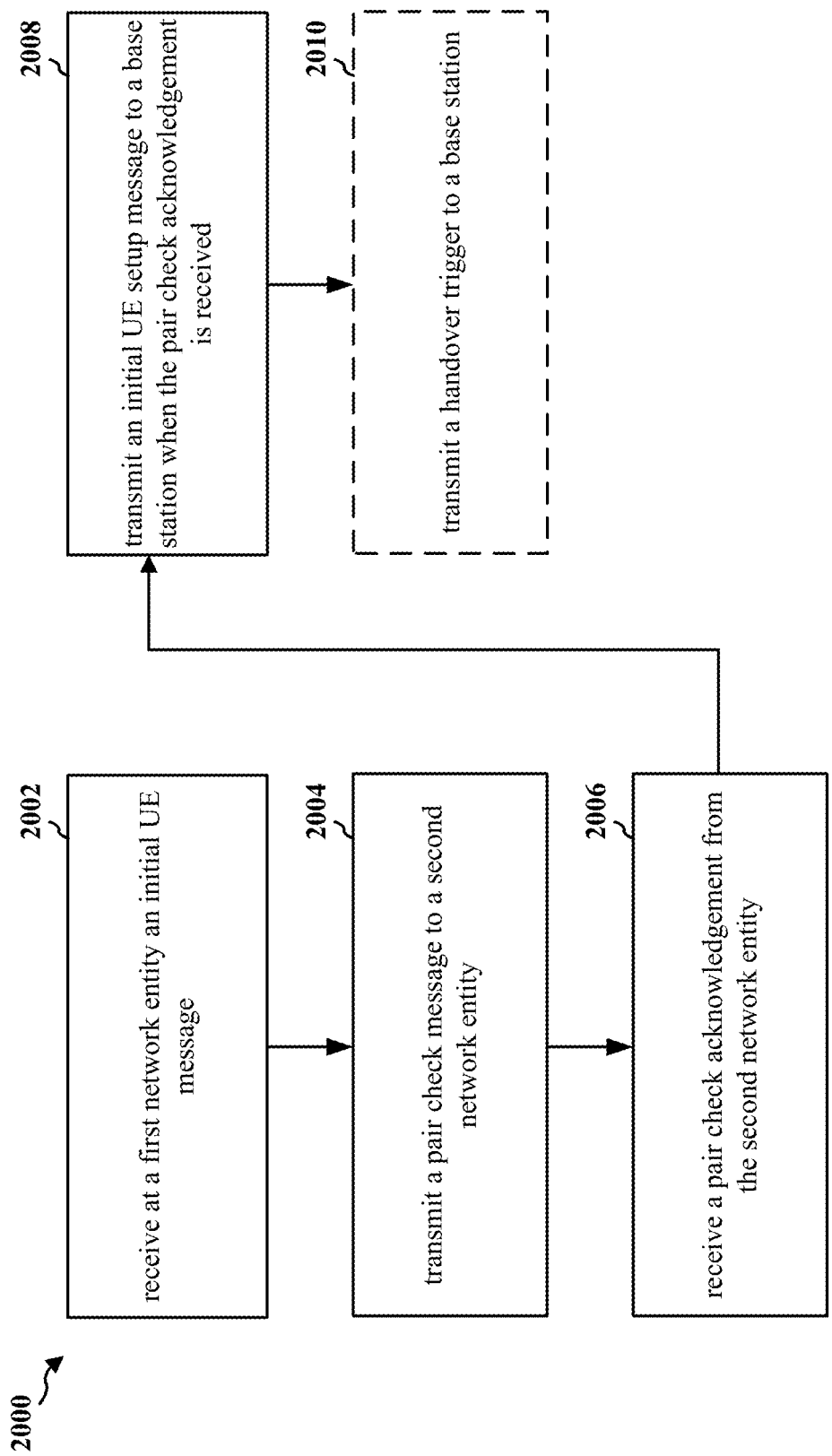
FIG. 20 is a flowchart of a method of wireless communication.

FIG. 20 is a flowchart 2000 of a method of wireless communication. The method may be performed by a first network entity (e.g., MME-W 710, 810, 912, 1012, the apparatus 2102/2102') in communication with a base station (e.g., the base station 706, 806, 906, 1006, 1800, 1800') and/or a second network entity (e.g., MME-R 708, 808, 910, 1010, the apparatus 2400/2400'). The operations indicated with dashed lines represent optional operations that may be implemented by various aspects of the disclosure.

At 2002, the first network entity may receive an initial UE message. For example, referring to FIG. 7A, the base station 706 may transmit a new S1 AP message/UL NAS transport message 722 to MME-W 710. In an aspect, the new S1AP message/UL NAS transport message 722 may include IMSI_W and S-TMSI_R.

At 2004, the first network entity may transmit a pair check message to a second network entity. For example, referring to FIG. 7A, the MME-W 710 may transmit a pair check 724 to MME_R 708. In an aspect, the pair check message 724 may include IMSI_W and S-TMSI_R.

At 2006, the first network entity may receive a pair check acknowledgement from the second network entity. For example, referring to FIG. 7A, the MME-R 708 may verify the pairing of the wearable UE 702 and the relay UE 704 using the IMSI_W and the S-TMSI_R in the pair check 724 and the IMSI_R and S-TMSI_R stored at the MME-R 708. The MME-R 708 may transmit a pairing acknowledgement 726 to the MME-W 710 when the pairing is verified. The pairing acknowledgement 726 may include the IMSI_R.

At 2008, the first network entity may transmit an initial UE setup message to a base station when the pair check acknowledgement is received. For example, referring to FIG. 7A, the MME-R 708 may also transmit a pairing acknowledgement 728 (e.g., new S1AP message/DL NAS transport) to the base station 706.

At 2010, the first network entity may transmit a handover trigger to a base station. For example, referring to FIG. 10A, the MME-W 1012 may transmit a handover trigger 1034 to the base station 1008 (e.g., a base station 1008 that will communicate with the wearable UE 1002).

Figure 21:
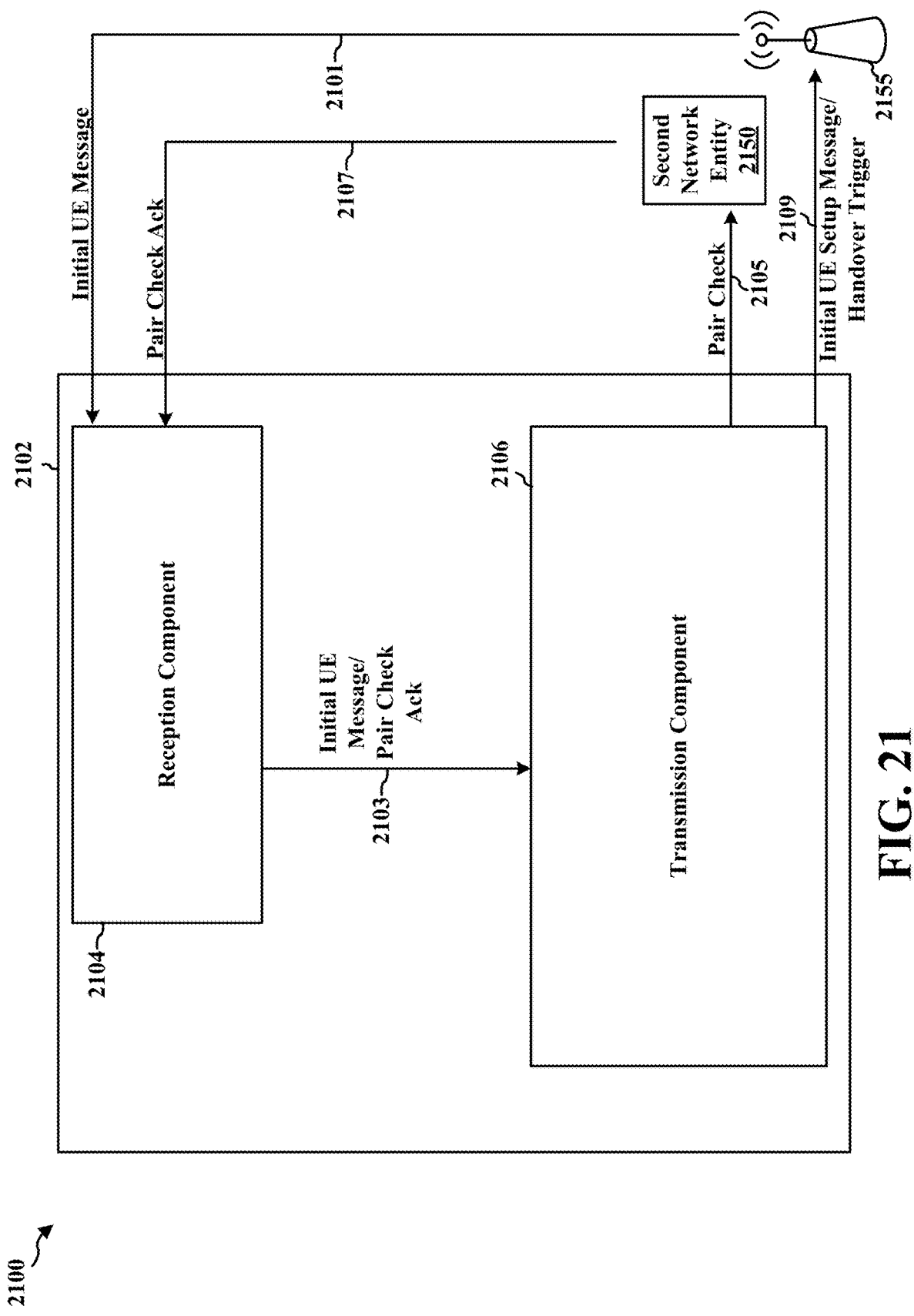
FIG. 21 is a conceptual data flow diagram illustrating the data flow between different means/components in an exemplary apparatus.

FIG. 21 is a conceptual data flow diagram 2100 illustrating the data flow between different means/components in an exemplary apparatus 2102. The apparatus may be a first network entity (e.g., 408, 710, 810, 912, 1012, the apparatus 2102') in communication with a base station 2155 (e.g., the base station 102, 180, 406, 415, 706, 806, 906, 1006, eNB 310, the apparatus the apparatus 1802/1802') and/or a second network entity 2150 (e.g., 708, 808, 910, 1010, the apparatus 2400/2400').

The apparatus may include a reception component 2104. Reception component 2104 may receive an initial UE message 2101 from base station 2155. In addition, reception component 2104 may send a signal 2103 associated with the initial UE message to transmission component 2106. Transmission component 2106 may transmit a pair check message 2105 to second network entity 2150. Reception component 2104 may receive a pair check acknowledgement 2107 from second network entity 2150. Reception component 2104 may send a signal 2103 associated with the pair check acknowledgement to transmission component 2106. Transmission component 2106 may transmit an initial UE setup message 2109 to base station 2155 when the pair check acknowledgement is received. In addition, transmission component 2106 may transmit a handover trigger to base station 2155.

The apparatus may include additional components that perform each of the blocks of the algorithm in the aforementioned flowchart of FIG. 20. As such, each block in the aforementioned flowchart of FIG. 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 22:
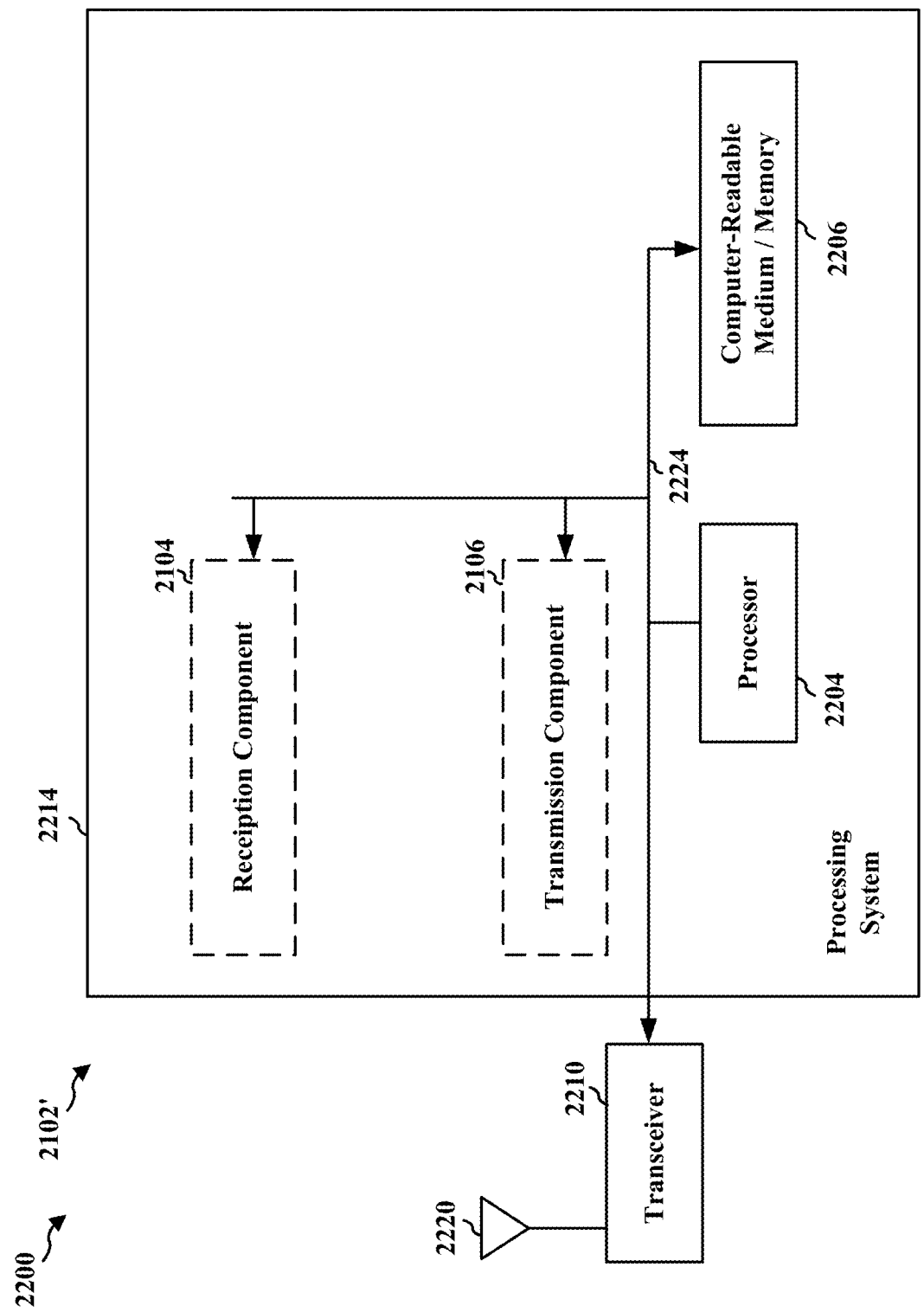
FIG. 22 is a diagram illustrating an example of a hardware implementation for an apparatus employing a processing system.

FIG. 22 is a diagram 2200 illustrating an example of a hardware implementation for an apparatus 2102' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware components, represented by the processor 2204, the components 2104, 2106, and the computer-readable medium/memory 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214, specifically the reception component 2104. In addition, the transceiver 2210 receives information from the processing system 2214, specifically the transmission component 2106, and based on the received information, generates a signal to be applied to the one or more antennas 2220. The processing system 2214 includes a processor 2204 coupled to a computer-readable medium/memory 2206. The processor 2204 is responsible for general processing, including the execution of software stored on the computer-readable medium/memory 2206. The software, when executed by the processor 2204, causes the processing system 2214 to perform the various functions described supra for any particular apparatus. The computer-readable medium/memory 2206 may also be used for storing data that is manipulated by the processor 2204 when executing software. The processing system 2214 further includes at least one of the components 2104, 2106. The components may be software components running in the processor 2204, resident/stored in the computer readable medium/memory 2206, one or more hardware components coupled to the processor 2204, or some combination thereof. The processing system 2214 may be a component of the eNB 310 and may include the memory 376 and/or at least one of the TX processor 316, the RX processor 370, and the controller/processor 375.

In one configuration, the apparatus 2102/2102' for wireless communication includes means for receiving at a first network entity an initial UE message. In an aspect, the initial UE message includes a first identification associated with a first UE and a second identification associated with a second UE. For example, the first identification associated with the first UE includes a S-TMSI associated with the first UE, the second identification associated with the second UE includes a S-TIMSI associated with the second UE, the third identification associated with the first UE includes an IMSI associated with the first UE, and the fourth identification associated with the second UE includes an IMSI associated with the second UE. In another configuration, the apparatus 2102/2102' for wireless communication includes means for transmitting a pair check message to a second network entity. In an aspect, the pair check message includes a third identification associated with the first UE and the second identification associated with the second UE. In a further configuration, the apparatus 2102/2102' for wireless communication includes means for receiving a pair check acknowledgement from the second network entity. In an aspect, the pair check acknowledgement includes a fourth identification associated with the second UE. Still further, the apparatus 2102/2102' for wireless communication includes means for transmitting an initial UE setup message to a base station when the pair check acknowledgement is received. In addition, the apparatus 2102/2102' for wireless communication includes means for transmitting a handover trigger to a base station. The aforementioned means may be one or more of the aforementioned components of the apparatus 2102 and/or the processing system 2214 of the apparatus 2102' configured to perform the functions recited by the aforementioned means. As described supra, the processing system 2214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 23:
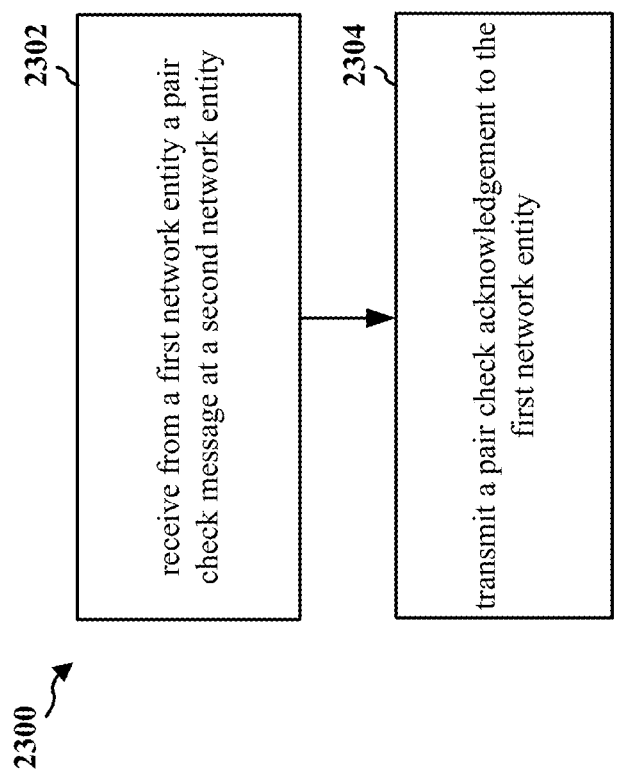
FIG. 23 is a flowchart of a method of wireless communication.

FIG. 23 is a flowchart 2300 of a method of wireless communication. The method may be performed by a second network entity (e.g., 708, 808, 910, 1010, the apparatus 2400/2400') in communication with a first network entity (e.g., 710, 810, 912, 1012, the apparatus 2102/2102'). The operations indicated with dashed lines represent optional operations that may be implemented by various aspects of the disclosure.

At 2302, the second network entity may receive a pair check message from a first network entity. For example, referring to FIG. 7A, the MME-W 710 may transmit a pair check 724 to MME_R 708. In an aspect, the pair check 724 may include IMSI_W and S-TMSI_R.

At 2304, the second network entity may transmit a pair check acknowledgement to the first network entity. For example, the MME-R 708 may verify the pairing of the wearable UE 702 and the relay UE 704 using the IMSI_W and the S-TMSI_R in the pair check 724 and the IMSI_R and S-TMSI_R stored at the MME-R 708.

Figure 24:
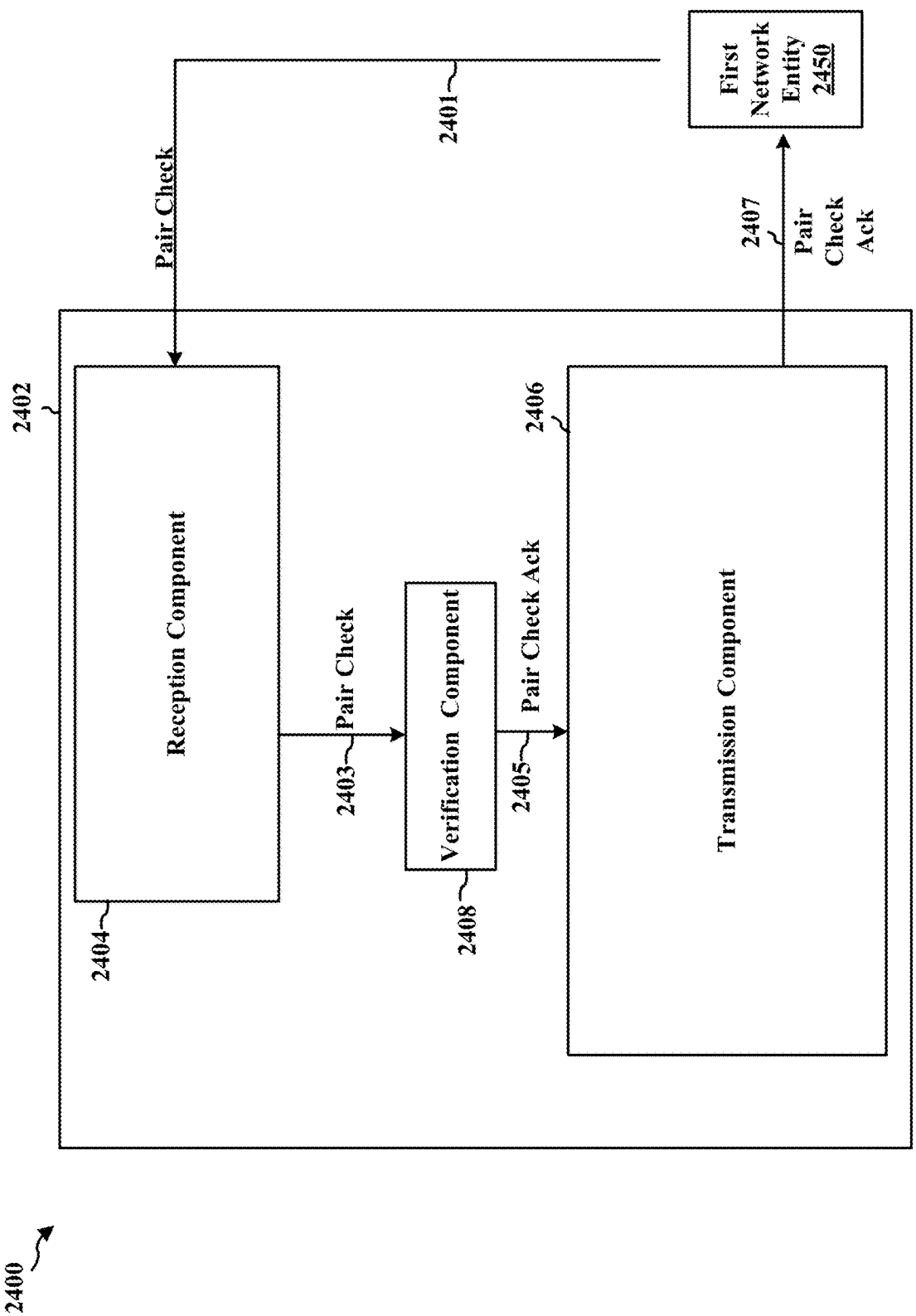
FIG. 24 is a conceptual data flow diagram illustrating the data flow between different means/components in an exemplary apparatus.

FIG. 24 is a conceptual data flow diagram 2400 illustrating the data flow between different means/components in an exemplary apparatus 2402. The apparatus may be a second network entity (e.g., 708, 808, 910, 1010, the apparatus 2400/2400') in communication with a first network entity 2450 (e.g., 710, 810, 912, 1012, the apparatus 2102/2102'). Reception component 2404 may receive a pair check 2401 from first network entity 2450. In addition, reception component 2404 may send a signal 2103 associated with the pair check to verification component 2408. Verification component 2408 may verify the pairing information included in the pair check, and send a signal 2105 associated with the verification to transmission component 2406. Transmission component 2406 may transmit a pair check acknowledgment 2407 to the first network entity 2450 based on the verification.

The apparatus may include additional components that perform each of the blocks of the algorithm in the aforementioned flowchart of FIG. 23. As such, each block in the aforementioned flowchart of FIG. 23 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 25:
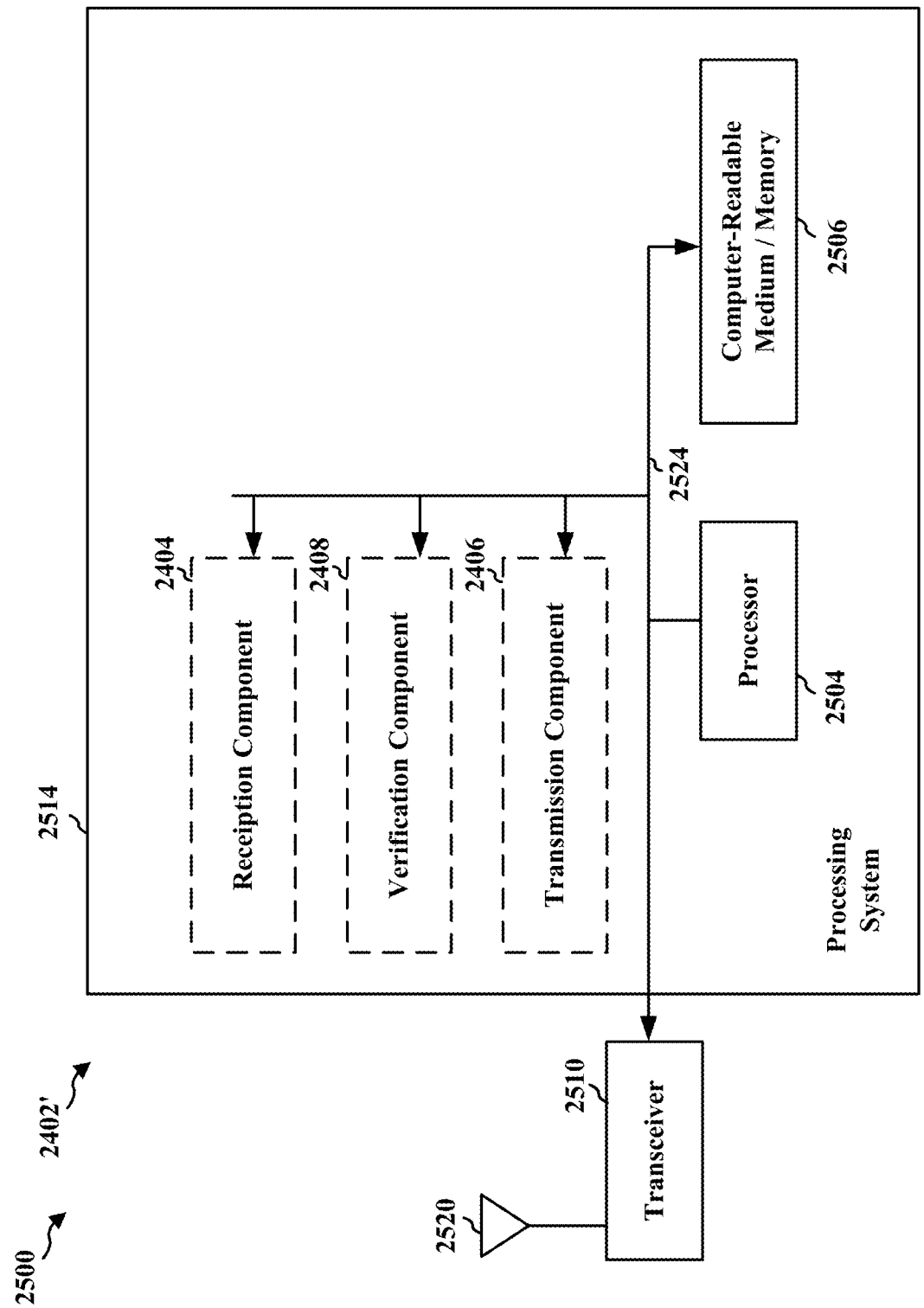
FIG. 25 is a diagram illustrating an example of a hardware implementation for an apparatus employing a processing system.

FIG. 25 is a diagram 2500 illustrating an example of a hardware implementation for an apparatus 2402' employing a processing system 2514. The processing system 2514 may be implemented with a bus architecture, represented generally by the bus 2524. The bus 2524 may include any number of interconnecting buses and bridges depending on the specific application of the processing system 2514 and the overall design constraints. The bus 2524 links together various circuits including one or more processors and/or hardware components, represented by the processor 2504, the components 2404, 2406, 2408, and the computer-readable medium/memory 2506. The bus 2524 may also link various other circuits such as timing sources, peripherals, voltage regulators, and power management circuits, which are well known in the art, and therefore, will not be described any further.

The processing system 2514 may be coupled to a transceiver 2510. The transceiver 2510 is coupled to one or more antennas 2520. The transceiver 2510 provides a means for communicating with various other apparatus over a transmission medium. The transceiver 2510 receives a signal from the one or more antennas 2520, extracts information from the received signal, and provides the extracted information to the processing system 2514, specifically the reception component 2404. In addition, the transceiver 2510 receives information from the processing system 2514, specifically the transmission component 2406, and based on the received information, generates a signal to be applied to the one or more antennas 2520. The processing system 2514 includes a processor 2504 coupled to a computer-readable medium/memory 2506. The processor 2504 is responsible for general processing, including the execution of software stored on the computer-readable medium/memory 2506. The software, when executed by the processor 2504, causes the processing system 2514 to perform the various functions described supra for any particular apparatus. The computer-readable medium/memory 2506 may also be used for storing data that is manipulated by the processor 2504 when executing software. The processing system 2514 further includes at least one of the components 2404, 2406, 2408. The components may be software components running in the processor 2504, resident/stored in the computer readable medium/memory 2506, one or more hardware components coupled to the processor 2504, or some combination thereof. The processing system 2514 may be a component of the eNB 310 and may include the memory 376 and/or at least one of the TX processor 316, the RX processor 370, and the controller/processor 375.

In one configuration, the apparatus 2402/2402' for wireless communication includes means for receiving from a first network entity a pair check message at a second network entity. In an aspect, the pair check message includes a first identification associated with the first UE and a second identification associated with the second UE. In addition, the apparatus 2402/2402' for wireless communication includes means for transmitting a pair check acknowledgement to the first network entity, the pair check acknowledgement including a third identification associated with the second UE. In an aspect, the first identification associated with the first UE includes an IMSI associated with the first UE, the second identification associated with the second UE includes a S-TIMSI associated with the second UE, the third identification associated with the first UE, and the third identification associated with the second UE includes an IMSI associated with the second UE. The aforementioned means may be one or more of the aforementioned components of the apparatus 2402 and/or the processing system 2514 of the apparatus 2402' configured to perform the functions recited by the aforementioned means. As described supra, the processing system 2514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
    transmitting a pairing request from a first user equipment (UE) to a second UE, the pairing request intended for a communication network to verify that the first UE is authorized to communicate via the communication network based on the pairing request, wherein a header of the pairing request identifies the pairing request for relayed uplink traffic intended for a base station of the communication network;
    receiving, at the first UE, a pairing acknowledgement from a network entity, separate from the second UE, in response to the pairing request, the pairing acknowledgement verifying, by the network entity, a pairing of the first UE and the second UE based on the pairing request;
    transmitting an attach request from the first UE to the second UE after receiving the pairing acknowledgement, the attach request intended for the communication network;
    receiving, at the first UE, an attach response verifying an identifier of the pairing request and an identifier of the attach request are the same;
    establishing a pairing with the second UE after receiving the attach response; and
    connecting to the communication network via the second UE once the first UE pairs with the second UE.

2. The method of claim 1, wherein the pairing request includes an identification associated with the first UE.

3. The method of claim 2, wherein the identification associated with the first UE includes at least one of an international mobile subscriber identity (IMSI) associated with the first UE, a system architecture evolution (SAE) temporary mobile subscriber identity (S-TMSI) associated with the first UE, a layer 2 identification (L2-ID) associated with the first UE, or a token that indicates to the second UE that the pairing request is transmitted by the first UE.

4. The method of claim 3, further comprising:
    generating the token based on at least one of the IMSI associated with the first UE, an IMSI associated with the second UE, stored information based on a subscription, manually entered information, or an obfuscated value of a combination of at least one of the foregoing.

5. The method of claim 1, wherein the pairing acknowledgement includes a radio resource control (RRC) connection setup message received from either the second UE or the base station, the RRC connection setup message including at least one of a layer 2 identification (L2-ID) associated with the second UE and a cell radio network temporary identifier (C-RNTI).

6. The method of claim 1, wherein the attach request is a non-access stratum (NAS) attach request intended for the communication network; and
    the attach response is a NAS attach response received from either the second UE or the base station.

7. The method of claim 1, wherein the pairing request includes a non-access stratum (NAS) pairing request.

8. The method of claim 1, wherein the pairing request includes a PC5 interface protocol stack pairing request.

9. The method of claim 1, wherein the first UE and the second UE communicate using one of a licensed spectrum, an unlicensed spectrum, device-to-device communications, wireless local area network communications, wireless personal area network communications or, short-range wireless communications.

10. The method of claim 1, wherein the base station is a first base station, and further comprising:
    receiving a handover command from a second base station.

11. The method of claim 1, wherein the pairing request includes security information allowing the communication network to verify an identity of the first UE.

12. An apparatus for wireless communication, comprising:
    a memory; and
    at least one processor coupled to the memory and configured to:
        transmit a pairing request from a first user equipment (UE) to a second UE, the pairing request intended for a communication network to verify that the first UE is authorized to communicate via the communication network based on the pairing request, wherein a header of the pairing request identifies the pairing request for relayed uplink traffic intended for a base station of the communication network;
        receive a pairing acknowledgement from a network entity, separate from the second UE, the pairing acknowledgement verifying, by the network entity in response to the pairing request, a pairing of the first UE and the second UE based on the pairing request;
        transmit an attach request from the first UE to the second UE after receiving the pairing acknowledgement, the attach request intended for the communication network;
        receive, at the first UE, an attach response verifying an identifier of the pairing request and an identifier of the attach request are the same;
        establish a pairing with the second UE after receiving the attach response; and
        connect to the communication network via the second UE once the first UE pairs with the second UE.

13. The apparatus of claim 12, wherein the pairing request includes an identification associated with the first UE.

14. The apparatus of claim 13, wherein the identification associated with the first UE includes at least one of an international mobile subscriber identity (IMSI) associated with the first UE, a system architecture evolution (SAE) temporary mobile subscriber identity (S-TMSI) associated with the first UE, a layer 2 identification (L2-ID) associated with the first UE, or a token that indicates to the second UE that the pairing request is transmitted by the first UE.

15. The apparatus of claim 14, wherein the at least one processor is further configured to:
    generate the token based on at least one of the IMSI associated with the first UE, an IMSI associated with the second UE, stored information based on a subscription, manually entered information, or an obfuscated value of a combination of at least one of the foregoing.

16. The apparatus of claim 12, wherein the pairing acknowledgement includes a radio resource control (RRC) connection setup message received from either the second UE or the base station, the RRC connection setup message including at least one of a layer 2 identification (L2-ID) associated with the second UE and a cell radio network temporary identifier (C-RNTI).

17. The apparatus of claim 12, wherein the attach request is a non-access stratum (NAS) attach request intended for the communication network; and
the attach response is a NAS attach response received from either the second UE or the base station.

18. The apparatus of claim 12, wherein the pairing request includes a non-access stratum (NAS) pairing request.

19. The apparatus of claim 12, wherein the pairing request includes a PC5 interface protocol stack pairing request.

20. The apparatus of claim 12, wherein the first UE and the second UE communicate using one of a licensed spectrum, an unlicensed spectrum, device-to-device communications, wireless local area network communications, wireless personal area network communications or, short-range wireless communications.

21. The apparatus of claim 12, wherein the base station is a first base station, and the at least one processor is further configured to:
receive a handover command from a second base station.

22. The apparatus of claim 12, wherein the pairing request includes security information allowing the communication network to verify an identity of the first UE.

23. An apparatus for wireless communication, comprising:
means for transmitting a pairing request from a first user equipment (UE) to a second UE, the pairing request intended for a communication network to verify that the first UE is authorized to communicate via the communication network based on the pairing request, wherein a header of the pairing request identifies the pairing request for relayed uplink traffic intended for a base station of the communication network;
means for receiving, at the first UE, a pairing acknowledgement from a network entity, separate from the second UE, the pairing acknowledgement verifying, by the network entity in response to the pairing request, a pairing of the first UE and the second UE based on the pairing request;
means for transmitting an attach request from the first UE to the second UE after receipt of the pairing acknowledgement, the attach request intended for the communication network;
means for receiving, at the first UE, an attach response verifying an identifier of the pairing request and an identifier of the attach request are the same;
means for establishing a pairing with the second UE after receipt, at the first UE, of the attach response; and
means for connecting to the communication network via the second UE once the first UE pairs with the second UE.

24. The apparatus of claim 23, wherein the pairing request includes an identification associated with the first UE.

25. The apparatus of claim 24, wherein the identification associated with the first UE includes at least one of an international mobile subscriber identity (IMSI) associated with the first UE, a system architecture evolution (SAE) temporary mobile subscriber identity (S-TMSI) associated with the first UE, a layer 2 identification (L2-ID) associated with the first UE, or a token that indicates to the second UE that the pairing request is transmitted by the first UE.

26. The apparatus of claim 25, further comprising:
means for generating the token based on at least one of the IMSI associated with the first UE, an IMSI associated with the second UE, stored information based on a subscription, manually entered information, or an obfuscated value of a combination of at least one of the foregoing.

27. The apparatus of claim 23, wherein the pairing acknowledgement includes a radio resource control (RRC) connection setup message received from either the second UE or the base station, the RRC connection setup message including at least one of a layer 2 identification (L2-ID) associated with the second UE and a cell radio network temporary identifier (C-RNTI).

28. The apparatus of claim 23, wherein the attach request is a non-access stratum (NAS) attach request intended for the communication network; and
the attach response is a NAS attach response received from either the second UE or the base station.

29. The apparatus of claim 23, wherein the pairing request includes a non-access stratum (NAS) pairing request.

30. A non-transitory computer-readable medium storing computer executable code, comprising code to:
transmit a pairing request from a first user equipment (UE) to a second UE, the pairing request intended for a communication network to verify that the first UE is authorized to communicate via the communication network based on the pairing request, wherein a header of the pairing request identifies the pairing request for relayed uplink traffic intended for a base station of the communication network;
receive a pairing acknowledgement from a network entity, separate from the second UE, the pairing acknowledgement verifying, by the network entity in response to the pairing request, a pairing of the first UE and the second UE based on the pairing request;
transmit an attach request from the first UE to the second UE after receiving the pairing acknowledgement, the attach request intended for the communication network;
receive, at the first UE, an attach response verifying an identifier of the pairing request and an identifier of the attach request are the same;
establish a pairing with the second UE after receiving, at the first UE, the attach response; and
connect to the communication network via the second UE once the first UE pairs with the second UE.

* * * * *